United States Patent
Kim et al.

(10) Patent No.: US 12,231,981 B2
(45) Date of Patent: Feb. 18, 2025

(54) METHOD AND DEVICE FOR PERFORMING HANDOVER IN WIRELESS COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 354 days.

(21) Appl. No.: 17/774,006

(22) PCT Filed: Nov. 5, 2020

(86) PCT No.: PCT/KR2020/015382
§ 371 (c)(1),
(2) Date: May 3, 2022

(87) PCT Pub. No.: WO2021/091248
PCT Pub. Date: May 14, 2021

(65) Prior Publication Data
US 2022/0386182 A1    Dec. 1, 2022

(30) Foreign Application Priority Data

Nov. 6, 2019 (KR) .................. 10-2019-0141264
Nov. 25, 2019 (KR) .................. 10-2019-0152233

(51) Int. Cl.
*H04W 36/08* (2009.01)
*H04W 36/00* (2009.01)
*H04W 36/18* (2009.01)

(52) U.S. Cl.
CPC ...... *H04W 36/087* (2023.05); *H04W 36/0064* (2023.05); *H04W 36/185* (2023.05)

(58) Field of Classification Search
None
See application file for complete search history.

(56) References Cited

U.S. PATENT DOCUMENTS 10,805,849 B2    10/2020    Fang et al.
2009/0017826 A1    1/2009    Shaheen
(Continued)

FOREIGN PATENT DOCUMENTS

CN    101784119 A    7/2010
CN    108024294 A    5/2018
(Continued)

OTHER PUBLICATIONS

Nokia et al.: Analysis of DAPS Operation, 3GPP Draft; R2-1909036; Aug. 26-30, 2019 (Year: 2019).*
(Continued)

*Primary Examiner* — Adolf Dsouza
(74) *Attorney, Agent, or Firm* — Jefferson IP Law, LLP

(57) ABSTRACT

The present disclosure relates to a method and device for performing handover in a wireless communication system. An operating method of a user equipment (UE) in a wireless communication system may include: receiving, from a source base station, a radio resource control (RRC) reconfiguration message indicating handover, the RRC reconfiguration message including data radio bearer (DRB) configuration information; in case that the DRB configuration information includes an indicator indicating a configuration of a dual active protocol stack (DAPS) for at least one DRB, generating a multimedia access control (MAC) entity for a target base station; configuring the MAC entity for the target base station based on MAC configuration information included in the RRC reconfiguration message indicating the
(Continued)

handover; suspending a signaling radio bearer (SRB) for the source base station; and establishing or configuring a SRB for the target base station.

15 Claims, 15 Drawing Sheets

(56) References Cited

U.S. PATENT DOCUMENTS

| | | | |
|---|---|---|---|
| 2015/0215826 A1 | 7/2015 | Yamada | |
| 2021/0105674 A1 | 4/2021 | Kim et al. | |
| 2022/0256346 A1* | 8/2022 | Hori | G09C 1/00 |
| 2022/0279586 A1* | 9/2022 | Tsuboi | H04W 36/08 |
| 2022/0303840 A1* | 9/2022 | Chang | H04W 36/185 |
| 2022/0394803 A1* | 12/2022 | Hori | H04W 76/20 |

FOREIGN PATENT DOCUMENTS

| | | |
|---|---|---|
| KR | 10-2021-0039888 A | 4/2021 |
| WO | 2021/086073 A1 | 5/2021 |

OTHER PUBLICATIONS

3GPP TSG-RAN WG2 Meeting #107bis Chongqing, CN, Oct 14-Oct. 18, 2019 (Year: 2019).*

Chinese Office Action dated Mar. 27, 2024, issued in Chinese Application No. 202080077344.6.

Qualcomm Incorporated, Supporting per DRB DAPS HO configuration, R2-1912299, 3GPP TSG-RAN Chongqing, CN, WG2 Meeting #107bis, Oct. 14, 2019.

3GPP TS 36.300 V15.7.0, 3rd Generation Partnership Project; Technical Specification Group Radio AccessNetwork; Evolved Universal Terrestrial Radio Access (E-UTRA) and Evolved Universal Terrestrial Radio Access Network (E-UTRAN); Overall description; Stage 2, (Release 15), Sep. 26, 2019.

Extended European Search Report dated Aug. 22, 2022, issued in European Patent Application No. 20886137.7.

Nokia et al. Analysis of DAPS Operation. R2-1909036, 3GPP TSG RAN WG2 Meeting #107. Prague, Czech Republic. Aug. 15, 2019. See sections 2.1-2.3.

OPPO. Further details on dual active protocol stack. R2-1909670, 3GPP TSG RAN WG2 Meeting #107. Pragu e, Czech Republic. Aug. 16, 2019. See section 2.2.

ZTE Corporation et al. Discussion on PDCP aspects for RUDI. R2-1910758, 3GPP TSG RAN WG2 Meetin g #107. Prague, Czech Republic. Aug. 16, 2019. See section 2.

Mediatek Inc et al. UL Handling with DAPS during RUDI handover. R2-1909178, 3GPP TSG RAN WG2 Me eting #107. Prague, Czech Republic. Aug. 16, 2019, See section 2.

International Search Report and Written Opinion dated Feb. 9, 2021, issued in International Patent Application No. PCT/KR2020/015382.

Indian Office Action dated Jan. 1, 2024, issued in Indian Patent Application No. 202237013756.

* cited by examiner

UE PDCP change during DAPS handover

UE SDAP change during DAPS handover

METHOD AND DEVICE FOR PERFORMING HANDOVER IN WIRELESS COMMUNICATION SYSTEM

TECHNICAL FIELD

The present disclosure relates to a method and device for performing handover in a wireless communication system.

BACKGROUND ART

To meet the increase in demand with respect to wireless data traffic after the commercialization of $4^{th}$ generation (4G) communication systems, considerable efforts have been made to develop improved $5^{th}$ generation (5G) communication systems or pre-5G communication systems. For this reason, 5G communication systems or pre-5G communication systems are called beyond 4G network communication systems or post long term evolution (LTE) systems. To achieve a high data rate, the implementation of 5G communication systems in an ultra-high frequency band (millimeter wave (mmWave)) (e.g., a 60 GHz band) is under consideration. To alleviate path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system, are being discussed. Also, in order to improve a system network for 5G communication systems, technologies, such as evolved small cell, advanced small cell, cloud radio access network (cloud RAN), ultra-dense network, device-to-device (D2D) communication, wireless backhaul, moving network, cooperative communication, coordinated multi-points (CoMP), and reception interference cancellation, are being developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements such as objects. An Internet of everything (IoE) technology is emerging, in which a technology related to the IoT is combined with, for example, a technology for processing big data through connection with a cloud server. In order to implement the IoT, various technical components are required, such as, a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology.

As it is possible to provide various services according to the development of wireless communication systems, there is a need for a method of seamlessly providing these services.

DESCRIPTION OF EMBODIMENTS

Solution to Problem

Based on the above discussion, the present disclosure provides a device and method capable of effectively providing a service in a mobile communication system.

Advantageous Effects of Disclosure

The disclosed embodiments provide a device and method capable of providing a service in a mobile communication system.

BRIEF DESCRIPTION OF DRAWINGS

FIG. 1O illustrates a block configuration of a transmission and reception point (Tx/Rx point, TRP) in a wireless communication system, according to an embodiment of the present disclosure.

BEST MODE

Figure 1A:
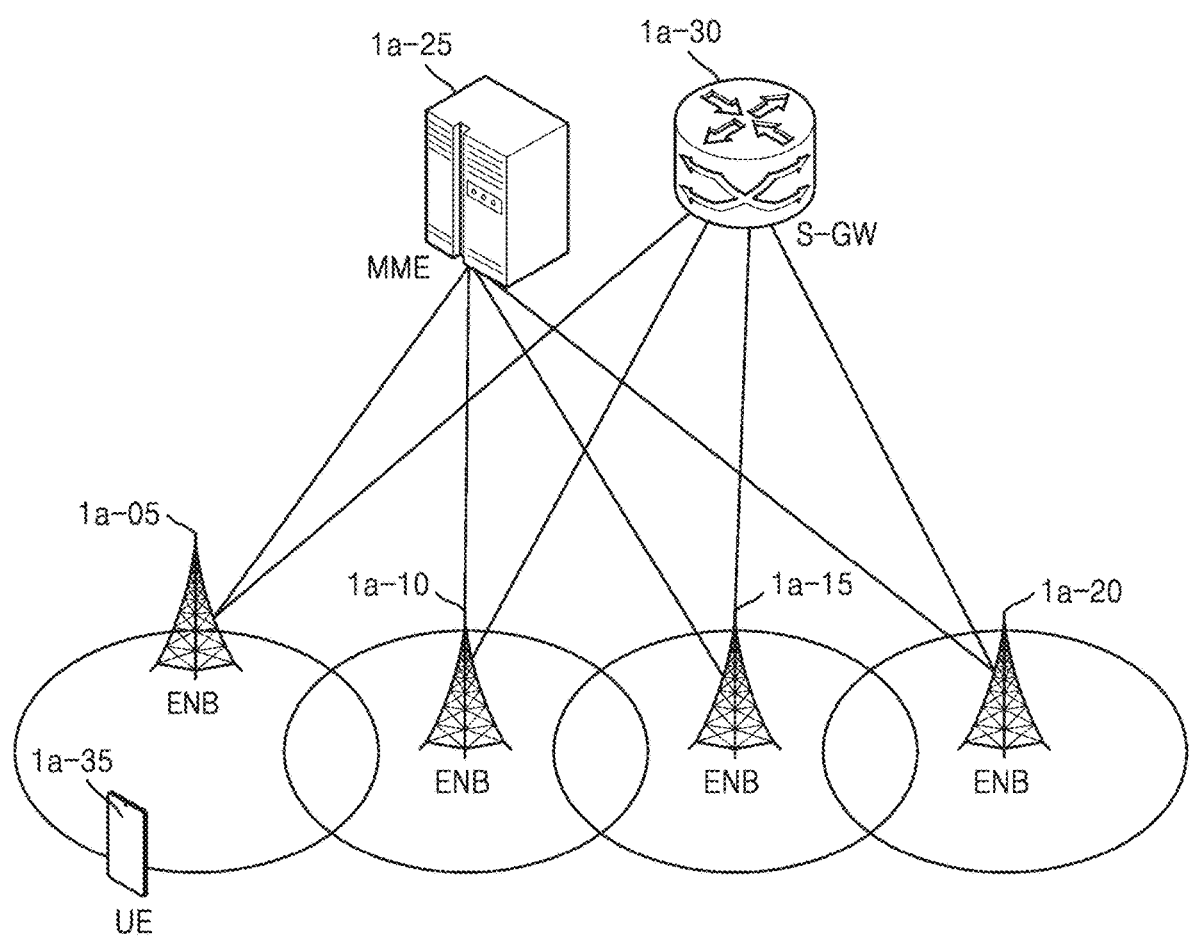
FIG. 1A is a diagram illustrating an architecture of an LTE system to which the present disclosure is applicable.

According to an embodiment of the present disclosure, a method of operating a user equipment (UE) in a wireless communication system may include: receiving a handover command from a source base station; generating a protocol layer of a second bearer for a target base station based on information included in the handover command; performing random access to the target base station; and determining whether to maintain data transmission and reception with the source base station based on a predetermined condition.

According to an embodiment of the present disclosure, a method of operating a UE in a wireless communication system may include: receiving, from a source base station, a radio resource control (RRC) reconfiguration message indicating handover, the RRC reconfiguration message including data radio bearer (DRB) configuration information; in case that the DRB configuration information includes an indicator indicating a configuration of a dual active protocol stack (DAPS) for at least one DRB, generating a multimedia access control (MAC) entity for a target base station; configuring the MAC entity for the target base station based on MAC configuration information included in the RRC reconfiguration message indicating the handover; suspending a signaling radio bearer (SRB) for the source base station; and establishing or configuring a SRB for the target base station.

A UE in a wireless communication system, according to the present disclosure, may include: a transceiver; and at least one processor configured to: receive, from a source base station, a radio resource control (RRC) reconfiguration message indicating handover through the transceiver, the RRC reconfiguration message including data radio bearer (DRB) configuration information; in case that the DRB configuration information includes an indicator indicating a configuration of a DAPS for at least one DRB, generate a multimedia access control (MAC) entity for a target base station; configure the MAC entity for the target base station based on MAC configuration information included in the RRC reconfiguration message indicating the handover; suspend signaling radio bearer (SRB) for the source base station; and establish or configure a SRB for the target base station.

MODE OF DISCLOSURE

Hereinafter, embodiments of the present disclosure will be described in detail with reference to the accompanying drawings. In describing the present disclosure, when a detailed description of the relevant known functions or configurations is determined to unnecessarily obscure the gist of the present disclosure, the detailed description thereof may be omitted herein. The terms as used herein are those defined by taking into account functions in the present disclosure, but the terms may vary depending on the intention of users or those of ordinary skill in the art, precedents, or the like. Therefore, the definitions should be made based on the contents throughout the specification.

Effects and features of the present disclosure, and methods of achieving them will be clarified with reference to embodiments described below in detail with reference to the drawings. In this regard, the embodiments of the present disclosure may have different forms and should not be construed as being limited to the descriptions set forth herein. Rather, these embodiments are provided so that the present disclosure will be thorough and complete and will fully convey the concept of the embodiments of the present disclosure to those of ordinary skill in the art. The present disclosure is only defined by the scope of the claims. The same reference numerals refer to the same elements throughout the specification.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-usable or computer-readable memory that may direct the computer or other programmable data processing apparatus so as to implement functions in a particular manner, the instructions stored in the computer-usable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "-er/or" as used herein refers to a software element or a hardware element such as field programmable gate array (FPGA) or application specific integrated circuit (ASIC), and the "module" or "-er/or" performs certain functions. However, the term "-er/or" is not limited to software or hardware. The term "-er/or" may be configured in an addressable storage medium or may be configured to reproduce one or more processors. Therefore, for example, the term "-er/or" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the "-ers/ors" may be combined with fewer elements and "-ers/ors", or may be separated from additional elements and "-ers/ors." Furthermore, the elements and the "-ers/ors" may be implemented to reproduce one or more central processing units (CPUs) in the device or secure multimedia card. Also, in embodiments of the present disclosure, the "-er/or" may include one or more processors.

In describing the present disclosure, when a detailed description of the relevant known functions or configurations is determined to unnecessarily obscure the gist of the present disclosure, the detailed description thereof may be omitted. Hereinafter, embodiments of the present disclosure will be described in detail with reference to the accompanying drawings.

The term for identifying an access node, the term referring to network entities, the term referring to messages, the term referring to an interface between network entities, the terms referring to a variety of identification information, and the like are exemplified for convenience of description. Therefore, the present disclosure is not limited to the terms to be described later, and other terms referring to entities having an equivalent technical meaning may be used.

For convenience of description, the terms and names defined in the 3rd Generation Partnership Project Long Term Evolution (3GPP LTE) standard are used herein. However, the present disclosure is not limited by the terms and names and may be equally applied to systems conforming to other standards. In particular, the present disclosure may be applied to 3GPP new radio (NR) ($5^{th}$ generation (5G) mobile communication standard). The term "eNB" as used herein may be used interchangeably with the term "gNB" for convenience of description. That is, a base station described as eNB may represent gNB. Also, the term "terminal" may refer to not only mobile phones, NB-IoT devices, and sensors, but also other wireless communication devices.

Hereinafter, a base station allocates resources to a terminal, and may include at least one of a gNode B, an eNode B, a Node B, a BS, a radio access unit, a base station controller, or a node on a network. Examples of a terminal may include a user equipment (UE), a mobile station (MS), a cellular phone, a smailphone, a computer, a multimedia system capable of performing a communication function, or the like. Of course, the present disclosure is not limited to the above examples.

The present disclosure proposes seamless handover methods capable of minimizing a data interruption time due to handover or reducing a data interruption time to 0 ms in a next-generation mobile communication system.

Specifically, efficient handover methods proposed in the present disclosure may have one or more of the following features.

Also, in the efficient handover methods proposed in the present disclosure, different handover methods may be applied to different bearers.

When a UE that performs data transmission or reception (uplink or downlink data transmission and reception) with a source base station through protocol layers (a physical (PHY) layer, a media access control (MAC) layer, a radio link control (RLC) layer, or a PDCP layer) of a plurality of first bearers receives a handover command message (or a radio resource control (RRC) reconfiguration message) from the source base station, the UE may establish protocol layers of a plurality of new second bearers corresponding to the protocol layers of the first bearers (for example, having the same bearer identifier), and may perform data transmission or reception (uplink or downlink data transmission and reception) while continuously maintaining the data transmission or reception with the source base station through the first bearers without interruption.

After the UE receives the handover command message, the protocol layers (a PHY layer, a MAC layer, an RLC layer, or a PDCP layer) of the second bearers that are newly established are configured for data transmission or reception with a target base station based on bearer configuration information or protocol layer information included in the handover command message.

The UE performs a random access procedure to the target base station through the protocol layers (for example, a MAC layer) of the second bearers while performing data transmission or reception (uplink or downlink data transmission and reception) with the source base station through the protocol layers of the first bearers. The random access procedure may include preamble transmission, random access response reception, message 3 transmission, or message 4 reception (for example, contention resolution MAC control element (CE) or uplink transmission resource reception).

The UE completes the random access procedure to the target base station through the protocol layers (for example, a MAC layer) of the second bearers while performing data transmission or reception with the source base station through the protocol layers of the first bearers, and transmits a handover completion message to the target base station through the protocol layers of the second bearers.

The UE completes the random access procedure to the target base station through the protocol layers of the second bearers (for example, a MAC layer) while performing data transmission or reception with the source base station through the protocol layers of the first bearers, transmits the handover completion message to the target base station through the protocol layers of the second bearers, and performs data transmission or reception (uplink or downlink).

When the UE successfully completes the random access procedure to the target base station and receives an uplink transmission resource from the target base station for the first time, the UE stops transmitting data to the source base station through the protocol layers of the first bearers, and switches uplink transmission to transmit data to the target base station through the second bearers.

When the UE receives the handover command message, the UE continues to perform data transmission or reception (uplink or downlink data transmission or reception) with the source base station through the protocol layers of the first bearers, and performs a random access procedure to the target base station through the protocol layers of the second bearers. When the UE successfully completes the random access procedure and receives the uplink transmission resource from the target base station for the first time, the UE stops transmitting uplink data to the source base station through the protocol layers of the first bearers, and transmits uplink data to the target base station only through the protocol layers of the second bearers. Also, the UE may continue to receive downlink data from the source base station through the protocol layers of the first bearers, and may continue to receive downlink data from the target base station through the protocol layers of the second bearers.

The first bearer and the second bearer may be configured in the second PDCP layer structure. In the second PDCP layer structure, both the first bearer for the source base station (for example, an RLC layer, a MAC layer, or a PHY layer) and the second bearer for the target base station (for example, an RLC layer, a MAC layer, or a PHY layer) may be connected to one PDCP layer. Uplink data may be transmitted through one of the first bearer and the second bearer via the PDCP layer. That is, the UE transmits the uplink data through the first bearer until the UE performs the random access procedure to the target base station, successfully completes the random access procedure, and receives the uplink transmission resource from the target base station for the first time. When the UE performs the random access procedure to the target base station, successfully completes the random access procedure, and receives the uplink transmission resource from the target base station for the first time, the UE may stop transmitting data through the first bearer and switch to transmit the uplink data to the target through the second bearer. In this case, in the second PDCP layer structure, the UE may receive the downlink data from the source base station or the target base station through the first bearer or the second bearer.

Hereinafter, the present disclosure proposes efficient handover procedures without a data interruption time based on the above features.

When the UE performs an efficient handover method without a data interruption time proposed in the present disclosure, but fails handover, the UE may re-establish the connection by quickly falling back to the source base station by using the feature of the efficient handover method proposed in the present disclosure. Specifically, the feature of the efficient handover method proposed in the present disclosure may mean maintaining the connection with the source base station even when the UE performs a handover procedure. Also, the present disclosure proposes a specific fallback method using a wireless connection connected to an existing source base station even when the UE fails handover.

The present disclosure provides a method and device for efficiently performing different handover methods for each bearer in a next-generation mobile communication system.

The present disclosure relates to a method and device for performing fallback when an efficient handover method without data transmission and reception interruption is performed, but handover fails upon handover in a next-generation mobile communication system.

According to an embodiment, a next-generation mobile communication system may require an efficient handover method to support a service without data interruption together with a low transmission delay. In the event of a handover failure, there may be a need for a method capable of falling back while minimizing a data interruption time.

The present disclosure may propose efficient and various handover methods which, when handover is performed in a next-generation mobile communication system, may prevent a data interruption time due to handover from occurring. In this manner, a service without data interruption may be supported. Efficient methods capable of allowing the UE to quickly fall back to the source base station when handover fails will be described.

FIG. 1A is a diagram illustrating an architecture of an LTE system to which the present disclosure is applicable.

Referring to FIG. 1A, a radio access network of the LTE system includes next-generation base stations (evolved Node Bs, hereinafter referred to as ENBs, Node Bs, or base stations) 1a-05, 1a-10, 1a-15, and 1a-20, a mobility management entity (MME) 1a-25, and a serving-gateway (S-GW) 1a-30. A UE (or a terminal) 1a-35 may access an external network through the ENBs 1a-05 to 1a-20 and the S-GW 1a-30.

In FIG. 1A, the ENBs 1a-05 to 1a-20 correspond to an existing Node B of a universal mobile telecommunication system (UMTS). The ENB is connected to the UE 1a-35 through a radio channel, and performs a more complex role than the existing Node B. In the LTE system, all user traffics including real-time services such as Voice over IP (VoIP) through an Internet protocol may be serviced through a shared channel Therefore, an apparatus for collecting and scheduling status information such as buffer status, available transmission power status, and channel status of UEs may be required. This may be handled by the ENBs 1a-05 to 1a-20. One ENB may typically control a plurality of cells. For example, in order to implement a transmission rate of 100 Mbps, the LTE system may use, for example, an orthogonal frequency division multiplexing (OFDM) scheme in a 20-MHz bandwidth as a radio access technology. Also, a modulation scheme and an adaptive modulation and coding (AMC) scheme that determines a channel coding rate are applied according to the channel status of the UE. The S-GW 1a-30 is an entity that provides data bearers, and may add or release data bearers under the control by the MME 1a-25. The MME 1a-25 is an entity that is responsible for various control functions as well as mobility management functions for the UE, and is connected to a plurality of base stations.

Figure 1B:
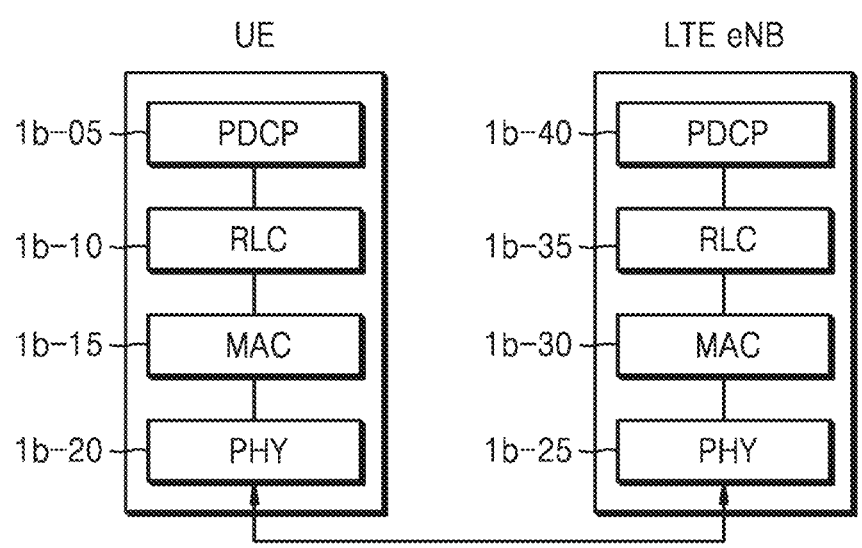
FIG. 1B is a diagram illustrating a radio protocol architecture of an LTE system to which the present disclosure is applicable.

FIG. 1B is a diagram illustrating a radio protocol architecture of an LTE system to which the present disclosure is applicable.

Referring to FIG. 1B, in the radio protocol of the LTE system, a UE and an ENB respectively include PDCPs 1b-05 and 1b-40, RLCs 1b-10 and 1b-35, and MACs 1b-15 and 1b-30. The PDCPs 1b-05 and 1b-40 may be responsible for operations such as IP header compression/decompression. The main functions of the PDCP are summarized as follows.

Header compression and decompression function (Header compression and decompression: Robust header compression (ROHC) only)

User data transfer function (Transfer of user data)

In-sequence delivery function (In-sequence delivery of upper layer packet data units (PDUs) at PDCP re-establishment procedure for RLC Acknowledged Mode (AM))

Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function

Timer-based SDU discard function (Timer-based SDU discard in uplink.)

The RLCs 1b-10 and 1b-35 perform an automatic repeat request (ARQ) operation by reconfiguring a PDCP PDU to an appropriate size. The main functions of the RLC are summarized as follows.

Data transfer function (Transfer of upper layer PDUs)
ARQ function (Error correction through ARQ (only for AM data transfer))
Concatenation, segmentation, and reassembly function (Concatenation, segmentation and reassembly of RLC SDUs (only for UM and AM data transfer))
Re-segmentation function (Re-segmentation of RLC data PDUs (only for AM data transfer))
Reordering function (Reordering of RLC data PDUs (only for UM and AM data transfer))
Duplicate detection function (Duplicate detection (only for UM and AM data transfer))
Error detection function (Protocol error detection (only for AM data transfer))
RLC SDU discard function (RLC SDU discard (only for UM and AM data transfer))
RLC re-establishment function The MACs 1b-15 and 1b-30 may be connected to RLC layers configured in one UE, and perform an operation of multiplexing RLC PDUs to MAC PDUs and demultiplexing RLC PDUs from MAC PDUs. The main functions of the MAC are summarized as follows.

Mapping function (Mapping between logical channels and transport channels)
Multiplexing/demultiplexing function (Multiplexing/demultiplexing of MAC SDUs belonging to one or different logical channels into/from transport blocks (TB) delivered to/from the physical layer on transport channels)
Scheduling information reporting function
HARQ function (Error correction through HARQ)
Function of handling priority between logical channels (Priority handling between logical channels of one UE)
Function of handling priority between UEs (Priority handling between UEs by means of dynamic scheduling)
MBMS service identification function
Transport format selecting function
Padding function The PHY layers 1b-20 and 1b-25 perform an operation of channel-coding and modulating upper layer data, making the channel-coded and modulated upper layer data into OFDM symbols, and transmitting the OFDM symbols over a radio channel, or demodulating OFDM symbols received through a radio channel, channel-decoding the demodulated OFDM symbols, and transmitting the channel-decoded OFDM symbols to the upper layer.

Figure 1C:
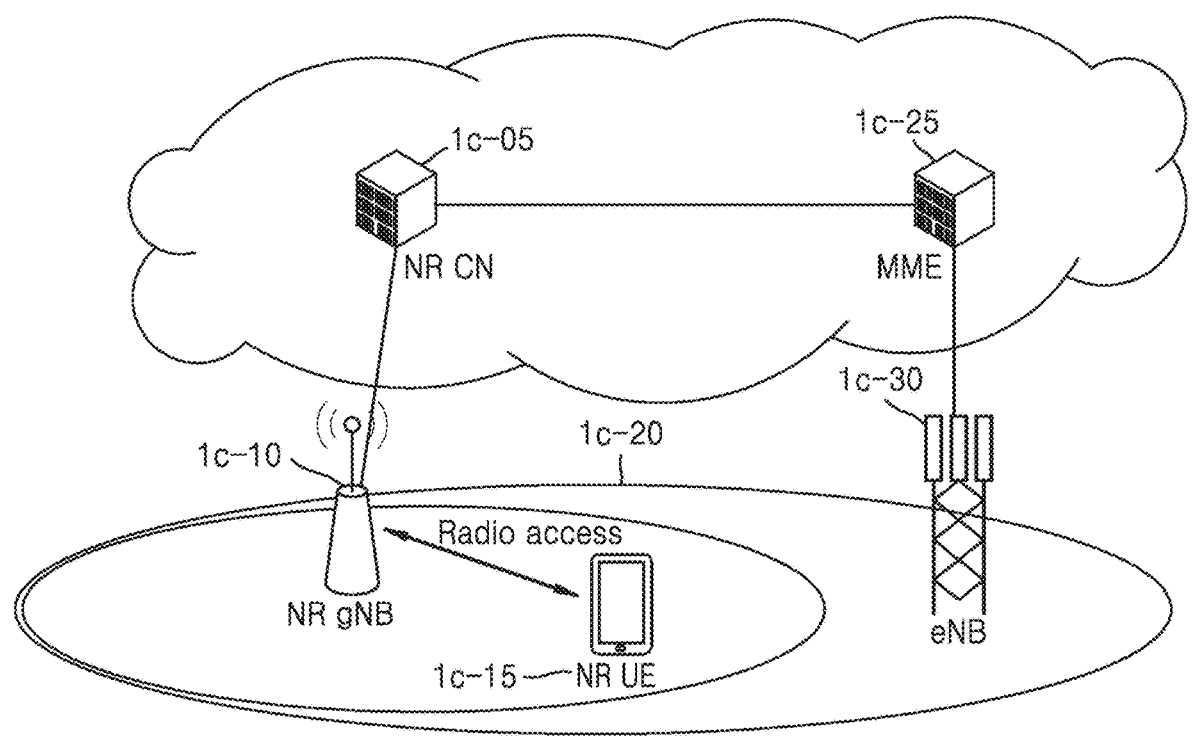
FIG. 1C is a diagram illustrating an architecture of a next-generation mobile communication system to which the present disclosure is applicable.

FIG. 1C is a diagram illustrating an architecture of a next-generation mobile communication system to which the present disclosure is applicable.

Referring to FIG. 1C, a radio access network of the next-generation mobile communication system (hereinafter referred to as NR or 5G) includes a next-generation base station (NR Node B, hereinafter referred to as an NR gNB or an NR base station) 1c-10 and an NR core network (CN) 1c-05. An NR UE (or a terminal) 1c-15 may access an external network through the NR gNB 1c-10 and the NR CN 1c-05. The NR UE 1c-15 may be located in an area 1c-20.

In FIG. 1C, the NR gNB 1c-10 corresponds to an eNB of an existing LTE system. The NR gNB 1c-10 may be connected to the NR UE 1c-15 through a radio channel and may provide a service superior to that of the existing Node B. In the next-generation mobile communication system, all user traffics are serviced through a shared channel Therefore, an apparatus for collecting and scheduling status information such as buffer status, available transmission power status, and channel status of UEs is required. This may be handled by the NR gNB 1c-10. One NR gNB 1c-10 typically controls a plurality of cells. The next-generation mobile communication system may have more than the existing maximum bandwidth so as to implement ultra-high-speed data transmission compared to the existing LTE, and may additionally use a beamforming technology by using OFDM as a radio access technology. Also, a modulation scheme and an adaptive modulation and coding (AMC) scheme that determines a channel coding rate are applied according to the channel status of the UE. The NR CN 1c-05 performs functions such as mobility support, bearer configuration, and quality of service (QoS) configuration. The NR CN 1c-05 is an entity that is responsible for various control functions as well as a mobility management function for the UE, and may be connected to a plurality of base stations. Also, the next-generation mobile communication system may interoperate with the existing LTE system, and the NR CN is connected to an MME 1c-25 through a network interface. The MME is connected to the eNB 1c-30, which is the existing base station.

Figure 1D:
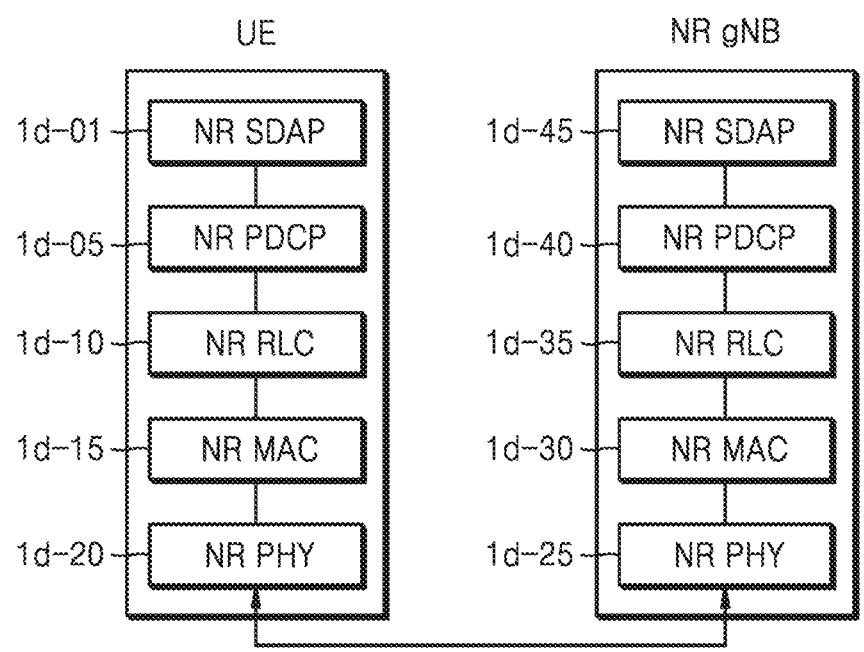
FIG. 1D is a diagram illustrating a radio protocol architecture of a next-generation mobile communication system to which the present disclosure is applicable.

FIG. 1D is a diagram illustrating a radio protocol architecture of a next-generation mobile communication system to which the present disclosure is applicable.

Referring to FIG. 1D, in the radio protocol of the next-generation mobile communication system, a UE and an NR gNB respectively include NR service data adaptation protocols (SDAPs) 1d-01 and 1d-45, NR PDCPs 1d-05 and 1d-40, NR RLCs 1d-10 and 1d-35, and NR MACs 1d-15 and 1d-30.

The main functions of the NR SDAPs 1d-01 and 1d-45 may include some of the following functions.

User data transfer function
Function of mapping between a QoS flow and a data radio bearer (DRB) for both DL and UL
Function of marking QoS flow ID in uplink and downlink
Function of reflective QoS flow to DRB mapping for the UL SDAP PDUs In regard to the SDAP layers, the UE may receive an RRC message to configure whether to use the header of the SDAP layer or whether to use the function of the SDAP layer for each PDCP layer, each bearer, or each logical channel When the SDAP header is configured, the UE may indicate, by using a 1-bit non-access stratum (NAS) reflective QoS indicator and a 1-bit access stratum (AS) reflective QoS indicator of the SDAP header, the UE to update or reconfigure mapping information between a QoS flow and a data bearer for uplink and downlink. The SDAP header may include QoS flow ID information indicating QoS. QoS information may be used as data processing priority, scheduling information, and the like for supporting efficient services.

The main functions of the NR PDCPs 1d-05 and 1d-40 may include some of the following functions.

Header compression and decompression function (Header compression and decompression: ROHC only)
User data transfer function
In-sequence delivery function (In-sequence delivery of upper layer PDUs)
Out-of-sequence delivery function (Out-of-sequence delivery of upper layer PDUs)
Reordering function (PDCP PDU reordering for reception)
Duplicate detection function (Duplicate detection of lower layer SDUs)
Retransmission function (Retransmission of PDCP SDUs)
Ciphering and deciphering function Timer-based SDU discard function (Timer-based SDU discard in uplink.)

The reordering function of the NR PDCP layers may refer to a function of reordering PDCP PDUs received from the lower layer in sequence based on a PDCP sequence number (SN). The reordering function of the NR PDCP layers may include at least one of a function of transmitting data to the upper layer in reordered order, a function of immediately transmitting data without considering the order, a function of reordering PDCP PDUs and recording lost PDCP PDUs, a function of reporting the status of the lost PDCP PDUs to a sender, or a function of requesting retransmission of the lost PDCP PDUs.

The main functions of the NR RLCs 1d-10 and 1d-35 may include some of the following functions.

Data transfer function (Transfer of upper layer PDUs)
In-sequence delivery function (In-sequence delivery of upper layer PDUs)
Out-of-sequence delivery function (Out-of-sequence delivery of upper layer PDUs)
ARQ function (Error correction through ARQ)
Concatenation, segmentation, and reassembly function (Concatenation, segmentation and reassembly of RLC SDUs)
Re-segmentation function (Re-segmentation of RLC data PDUs)
Reordering function (Reordering of RLC data PDUs)
Duplicate detection function
Error detection function (Protocol error detection)
RLC SDU discard function
RLC re-establishment function The in-sequence delivery function of the NR RLC layers may refer to a function of transmitting RLC SDUs received from the lower layer to the upper layer in sequence. The in-sequence delivery function of the NR RLC layers may include a function of, in case that one RLC SDU is received after being segmented into a plurality of RLC SDUs, reassembling and transmitting the segmented and received RLC SDUs, a function of reordering the received RLC PDUs based on an RLC SN or a PDCP SN, a function of reordering the RLC PDUs and recording the lost RLC PDUs, a function of reporting the status of the lost RLC PDUs to the sender, a function of requesting retransmission of the lost RLC PDUs, a function of, when there is the lost RLC SDU, transmitting only RLC SDUs up to before the lost RLC SDU to the upper layer in sequence, a function of, in case that there is the lost RLC SDU but a certain timer has expired, transmitting all RLC SDUs received before the start of the timer to the upper layer in sequence, or a function of, in case that there is the lost RLC SDU and a certain timer has expired, transmitting all RLC SDUs received so far to the upper layer in sequence. Also, the NR RLC layer may process RLC PDUs in the order of reception (in the order of arrival regardless of the order of serial number and sequence number) and transmit the processed RLC PDUs to the PDCP layer regardless of the order (out-of sequence delivery). In case that the received RLC PDUs are segments, segments stored in a buffer or to be received in the future may be received, reconfigured into one complete RLC PDU, and processed and transmitted to the PDCP layer. The NR RLC layer may not include the concatenation function, and the concatenation function may be performed by the NR MAC layer, or may be replaced with the multiplexing function of the NR MAC layer.

The out-of-sequence delivery function of the NR RLC layer may refer to a function of transmitting RLC SDUs received from the lower layer directly to the upper layer regardless of the order, and may include a function of, in case that one RLC SDU is received after being segmented into a plurality of RLC SDUs, reassembling and transmitting the segmented and received RLC SDUs, or a function of storing the RLC SN or PDCP SN of the received RLC PDUs, reordering the RLC PDUs, and recording the lost RLC PDUs.

The NR MACs 1d-15 and 1d-30 may be connected to a plurality of NR RLC layers configured in one UE, and the main functions of the NR MACs may include some of the following functions.

Mapping function (Mapping between logical channels and transport channels)
Multiplexing and demultiplexing function (Multiplexing/demultiplexing of MAC SDUs)
Scheduling information reporting function (Scheduling information reporting)
HARQ function (Error correction through HARQ)
Function of handling priority between logical channels (Priority handling between logical channels of one UE)
Function of handling priority between UEs (Priority handling between UEs by means of dynamic scheduling)
MBMS service identification function
Transport format selecting function
Padding function The NR PHY layers 1d-20 and 1d-25 may perform an operation of channel-coding and modulating upper layer data, making the channel-coded and modulated upper layer data into OFDM symbols, and transmitting the OFDM symbols over a radio channel, or demodulating and channel-decoding OFDM symbols received through a radio channel and transmitting the channel-decoded OFDM symbols to the upper layer.

Figure 1E:
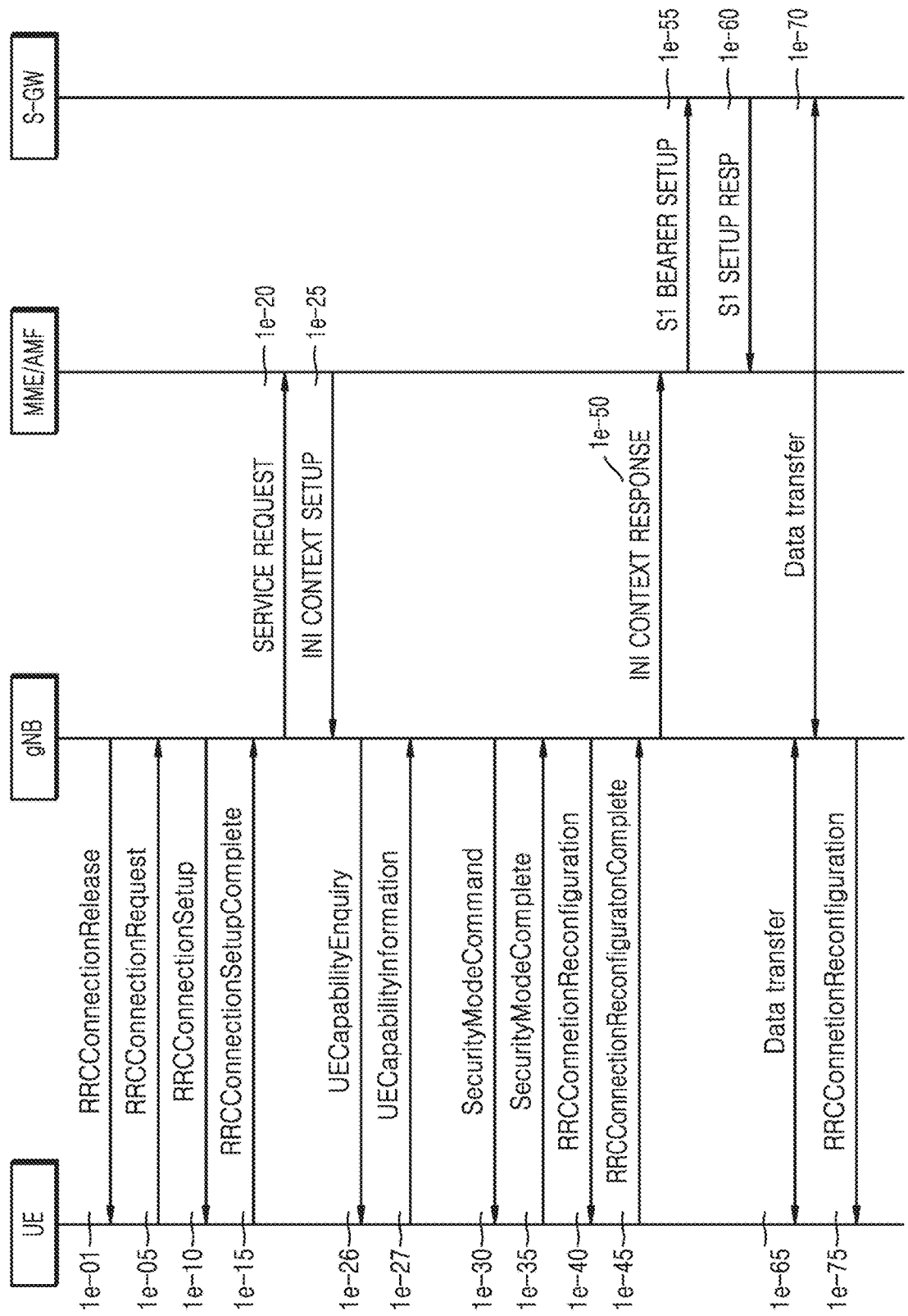
FIG. 1E is a diagram for describing a procedure in which a user equipment switches from a radio resource control (RRC) idle mode to an RRC connected mode and establishes a connection with a network in the present disclosure.

FIG. 1E is a diagram for describing a procedure in which a UE switches from an RRC idle mode to an RRC connected mode and establishes a connection with a network in the present disclosure.

In FIG. 1E, when the UE that transmits or receives data in the RRC connected mode does not transmit or receive data for a certain reason or for a certain time, a gNB may transmit an RRCConnectionRelease message to the UE to switch the UE to the RRC idle mode (1e-01). When data to be transmitted is generated, the UE in which the connection is not currently established (hereinafter, an idle mode UE) performs an RRC connection establishment process with the gNB. The UE establishes reverse transmission synchronization with the gNB through a random access process and transmits an RRCConnectionRequest message to the gNB (1e-05). The RRCConnectionRequest message contains a UE identifier and a connection establishment cause (establishmentCause). The gNB transmits an RRCConnectionSetup message so that the UE establishes an RRC connection (1e-10).

The RRCConnectionSetup message includes configuration information for each service/bearer/RLC layer, each logical channel, or each bearer. Whether to use ROHC for each bearer/logical channel, ROHC configuration information (for example, ROHC version, initial information, etc.), statusReportRequired information (information in which the gNB indicates a PDCP status report to the UE), drb-ContinueROHC information (configuration information to maintain ROHC configuration information and use ROHC configuration information as it is) may be transmitted by being included in a PDCP layer configuration information (pdcp-config). Also, the RRCConnectionSetup message contains RRC connection setup information and the like. The bearer for RRC connection is also referred to as a signaling radio bearer (SRB), and is used to transmit or receive an RRC message, which is a control message between the UE and the gNB.

The UE that has established the RRC connection transmits an RRCConnetionSetupComplete message to the gNB (1e-15). The RRCConnetionSetupComplete message includes a SERVICE REQUEST control message in which the UE requests the MME to configure a bearer for a certain service. The gNB transmits the SERVICE REQUEST message contained in the RRCConnetionSetupComplete message to the MME or the AMF (1e-20), and the MME or the AMF determines whether to provide the service requested by the UE. As a result of the determining, when the UE determines to provide the requested service, the MME or the AMF transmits an INITIAL CONTEXT SETUP REQUEST message to the gNB (1e-25). The INITIAL CONTEXT SETUP REQUEST message includes QoS information to be applied when the DRB is configured, security-related information (for example, security key, security algorithm, etc.) to be applied to the DRB, and the like.

Also, in case that the gNB does not receive UE capability information from the MME or the AMF, the gNB may transmit a UE capability information request message to the UE so as to identify the UE capability information (1e-26). When the UE receives the UE capability information request message, the UE may configure and generate a UE capability information message and report the UE capability information message to the gNB (1e-27). The UE capability information message may include what types of handover methods are supported by the UE. For example, the UE capability, that is, information about whether the UE supports or does not support the efficient handover method (dual active protocol stack (DAPS)) proposed in the present disclosure may be reported to the gNB through an indicator. When the gNB identifies the UE capability information, the gNB may define an indicator for each handover method and indicate to the UE which handover is indicated in a handover command message when indicating the UE to handover. For example, the gNB may indicate to the UE the efficient handover method (DAPS handover method) proposed in the present disclosure. As another method, the DAPS handover method may be configured for each bearer (DRB or SRB) of the UE. When the gNB configures the DAPS handover method in the UE, other handover methods are indicated together to prevent data loss or transmission delay that may occur during handover (examples of the other handover methods include a conditional handover method (a method in which a plurality of target cells are set and a plurality of conditions are set in the UE, wherein, when the above conditions are satisfied in a cell selection or reselection procedure, the UE performs a handover procedure to one target cell) or a handover method without a random access procedure). The UE may perform a handover procedure to the target base station according to the handover method indicated in the handover command message.

The gNB exchanges a SecurityModeCommand message (1e-30) and a SecurityModeComplete message (1e-35) so as to set security with the UE. When the security setting is completed, the gNB transmits an RRCConnectionReconfiguration message to the UE (1e-40).

The RRCConnectionReconfiguration message includes configuration information for each service/bearer/RLC layer, each logical channel, or each bearer. Whether to use ROHC for each bearer/logical channel, ROHC configuration information (for example, ROHC version, initial information, etc.), statusReportRequired information (information in which the gNB indicates a PDCP status report to the UE), drb-ContinueROHC information (configuration information to maintain ROHC configuration information and use ROHC configuration information as it is) may be transmitted by being included in a PDCP layer configuration information (pdcp-config). Also, the RRCConnectionReconfiguration message contains RRC connection setup information and the like. The bearer for RRC connection is also referred to as a SRB, and is used to transmit or receive an RRC message, which is a control message between the UE and the gNB.

Also, the RRCConnectionReconfiguration message includes configuration information of the DRB in which user data is to be processed, and the UE configures the DRB by applying the configuration information of the DRB and transmits an RRCConnectionReconfigurationComplete message to the gNB (1e-45). The gNB that has completed DRB configuration with the UE transmits an initial context setup complete message to the MME or the AMF (1e-50), and the MME or the AMF that has received the initial context setup complete message exchanges an S1 bearer setup message and an S1 bearer setup response message to set an S1 bearer with the S-GW (1e-55, 1e-60). The S1 bearer is a data transmission connection established between the S-GW and the gNB, and corresponds to the DRB one-to-one. When all the above processes are completed, the UE transmits or receives data through the gNB and the S-GW (1e-65, 1e-70). As such, the general data transmission process includes three steps: RRC connection configuration, security configuration, and DRB configuration. Also, the gNB may transmit an RRC connection reconfiguration message to reconfigure, add, or change the configuration of the UE for a certain reason (1e-75).

In the present disclosure, the bearer may include a SRB and a DRB. The SRB refers to a signaling radio bearer, and the DRB refers to a data radio bearer. The SRB is mainly used to transmit and receive the RRC message of the RRC layer, and the DRB is mainly used to transmit and receive user layer data. A UM DRB refers to a DRB using an RLC layer operating in an unacknowledged mode (UM) mode, and an AM DRB refers to a DRB using an RLC layer operating in an acknowledged mode (AM) mode.

In the present disclosure, the bearer for which the DAPS handover method is configured may refer to or indicate at least one of a bearer in which a bearer identifier is included in a list of bearers for which the DAPS handover method is configured or is not included in a list of bearers for which the DAPS handover method is not configured, a bearer in which a DAPS handover method configuration indicator is included in bearer-specific configuration information, or a bearer for which the DAPS handover method configuration indicator is configured in PDCP layer configuration information.

In the present disclosure, the bearer for which the DAPS handover method is not configured may refer to or indicate at least one of a bearer in which a bearer identifier is not included in a list of bearers for which the DAPS handover method is configured or is included in a list of bearers for which the DAPS handover method is not configured, a bearer in which a DAPS handover method configuration indicator is not included in bearer-specific configuration information, or a bearer for which the DAPS handover method configuration indicator is not configured in PDCP layer configuration information.

In the present disclosure, the source base station may be interpreted as a source cell (Pcell, Spcell, or SCell) or a source cell group (a cell group or a master cell group), and the target base station may be interpreted as a target cell (Pcell, Spcell, or SCell) or a target cell group (a cell group or a master cell group).

Figure 1F:
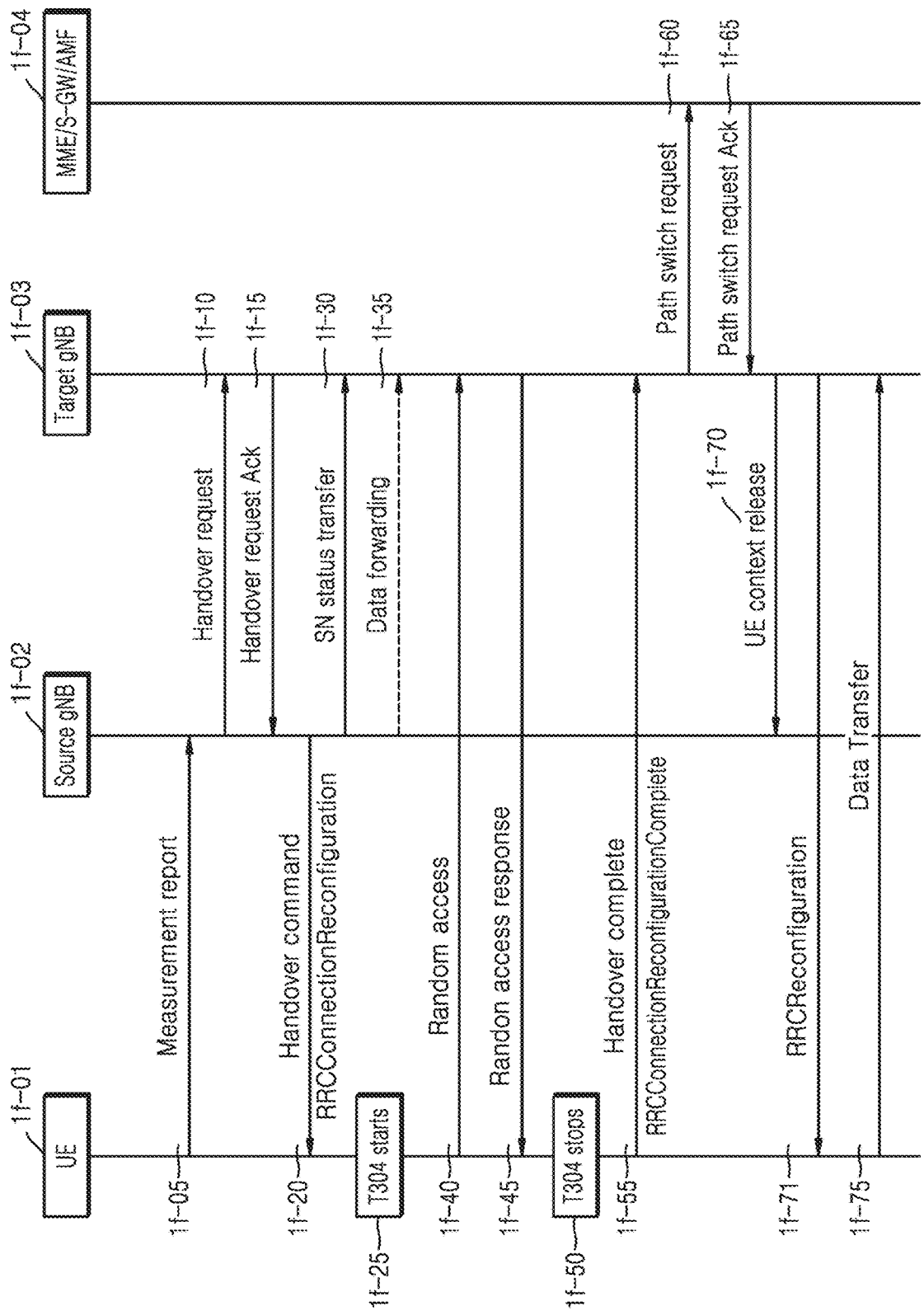
FIG. 1F is a diagram illustrating signaling procedures of performing handover proposed in the present disclosure in a next-generation mobile communication system.

FIG. 1F is a diagram illustrating signaling procedures of performing handover proposed in the present disclosure in a next-generation mobile communication system.

A UE 1*f*-01 in an RRC connected mode reports cell measurement information (Measurement Report) to a current source gNB (source eNB) 1*f*-02 when a periodic or specific event is satisfied (1*f*-05). The source gNB 1*f*-02 determines whether the UE 1*f*-01 performs handover to an adjacent cell, based on the measurement information. The handover is a technique for changing the source gNB 1*f*-02, which provides a service to the UE 1*f*-01 in a connected mode state, to another gNB (or another cell of the same gNB). When the source gNB 1*f*-02 determines handover, the source gNB 1*f*-02 requests handover by transmitting a handover (HO) request message (for example, a handover preparation information message) to a new gNB that will provide a service to the UE 1*f*-01, that is, a target gNB 1*f*-03 (1*f*-10). When the target gNB 1*f*-03 accepts the handover request, the target gNB 1*f*-03 transmits an HO request Ack message (for example, a handover command message) to the source gNB 1*f*-02 (1*f*-15). The source gNB 1*f*-02 that has received the message transmits, to the UE 1*f*-01, a handover command message (an RRCReconfiguration message included in a dedicated control channel (DCCH) of the HO request Ack message or the HO command message) (1*f*-20). The source gNB 1*f*-02 extracts the HO command message from the message received from the target gNB 1*f*-03 and transmits the extracted HO command message to the UE 1*f*-01 by using an RRC connection reconfiguration message (1*f*-20).

The present disclosure proposes a method of determining an efficient DAPS handover method proposed in the present disclosure by using two messages (the handover preparation information message (1*f*-10) and the handover command message (1*f*-15)) when the source gNB 1*f*-02 transmits the handover preparation information message 1*f*-10 and, in response thereto, the target gNB 1*f*-03 transmits the handover command message 1*f*-15 to the source gNB 1*f*-02.

A first embodiment of determining the efficient DAPS handover method proposed by the present disclosure is as follows.

In the first embodiment, a subject that determines the DAPS handover method may be the source gNB 1*f*-02. Also, in the first embodiment of the present disclosure, in case that the source gNB 1*f*-02 requests the DAPS handover method from the target gNB 1*f*-03, the target gNB 1*f*-03 may always indicate or perform the DAPS handover method.

The source gNB 1*f*-02 may define a new indicator in the handover preparation information message, may indicate the target gNB 1*f*-03 that the source gNB 1*f*-02 will perform the DAPS handover method proposed in the present disclosure, and may request the DAPS handover method. The handover preparation information message may include current bearer configuration information, security key information of the UE 1*f*-01, cell group configuration information, or capability information of the UE 1*f*-01. The source gNB 1*f*-02 may know in advance whether the target gNB 1*f*-03 supports the DAPS handover method by sharing the capabilities of the target gNB 1*f*-03 in an implementation manner The source gNB 1*f*-02 may indicate the target gNB 1*f*-03 to perform the DAPS handover method, may notify the target gNB 1*f*-03 that the source gNB 1*f*-02 may perform quick or early data forwarding, and may indicate the target gNB 1*f*-03 to prepare to receive and process quick or early data forwarding. The source gNB 1*f*-02 may request the DAPS handover method for each bearer (DRB or SRB).

In case that the target gNB 1*f*-03 receives the handover preparation information message and identifies that the indicator for requesting the DAPS handover method is included, the target gNB 1*f*-03 may configure an RRCReconfiguration message including an indicator indicating the DAPS handover method when configuring the RRCReconfiguration message to indicate handover to the UE 1*f*-01, and including bearer configuration information, security key information, cell group configuration information, or system information required when the UE 1*f*-01 performs the DAPS handover method. The target gNB 1*f*-03 may transmit the configured RRCReconfiguration message to the source gNB 1*f*-02 by including the configured RRCReconfiguration message in the DL-DCCH message of the handover command message. The target gNB 1*f*-03 may indicate the DAPS handover method for each bearer (DRB or SRB).

When the source gNB 1*f*-02 receives the handover command message, the source gNB 1*f*-02 may extract the RRCReconfiguration message included in the handover command message and indicate handover by transmitting the RRCReconfiguration message to the UE 1*f*-01. The source gNB 1*f*-02 may identify the indicated DAPS handover method for each bearer and perform the DAPS handover method for each bearer (DRB or SRB).

A second embodiment of determining the efficient DAPS handover method proposed by the present disclosure is as follows.

In the second embodiment of the present disclosure, a subject that determines the DAPS handover method may be the target gNB 1*f*-03. Also, in the second embodiment of the present disclosure, in case that the source gNB 1*f*-02 requests the DAPS handover method to the target gNB 1*f*-03 by using the indicator, the target gNB 1*f*-03 may reject or accept the request or indicate the source gNB 1*f*-02 by indicating another handover method in the handover command message.

The source gNB 1*f*-02 may define a new indicator in the handover preparation information message, may indicate the target gNB 1*f*-03 that the source gNB 1*f*-02 will perform the DAPS handover method proposed in the present disclosure, and may request the DAPS handover method. The handover preparation information message may include current bearer configuration information of the UE 1*f*-01, security key information, cell group configuration information, or capability information of the UE 1*f*-01. The source gNB 1*f*-02 may know in advance whether the target gNB 1*f*-03 supports the DAPS handover method by sharing the capabilities of the target gNB 1*f*-03 in an implementation manner The source gNB 1*f*-02 may indicate the target gNB 1*f*-03 to perform the DAPS handover method, may notify the target gNB 1*f*-03 that the source gNB 1*f*-02 may perform quick or early data forwarding, and may indicate the target gNB 1*f*-03 to prepare to receive and process quick or early data forwarding. The source gNB 1*f*-02 may request the DAPS handover method for each bearer (DRB or SRB).

In case that the target gNB 1*f*-03 receives the handover preparation information message and identifies that an indicator requesting the DAPS handover method is included, the target gNB 1f-03 may reject or accept the request for the DAPS handover of the source gNB 1f-02 or indicate another handover method to the source gNB 1f-02, according to whether the DAPS handover method is supported, the amount of current transmission resources, or scheduling. The target gNB 1f-03 may transmit an indicator that rejects or accepts the request for the DAPS handover or an indicator that indicates a different type of handover method by including the indicator in the handover command message. The target gNB 1f-03 may configure the RRCReconfiguration message to indicate handover to the UE 1f-01, wherein the RRCReconfiguration message includes the indicator indicating the DAPS handover method when the request for the DAPS handover is accepted, includes the indicator indicating another handover method when the request for the DAPS handover is rejected, and includes bearer configuration information, security key information, or cell group configuration information, or system information necessary when the UE 1f-01 performs the DAPS handover method or another handover method. Also, the target gNB 1f-03 may transmit the configured RRCReconfiguration message to the source gNB 1f-02 by including the configured RRCReconfiguration message in the DL-DCCH message of the handover command message. The target gNB 1f-03 may indicate the DAPS handover method for each bearer (DRB or SRB).

When the source gNB 1f-02 receives the handover command message, the source gNB 1f-02 may identify whether the request for the DAPS handover method is accepted or rejected by identifying the indicator included in the handover command message. In case that the request for the DAPS handover method is accepted, the source gNB 1f-02 may perform the DAPS handover method, may extract the RRCReconfiguration message included in the handover command message, and may indicate handover by transmitting the RRCReconfiguration message to the UE 1f-01. When the indicator included in the handover command message is identified and the request for the DAPS handover method is rejected, or when another handover method is indicated, the source gNB 1f-02 may perform another handover method indicated by the target gNB 1f-03. Also, the source gNB 1f-02 may extract the RRCReconfiguration message included in the handover command message and indicate handover by transmitting the RRCReconfiguration message to the UE 1f-01. As another method, even when there is no separate indicator in the handover command message, the source gNB 1f-02 may read the RRCReconfiguration message included in the handover command message, may identify which handover method is indicated by the target gNB 1f-03, and may identify whether the request for the DAPS handover method is accepted or rejected. The source gNB 1f-02 may perform the handover method indicated in the RRCReconfiguration message (for example, the DAPS handover method or another handover method). The source gNB 1f-02 may identify the indicated DAPS handover method for each bearer and perform the DAPS handover method for each bearer (DRB or SRB).

A third embodiment of determining the efficient DAPS handover method proposed by the present disclosure is as follows.

In the third embodiment of the present disclosure, a subject that determines the DAPS handover method may be the target gNB. Also, in the third embodiment of the present disclosure, the target gNB 1f-03 may identify the capability of the UE 1f-01, and may determine the handover method (for example, the DAPS handover method) according to whether the target gNB 1f-03 is able to support the DAPS handover method, the amount of current transmission resources, or scheduling.

The source gNB 1f-02 may transmit a message for requesting handover to the target gNB 1f-03 by including current bearer configuration information of the UE 1f-01, security key information, cell group configuration information, or capability information of the UE 1f-01 in the handover preparation information message. The source gNB 1f-02 may know in advance whether the target gNB 1f-03 supports the DAPS handover method by sharing the capabilities of the target gNB 1f-03 in an implementation manner In case that the target gNB 1f-03 indicates to perform the DAPS handover method, the source gNB 1f-02 may perform quick or early data forwarding.

The target gNB 1f-03 may receive the handover preparation information message, and may determine the handover method (for example, the DAPS handover method) according to the capability information of the UE 1f-01, whether the target gNB 1f-03 is able to support the DAPS handover method, the amount of current transmission resources, or scheduling. In case that the target gNB 1f-03 determines the DAPS handover method, the target gNB 1f-03 may transmit the handover command message by including the indicator indicating the DAPS handover method in the handover command message. The target gNB 1f-03 may configure the RRCReconfiguration message to indicate handover to the UE 1f-01, wherein the RRCReconfiguration message includes the indicator indicating the DAPS handover method when the DAPS handover is determined, includes the indicator indicating another handover method when handover methods other than the DAPS handover are determined, and includes bearer configuration information, security key information, or cell group configuration information, or system information necessary when the UE 1f-01 performs the DAPS handover method or another handover method. The target gNB 1f-03 may transmit the configured RRCReconfiguration message to the source gNB 1f-02 by including the configured RRCReconfiguration message in the DL-DCCH message of the handover command message. The target gNB 1f-03 may indicate the DAPS handover method for each bearer (DRB or SRB).

When the source gNB 1f-02 receives the handover command message, the source gNB 1f-02 may identify whether the DAPS handover is determined by identifying the indicator included in the handover command message. In case that the DAPS handover method is indicated, the source gNB 1f-02 may perform the DAPS handover method, may extract the RRCReconfiguration message included in the handover command message, and may indicate handover by transmitting the RRCReconfiguration message to the UE 1f-01. When the indicator included in the handover command message is identified and the DAPS handover method is not determined, or when another handover method is indicated, the source gNB 1f-02 may perform another handover method indicated by the target gNB 1f-03. Also, the source gNB 1f-02 may extract the RRCReconfiguration message included in the handover command message and indicate handover by transmitting the RRCReconfiguration message to the UE 1*f*-01. As another method, even when there is no separate indicator in the handover command message, the source gNB 1*f*-02 may read the RRCReconfiguration message included in the handover command message, may identify which handover method is indicated by the target gNB 1*f*-03, may identify whether the DAPS handover method is determined, and in case that another handover method is indicated, may perform the indicated handover method. The source gNB 1*f*-02 may identify the indicated DAPS handover method for each bearer and perform the DAPS handover method for each bearer (DRB or SRB).

A new embodiment may be extended by combining the methods of the first embodiment, the second embodiment, or the third embodiment of determining the efficient DAPS handover method proposed in the present disclosure.

According to an embodiment, in the RRCReconfiguration message, the gNB may indicate to the UE 1*f*-01 the efficient handover method (DAPS handover method) proposed in the present disclosure. As another method, the gNB may set the DAPS handover method for each bearer (DRB or SRB) of the UE 1*f*-01. For example, in the RRC message, a new indicator indicating an efficient handover method (DAPS handover method) may be defined in bearer configuration information, PDCP configuration information, or RLC configuration information for each bearer identifier or logical channel identifier, and the gNB may indicate the efficient handover method to the UE 1*f*-01 for each bearer or each logical channel identifier by using the indicator. When the gNB configures the DAPS handover method in the UE, other handover methods are indicated together to prevent data loss or transmission delay that may occur during handover (examples of the other handover methods include a conditional handover method (a method in which a plurality of target cells are set and a plurality of conditions are set in the UE 1*f*-01, wherein, when the above conditions are satisfied in a cell selection or reselection procedure, the UE 1*f*-01 performs a handover procedure to one target cell) or a handover method without a random access procedure).

Upon receiving the RRCReconfiguration message, the UE 1*f*-01 stops or continues to perform data transmission and reception with the source gNB 1*f*-02 according to the set handover method, and starts a T304 timer. In case that the UE 1*f*-01 does not succeed in handover to the target gNB 1*f*-03 for a certain time (for example, when the T304 timer has expired), T304 returns to the original setting of the UE 1*f*-01 and switches the UE 1*f*-01 to an RRC idle state. Also, the UE 1*f*-01 may trigger the RRC connection re-establishment procedure. When the efficient handover method is configured and the connection with the source gNB 1*f*-02 is valid, the UE 1*f*-01 may perform fallback and report a handover failure to the source gNB 1*f*-02. The source gNB 1*f*-02 transmits a sequence number (SN) status for uplink/downlink data for each bearer (for example, each RLC UM bearer or each RLC AM bearer). When there is downlink or uplink data, the source gNB 1*f*-02 transmits the downlink or uplink data to the target gNB 1*f*-03 (1*f*-30, 1*f*-35). The UE 1*f*-01 attempts random access to the target cell indicated by the source gNB 1*f*-02 (1*f*-40). The random access is for notifying the target cell that the UE 1*f*-01 moves through handover and matching uplink synchronization. For the random access, the UE 1*f*-01 transmits, to the target cell, a preamble ID provided from the source gNB 1*f*-02 or a preamble corresponding to a randomly selected preamble ID. After a specific number of subframes have passed from the transmission of the preamble, the UE 1*f*-01 monitors whether a random access response (RAR) message is transmitted from the target cell. A time interval for monitoring the RAR message is referred to as a RAR window. When the RAR is received during the monitoring time interval (1*f*-45), the UE 1*f*-01 transmits an HO complete message to the target gNB 1*f*-03 as an RRC reconfiguration complete message (1*f*-55). As described above, when the UE 1*f*-01 successfully receives the RAR from the target gNB 1*f*-03, the UE 1*f*-01 stops the T304 timer (1*f*-50).

The target gNB 1*f*-03 requests the core network 1*f*-04 (that is, MME/S-GW/AMF) to modify the paths of the bearers so as to modify the paths of the bearers set as the source gNB 1*f*-02 (1*f*-60, 1*f*-65), and notifies the source gNB 1*f*-02 to delete the UE context of the UE 1*f*-01 (1*f*-70). The target gNB 1*f*-03 may transmit an RRC message (for example, an RRCReconfiguration message) 1*f*-71 to the UE 1*f*-01 so as to indicate the release of the connection with the source gNB 1*f*-02 by using an indicator. According to another method, the target gNB 1*f*-03 may transmit MAC control information, RLC control information, or PDCP control information to the UE 1*f*-01 so as to indicate the release of the connection with the source gNB 1*f*-02. The UE 1*f*-01 attempts to receive data from the start time point of the RAR window with respect to the target gNB 1*f*-03. After receiving the RAR, the UE 1*f*-01 transmits an RRC reconfiguration complete message to the target gNB 1*f*-03, receives a downlink transmission resource or an uplink transmission resource, and starts data transmission and reception with the target gNB 1*f*-03.

According to an embodiment, methods applicable when the gNB configures or indicates the second embodiment (DAPS handover method) proposed in the present disclosure to the UE 1*f*-01 by using the handover command message or the RRC message (for example, RRCReconfiguration message) are as follows. In the present disclosure, when the gNB configures the DAPS handover method in the UE 1*f*-01, or when the UE 1*f*-01 receives, from the gNB, the handover command message that configures the DAPS handover method, a method applied by applying one or more of the following methods may be performed.

Method 1-1: When attempting to indicate or configure handover to the UE 1*f*-01, the gNB (the source gNB 1*f*-02, the target gNB 1*f*-03, the LTE base station, or the NR base station) may include mobility Control Info or Reconfiguration With Sync configuration information in the RRCReconfiguration message. The gNB may define an indicator in SRB-ToAddMod or DRB-ToAddMod of SRB-ToAddModList or DRB-ToAddModList in the bearer configuration information (Radio Resource Config Dedicated or Radio Bearer Config) of the RRCReconfiguration message, and may indicate the DAPS handover method for each bearer (each SRB or DRB) through the defined indicator. Also, the gNB may define an indicator in pdcp-config of SRB-ToAddMod or DRB-ToAddMod and indicate the DAPS handover method for each bearer. Also, in the case of the LTE, when the LTE base station indicates or configures handover in the UE 1*f*-01 with the LTE RRCReconfiguration message, pdcp-config is not defined in SRB-ToAddMod and the use of default PDCP layer configuration is set. Therefore, the LTE base station may define the indicator in SRB-ToAddMod for the SRB, may configure the DAPS handover method for each bearer, may define the indicator in pdcp-config of DRB-ToAddMod for the DRBs, and may configure the DAPS handover method for each bearer.

The UE **1*f*-01 may perform the DAPS handover method for the bearer in which the DAPS handover method is configured, for each bearer, according to the configuration indicated in the received handover command message (RRCReconfiguration message), and may perform a general handover method for the bearer for which the DAPS handover method is not configured. Also, In case that mobility Control Info or Reconfiguration With Sync configuration information of the handover command message includes an indicator indicating or configuring the type of the handover method for the UE 1*f*-01 (for example, MakeBeforeBreak handover, rach-skip handover, RACH-less handover, or conditional handover CHO) and the DAPS handover method is configured for each bearer, the UE 1*f*-01 may apply the DAPS handover method in preference to other types of handover methods when performing the handover procedure for each bearer. For example, the UE 1*f*-01 may perform the DAPS handover method for the bearer for which the DAPS handover method is configured, for each bearer, according to the configuration. For the bearer for which the DAPS handover method is not configured, the UE 1*f*-01 may perform the handover method configured according to the indicator indicating or configuring the type of the handover method for the UE 1*f*-01 (for example, MakeBeforeBreak handover, rach-skip handover, RACH-less handover, or conditional handover CHO) in mobility Control Info or Reconfiguration With Sync configuration information of the handover command message. Also, in order to reduce the complexity of implementing the UE 1*f*-01, in case that the DAPS handover method is configured in at least one bearer or a certain bearer, the type of other handover method for the UE 1*f*-01 (for example, MakeBeforeBreak handover, rach-skip handover, RACH-less handover, or conditional handover CHO) in mobility Control Info or Reconfiguration With Sync configuration information of the handover command message may be set not to be indicated or configured. Also, in case that the UE 1*f*-01** receives the handover command message (RRCReconfiguration message) and the DAPS handover method is configured for at least one bearer or a certain bearer for each bearer in the handover command message (RRCReconfiguration message), the RRC layer, SDAP layer, MAC layer, PHY layer, or SRB processing method of performing the DAPS handover method proposed in the present disclosure may be applied. For each bearer for which the DAPS handover method is configured, the PDCP layer or RLC layer processing method of performing the DAPS handover method proposed in the present disclosure may be applied.

Method 1-2: When attempting to indicate or configure handover to the UE **1*f*-01, the gNB (the source gNB 1*f*-02, the target gNB 1*f*-03, the LTE base station, or the NR base station) may include mobility Control Info or Reconfiguration With Sync configuration information in the RRCReconfiguration message. The base station may define an indicator in DRB-ToAddMod of DRB-ToAddModList in the bearer configuration information (Radio Resource Config Dedicated or Radio Bearer Config) of the RRCReconfiguration message, and may indicate the DAPS handover method for each bearer (DRB) through the defined indicator. For SRBs, a separate indicator for configuring the DAPS handover method may not be introduced. That is, in case that the DAPS handover method is configured in the UE 1*f*-01** for at least one bearer (DRB) or a certain bearer (DRB) for each bearer in the received handover command message (RRCReconfiguration message), the SRB processing method of performing the DAPS handover method proposed in the present disclosure may be applied. Also, the gNB may define an indicator in pdcp-config of DRB-ToAddMod and indicate the DAPS handover method for each bearer.

The UE **1*f*-01 may perform the DAPS handover method for the bearer for which the DAPS handover method is configured, for each bearer, according to the configuration indicated in the received handover command message (RRCReconfiguration message), and may perform a general handover method for the bearer for which the DAPS handover method is not configured. Also, in case that mobility Control Info or Reconfiguration With Sync configuration information of the handover command message includes an indicator indicating or configuring the type of the handover method for the UE 1*f*-01 (for example, MakeBeforeBreak handover, rach-skip handover, RACH-less handover, or conditional handover CHO) and the DAPS handover method is configured for each bearer, the UE 1*f*-01 may apply the DAPS handover method in preference to other types of handover methods when performing the handover procedure for each bearer. For example, the UE 1*f*-01 may perform the DAPS handover method for the bearer for which the DAPS handover method is configured, for each bearer, according to the configuration. For the bearer for which the DAPS handover method is not configured, the UE 1*f*-01 may perform the handover method configured according to the indicator indicating or configuring the type of the handover method for the UE 1*f*-01 (for example, MakeBeforeBreak handover, rach-skip handover, RACH-less handover, or conditional handover CHO) in mobility Control Info or Reconfiguration With Sync configuration information of the handover command message. Also, in order to reduce the complexity of implementing the UE 1*f*-01, in case that the DAPS handover method is configured in at least one bearer or a certain bearer, the type of other handover method for the UE 1*f*-01 (for example, MakeBeforeBreak handover, rach-skip handover, RACH-less handover, or conditional handover CHO) in mobility Control Info or Reconfiguration With Sync configuration information of the handover command message may be set not to be indicated or configured. Also, in case that the UE 1*f*-01** receives the handover command message (RRCReconfiguration message) and the DAPS handover method is configured for at least one bearer or a certain bearer for each bearer in the handover command message (RRCReconfiguration message), the RRC layer, SDAP layer, MAC layer, PHY layer, or SRB processing method for performing the DAPS handover method proposed in the present disclosure may be applied. For each bearer for which the DAPS handover method is configured, the PDCP layer or RLC layer processing method for performing the DAPS handover method proposed in the present disclosure may be applied.

Method 2-1: When attempting to indicate or configure handover to the UE **1*f*-01, the gNB (the source gNB 1*f*-02, the target gNB 1*f*-03, the LTE base station, or the NR base station) may include mobility Control Info or Reconfiguration With Sync configuration information in the RRCReconfiguration message. The gNB may define and include an indicator indicating or configuring the DAPS handover method in mobility Control Info or Reconfiguration With Sync, and may use the indicator to indicate that the DAPS handover method is configured for at least one bearer or a certain bearer. Also, the gNB may define an indicator in SRB-ToAddMod or DRB-ToAddMod of SRB-ToAddModList or DRB-ToAddModList in the bearer configuration information (Radio Resource Config Dedicated or Radio Bearer Config) of the RRCReconfiguration message and may indicate the DAPS handover method for each bearer (each SRB or DRB). Also, the gNB may define an indicator in pdcp-config of SRB-ToAddMod or DRB-ToAddMod and indicate the DAPS handover method for each bearer. Also, in the case of the LTE, in case that the LTE base station indicates or configures handover in the UE 1f-01** with the LTE RRCReconfiguration message, pdcp-config is not defined in SRB-ToAddMod and the use of default PDCP layer configuration is set. Therefore, the LTE base station may define the indicator in SRB-ToAddMod for the SRB, may configure the DAPS handover method for each bearer, may define the indicator in pdcp-config of DRB-ToAddMod for the DRBs, and may configure the DAPS handover method for each bearer.

The UE 1f-01 may perform the DAPS handover method for the bearer for which the DAPS handover method is configured, for each bearer, according to the configuration indicated in the received handover command message (RRCReconfiguration message), and may perform a general handover method for the bearer for which the DAPS handover method is not configured. Also, in case that mobility Control Info or Reconfiguration With Sync configuration information of the handover command message includes an indicator indicating or configuring the type of the handover method for the UE 1f-01 (for example, MakeBeforeBreak handover, rach-skip handover, RACH-less handover, or conditional handover CHO) and the DAPS handover method is configured for each bearer, the UE 1f-01 may apply the DAPS handover method in preference to other types of handover methods when performing the handover procedure for each bearer. For example, the UE 1f-01 may perform the DAPS handover method for the bearer for which the DAPS handover method is configured, for each bearer, according to the configuration. For the bearer for which the DAPS handover method is not configured, the UE 1f-01 may perform the handover method configured according to the indicator indicating or configuring the type of the handover method for the UE 1f-01 (for example, MakeBeforeBreak handover, rach-skip handover, RACH-less handover, or conditional handover CHO) in mobility Control Info or Reconfiguration With Sync configuration information of the handover command message. Also, in order to reduce the complexity of implementing the UE 1f-01, in case that the DAPS handover method is configured in at least one bearer or a certain bearer, the type of other handover method for the UE 1f-01 (for example, MakeBeforeBreak handover, rach-skip handover, RACH-less handover, or conditional handover CHO) in mobility Control Info or Reconfiguration With Sync configuration information of the handover command message may be set not to be indicated or configured. Also, in case that the UE 1f-01 receives the handover command message (RRCReconfiguration message) and the indicator indicating or configuring the DAPS handover method is included (or configured) in mobility Control Info or Reconfiguration With Sync in the handover command message (RRCReconfiguration message), the RRC layer, SDAP layer, MAC layer, PHY layer, or SRB processing method of performing the DAPS handover method proposed in the present disclosure may be applied. For each bearer for which the DAPS handover method is configured, the PDCP layer or RLC layer processing method of performing the DAPS handover method proposed in the present disclosure may be applied.

Method 2-2: When attempting to indicate or configure handover to the UE 1f-01, the gNB (the source gNB 1f-02, the target gNB 1f-03, the LTE base station, or the NR base station) may include mobility Control Info or Reconfiguration With Sync configuration information in the RRCReconfiguration message. The gNB may define and include an indicator indicating or configuring the DAPS handover method in mobility Control Info or Reconfiguration With Sync, and may use the indicator to indicate that the DAPS handover method is configured for at least one bearer or a certain bearer. Also, the gNB may define an indicator in DRB-ToAddMod of DRB-ToAddModList in the bearer configuration information (Radio Resource Config Dedicated or Radio Bearer Config) of the RRCReconfiguration message, and may indicate the DAPS handover method for each bearer (DRB). For SRBs, a separate indicator for configuring the DAPS handover method may not be introduced. That is, in case that the UE 1f-01 receives the handover command message (RRCReconfiguration message) and the DAPS handover method is configured for at least one bearer (DRB) or a certain bearer (DRB) for each bearer in the handover command message (RRCReconfiguration message), the SRB processing method of performing the DAPS handover method proposed in the present disclosure may be applied. Also, the gNB 1f-03 may define an indicator in pdcp-config of DRB-ToAddMod and indicate the DAPS handover method for each bearer.

The UE 1f-01 may perform the DAPS handover method for the bearer for which the DAPS handover method is configured, for each bearer, according to the configuration indicated in the received handover command message (RRCReconfiguration message), and may perform a general handover method for the bearer for which the DAPS handover method is not configured. Also, in case that mobility Control Info or Reconfiguration With Sync configuration information of the handover command message includes an indicator indicating or configuring the type of the handover method for the UE 1f-01 (for example, MakeBeforeBreak handover, rach-skip handover, RACH-less handover, or conditional handover CHO) and the DAPS handover method is configured for each bearer, the UE 1f-01 may apply the DAPS handover method in preference to other types of handover methods when performing the handover procedure for each bearer. For example, the UE 1f-01 may perform the DAPS handover method for the bearer for which the DAPS handover method is configured, for each bearer, according to the configuration. For the bearer for which the DAPS handover method is not configured, the UE 1f-01 may perform the handover method configured according to the indicator indicating or configuring the type of the handover method for the UE 1f-01 (for example, MakeBeforeBreak handover, rach-skip handover, RACH-less handover, or conditional handover CHO) in mobility Control Info or Reconfiguration With Sync configuration information of the handover command message. Also, in order to reduce the complexity of implementing the UE 1f-01, in case that the DAPS handover method is configured in at least one bearer or a certain bearer, the type of other handover method for the UE 1f-01 (for example, MakeBeforeBreak handover, rach-skip handover, RACH-less handover, or conditional handover CHO) in mobility Control Info or Reconfiguration With Sync configuration information of the handover command message may be set not to be indicated or configured. Also, in case that the UE 1f-01 receives the handover command message (RRCReconfiguration message) and the indicator indicating or configuring the DAPS handover method is included (or configured) in mobility Control Info or Reconfiguration With Sync in the handover command message (RRCReconfiguration message), the RRC layer, SDAP layer, MAC layer, PHY layer, or SRB processing method of performing the DAPS handover method proposed in the present disclosure may be applied. For each bearer for which the DAPS handover method is configured, the PDCP layer or RLC layer processing method of performing the DAPS handover method proposed in the present disclosure may be applied.

> Method 3-1: When attempting to indicate or configure handover to the UE 1f-01, the gNB (the source gNB 1f-02, the target gNB 1f-03, the LTE base station, or the NR base station) may include mobility Control Info or Reconfiguration With Sync configuration information in the RRCReconfiguration message. The gNB may define and include an indicator indicating or configuring the DAPS handover method in mobility Control Info or Reconfiguration With Sync, and may use the indicator to indicate that the DAPS handover method is configured for at least one bearer or a certain bearer. Also, the gNB may configure and include a list of bearers for which the DAPS handover method is configured in mobility Control Info or Reconfiguration With Sync, may include identifiers (SRB or DRB) of bearers for which the DAPS handover method is configured in the list of bearers, and may indicate whether to configure the DAPS handover method for each bearer. Also, the gNB may configure and include a list of bearers for which the DAPS handover method is not configured in mobility Control Info or Reconfiguration With Sync, may include identifiers (SRB or DRB) of bearers for which the DAPS handover method is not configured in the list of bearers, and may indicate whether to configure the DAPS handover method for each bearer.

The UE 1f-01 may perform the DAPS handover method on the bearer for which the DAPS handover method is configured, the bearer whose identifier is included in the list of bearers for which the DAPS handover method is configured, or the bearer whose identifier is not included in the list of bearers for which the DAPS handover method is not configured, for each bearer according to the configuration indicated in the received handover command message (RRCReconfiguration message), and the UE 1f-01 may perform the general handover method on the bearer for which the DAPS handover method is not configured, the bearer whose identifier is not included in the list of bearers for which the DAPS handover method is configured, and the bearer whose identifier is included in the list of bearers for which the DAPS handover method is not configured. Also, in case that mobility Control Info or Reconfiguration With Sync configuration information of the handover command message includes an indicator indicating or configuring the type of the handover method for the UE 1f-01 (for example, Make-BeforeBreak handover, rach-skip handover, RACH-less handover, or conditional handover CHO) and the DAPS handover method is configured for each bearer, the UE 1f-01 may apply the DAPS handover method in preference to other types of handover methods when performing the handover procedure for each bearer. For example, the UE 1f-01 may perform the DAPS handover method on the bearer for which the DAPS handover method is configured, the bearer whose identifier is included in the list of bearers for which the DAPS handover method is configured, or the bearer whose identifier is not included in the list of bearers for which the DAPS handover method is not configured, for each bearer, according to the configuration. The UE 1f-01 may perform the handover method, which is set according to the indicator indicating or configuring the type of the handover method for the UE 1f-01 (for example, MakeBeforeBreak handover, rach-skip handover, RACH-less handover, or conditional handover CHO) in mobility Control Info or Reconfiguration With Sync configuration information of the handover command message, on the bearer for which the DAPS handover method is not configured, the bearer whose identifier is not included in the list of bearers for which the DAPS handover method is configured, or the bearer whose identifier is included in the list of bearers for which the DAPS handover method is not configured. Also, in order to reduce the complexity of implementing the UE 1f-01, in case that the DAPS handover method is configured in at least one bearer or a certain bearer, the type of other handover method for the UE 1f-01 (for example, MakeBeforeBreak handover, rach-skip handover, RACH-less handover, or conditional handover CHO) in mobility Control Info or Reconfiguration With Sync configuration information of the handover command message may be set not to be indicated or configured. Also, in case that the handover command message (RRCReconfiguration message) is received and the indicator indicating or configuring the DAPS handover method is included (or configured) in mobility Control Info or Reconfiguration With Sync of the handover command message (RRCReconfiguration message), the UE 1f-01 may apply the RRC layer, SDAP layer, MAC layer, PHY layer, or SRB processing method of performing the DAPS handover method proposed in the present disclosure. The UE 1f-01 may apply, for each bearer, the PDCP layer or RLC layer processing method of performing the DAPS handover method proposed in the present disclosure on the bearer for which the DAPS handover method is configured, the bearer whose identifier is included in the list of bearers for which the DAPS handover method is configure, or the bearer whose identifier is not included in the list of bearers for which the DAPS handover method is not configured.

> Method 3-2: When attempting to indicate or configure handover to the UE 1f-01, the gNB (the source gNB 1f-02, the target gNB 1f-03, the LTE base station, or the NR base station) may include mobility Control Info or Reconfiguration With Sync configuration information in the RRCReconfiguration message. The gNB may define and include an indicator indicating or configuring the DAPS handover method in mobility Control Info or Reconfiguration With Sync, and may use the indicator to indicate that the DAPS handover method is configured for at least one bearer or a certain bearer. Also, the gNB may configure and include a list of bearers for which the DAPS handover method is configured in mobility Control Info or Reconfiguration With Sync, may include identifiers (SRB or DRB) of bearers for which the DAPS handover method is configured in the list of bearers, and may indicate whether to configure the DAPS handover method for each bearer. Also, the gNB may configure and include a list of bearers for which the DAPS handover method is not configured in mobility Control Info or Reconfiguration With Sync, may include identifiers (SRB or DRB) of bearers for which the DAPS handover method is not configured in the list of bearers, and may indicate whether to configure the DAPS handover method for each bearer. Also, a separate indicator for configuring the DAPS handover method may not be introduced for SRBs. That is, in case that the UE 1f-01 receives the handover command message (RRCReconfiguration message) and the DAPS handover method is configured for at least one bearer (DRB) or a certain bearer (DRB) for each bearer in the handover command message (RRCReconfiguration message), the SRB processing method of performing the DAPS handover method proposed in the present disclosure may be applied.

The UE 1*f*-01 may perform the DAPS handover method on the bearer for which the DAPS handover method is configured, the bearer whose identifier is included in the list of bearers for which the DAPS handover method is configured, or the bearer whose identifier is not included in the list of bearers for which the DAPS handover method is not configured, for each bearer according to the configuration indicated in the received handover command message (RRCReconfiguration message), and the UE 1*f*-01 may perform the general handover method on the bearer for which the DAPS handover method is not configured, the bearer whose identifier is not included in the list of bearers for which the DAPS handover method is configured, and the bearer whose identifier is included in the list of bearers for which the DAPS handover method is not configured. Also, in case that mobility Control Info or Reconfiguration With Sync configuration information of the handover command message includes an indicator indicating or configuring the type of the handover method for the UE 1*f*-01 (for example, MakeBeforeBreak handover, rach-skip handover, RACH-less handover, or conditional handover CHO) and the DAPS handover method is configured for each bearer, the UE 1*f*-01 may apply the DAPS handover method in preference to other types of handover methods when performing the handover procedure for each bearer. For example, the UE 1*f*-01 may perform the DAPS handover method on the bearer for which the DAPS handover method is configured, the bearer whose identifier is included in the list of bearers for which the DAPS handover method is configured, or the bearer whose identifier is not included in the list of bearers for which the DAPS handover method is not configured, for each bearer, according to the configuration. The UE 1*f*-01 may perform the handover method, which is set according to the indicator indicating or configuring the type of the handover method for the UE 1*f*-01 (for example, MakeBeforeBreak handover, rach-skip handover, RACH-less handover, or conditional handover CHO) in mobility Control Info or Reconfiguration With Sync configuration information of the handover command message, on the bearer for which the DAPS handover method is not configured, the bearer whose identifier is not included in the list of bearers for which the DAPS handover method is configured, or the bearer whose identifier is included in the list of bearers for which the DAPS handover method is not configured. Also, in order to reduce the complexity of implementing the UE 1*f*-01, in case that the DAPS handover method is configured in at least one bearer or a certain bearer, the type of other handover method for the UE 1*f*-01 (for example, MakeBeforeBreak handover, rach-skip handover, RACH-less handover, or conditional handover CHO) in mobility Control Info or Reconfiguration With Sync configuration information of the handover command message may be set not to be indicated or configured. Also, in case that the indicator indicating or configuring the DAPS handover method is included (or configured) in mobility Control Info or Reconfiguration With Sync of the received handover command message (RRCReconfiguration message), the UE 1*f*-01 may apply the RRC layer, SDAP layer, MAC layer, PHY layer, or SRB processing method of performing the DAPS handover method proposed in the present disclosure. The UE 1*f*-01 may apply, for each bearer, the PDCP layer or RLC layer processing method of performing the DAPS handover method proposed in the present disclosure on the bearer for which the DAPS handover method is configured, the bearer whose identifier is included in the list of bearers for which the DAPS handover method is configure, or the bearer whose identifier is not included in the list of bearers for which the DAPS handover method is not configured.

Hereinafter, the present disclosure proposes seamless handover methods capable of minimizing a data interruption time due to handover or reducing a data interruption time to 0 ms in a next-generation mobile communication system.

The UE 1*f*-01 may configure a plurality of first bearers with the source gNB 1*f*-02 and may perform data transmission and reception (uplink or downlink data transmission and reception) through the protocol layers (a PHY layer, a MAC layer, an RLC layer, or a PDCP layer) of the bearers, but it is assumed that the UE 1*f*-01 has one bearer in the drawings and description for convenience of description.

Figure 1G:
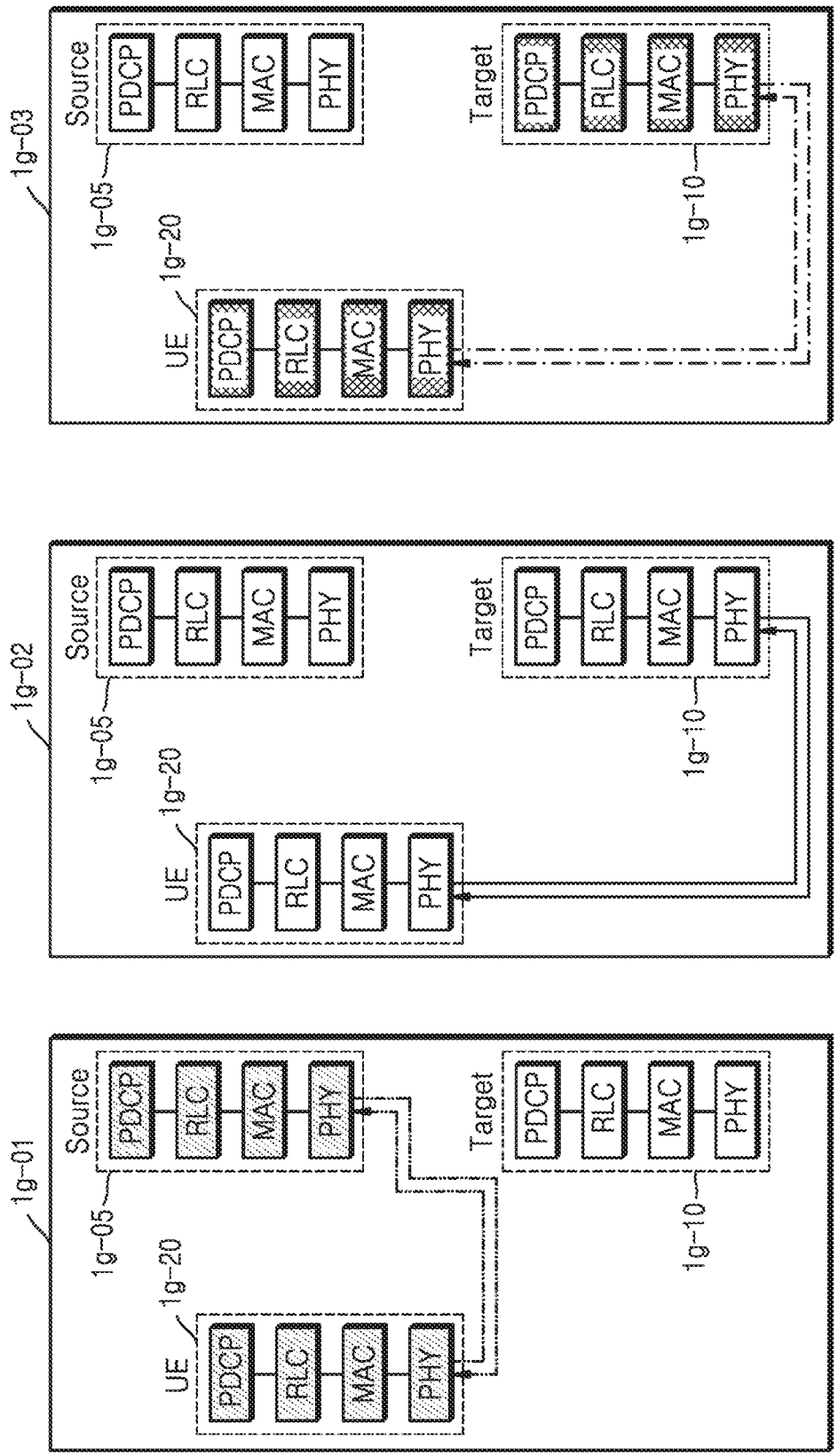
FIG. 1G illustrates specific operations of a first embodiment of an efficient handover method of minimizing a data interruption time due to handover, according to an embodiment of the present disclosure.

FIG. 1G illustrates specific operations of a first embodiment of an efficient handover method of minimizing a data interruption time due to handover according to an embodiment of the present disclosure.

According to an embodiment, in the first embodiment of the efficient handover method of FIG. 1G, in first operation 1*g*-01, when a UE 1*g*-20 receives a handover command message from a source gNB 1*g*-05 while transmitting and receiving data with the source gNB 1*g*-05, the UE 1*g*-20 may release the connection with the source gNB 1*g*-05 according to the handover method indicated in the handover command message (for example, RRCReconfiguration message), may perform a random access procedure to a target gNB 1*g*-10, and may perform a handover procedure. According to another method, the UE 1*g*-20 may continuously transmit and receive data to and from the source gNB 1*g*-05 so as to minimize a data interruption time that occurs during handover according to the indicated handover method.

According to an embodiment, in second operation 1*g*-02, the UE 1*g*-20 may stop data transmission and reception (uplink data transmission and downlink data reception) with the source gNB 1*g*-05 when the UE 1*g*-20 performs the random access procedure to the target gNB 1*g*-10 according to the handover method indicated in the handover command message received from the source gNB 1*g*-05, when a preamble is transmitted to the target gNB 1*g*-10, or when data is transmitted through an uplink transmission resource for the first time on a PUCCH or PUSCH transmission resource.

According to an embodiment, in third operation 1*g*-30, the UE 1*g*-20 may complete the random access procedure to the target gNB 1*g*-10, may transmit a handover completion message to the target gNB 1*g*-10, and may start data transmission and reception (uplink data transmission and downlink data reception) with the target gNB 1*g*-10.

According to the first embodiment of the efficient handover method of the present disclosure, a handover method performed when a DAPS handover method is not configured in the present disclosure will be described.

Figure 1H:
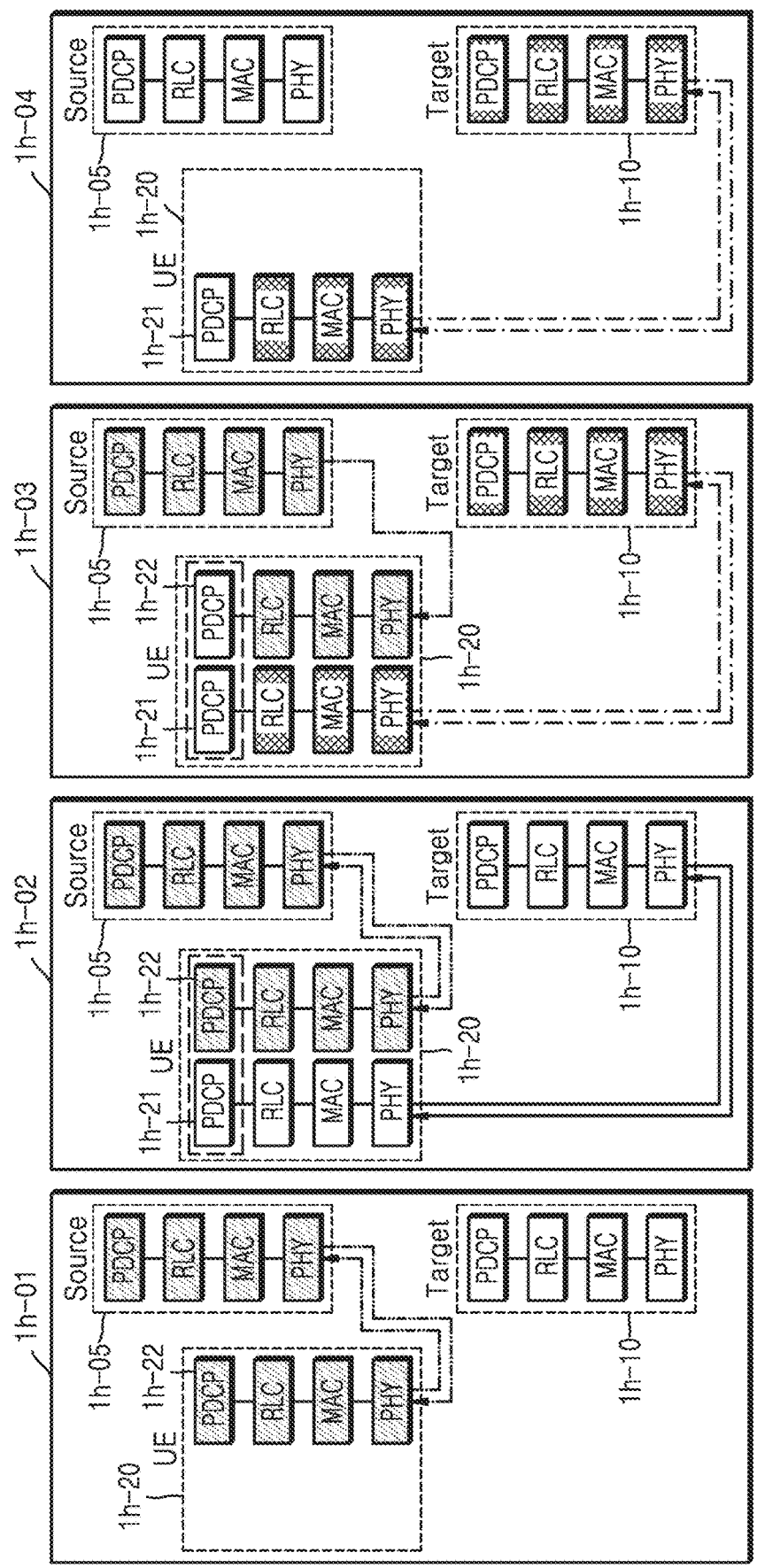
FIG. 1H illustrates specific operations of a second embodiment of an efficient handover method of minimizing a data interruption time due to handover, according to an embodiment of the present disclosure.

FIG. 1H illustrates specific operations of a second embodiment of an efficient handover method of minimizing a data interruption time due to handover, according to an embodiment of the present disclosure.

According to an embodiment, in the second embodiment of the efficient handover method of FIG. 1H, in first operation 1*h*-01, a UE 1*h*-20 may receive a handover command message from a source gNB 1*h*-05 while transmitting and receiving data with the source gNB 1*h*-05. In case that the source gNB 1h-05 indicates, in the handover command message, the handover method (for example, the DAPS handover method) according to the second embodiment of the efficient handover method proposed in the present disclosure, or indicates the overhand for each bearer, the UE 1h-20 may continuously transmit and receive data to and from the source gNB 1h-05 through protocol layers 1h-22 of a first bearer so as to minimize a data interruption time occurring during handover even when the UE 1h-20 receives the handover command message.

Also, in case that an RRC layer of the UE 1h-20 identifies, in the handover command message, the indication for the handover method (for example, the DAPS handover method) according to the second embodiment of the efficient handover method proposed in the present disclosure, or identifies an indicator for the DAPS handover method for each bearer, the RRC layer may transmit the indicator to the PDCP layer corresponding to each bearer or the bearer for which the DAPS handover method is indicated. When the PDCP layer receives the indicator, the PDCP layer may switch from a first PDCP layer structure (1i-11 or 1i-12 in FIG. 1I) to a second PDCP layer structure (1i-20 in FIG. 1I).

In first operation 1h-01 of FIG. 1H, the UE 1h-20 receives the handover command message (RRCReconfiguration message) from the gNB. Also, when switching to the second PDCP layer structure according to the configuration included in the handover command message received by the UE 1h-20, the UE 1h-20 may previously configure or establish protocol layers (a PHY layer, a MAC layer, an RLC layer, or a PDCP layer) 1h-21 of a second bearer for the target gNB 1h-10, may derive and update a security key for the target gNB 1h-10, and may configure a header (or data) compression context for the target gNB 1h-10. Also, in case that the UE 1h-20 receives the handover command message from the source gNB 1h-05 and the source gNB 1h-05 indicates the DAPS handover method proposed in the present disclosure in the handover command message, when the DAPS handover method is indicated for specific bearers, or when a PDCP reordering timer value is newly set, the UE 1h-20 may switch from the first PDCP layer structure or function (1i-11 or 1i-12 in FIG. 1I) to the second PDCP layer structure or function (1i-20 in FIG. 1I) proposed in the present disclosure for each bearer or with respect to the bearer for which the DAPS handover method is indicated. When switching from the first PDCP layer structure or function (1i-11 or 1i-12 in FIG. 1I) to the second PDCP layer structure or function (1i-20 in FIG. 1I) proposed in the present disclosure, the UE 1h-20 may update a reordering variable with a PDCP sequence number or count value expected to receive next, and may stop and restart the reordering timer.

Also, when the UE 1h-20 receives the handover command message (for example, RRC Reconfiguration message), the RRC layer of the UE 1h-20 may start a first timer (for example, T304). The first timer may be stopped when the UE 1h-20 performs a random access procedure to the target gNB 1h-10 so as to perform handover and the random access procedure is successfully completed (for example, when a first condition proposed in the present disclosure is satisfied) . When the handover fails and the first timer has expired, in case that the connection to the source gNB 1h-05 is valid, the UE 1h-20 may perform fallback, report a handover failure to the source gNB 1h-05, and attempt connection recovery. In case that the connection to the source gNB 1h-05 is invalid, the UE 1h-20 may perform an RRC connection re-establishment procedure.

The handover command message that the UE 1h-20 receives from the source gNB 1h-05 may include information for performing configuration and establishment so that the first bearer has the same bearer identifier as the second bearer, so as to prevent a data interruption time from occurring for each bearer. Also, in the second embodiment of the present disclosure, the PDCP layer of the first bearer and the PDCP layer of the second bearer may logically operate as one PDCP layer, and a more detailed operating method therefor will be described with reference to FIG. 1I.

Also, in the second embodiment of the present disclosure, in case that the UE 1h-20 is allowed to transmit uplink data to both the source gNB 1h-05 and the target gNB 1h-10, the UE 1h-20 may transmit uplink data to only one of the source gNB 1h-05 and the target gNB 1h-10 so as to prevent a problem of coverage reduction due to insufficient transmission power of the UE 1h-20 or a problem (link selection) of determining which gNB to request a transmission resource to and to transmit uplink data to when transmitting uplink data. Specifically, in the second embodiment, when the UE 1h-20 does not have the capability (dual uplink transmission) to simultaneously transmit uplink data to different gNBs at different frequencies or the same frequency, the UE 1h-20 may transmit uplink data to only one of the source gNB 1h-05 and the target gNB 1h-10 in one time unit. Therefore, the UE 1h-20 may perform a scheduling request to only one of the source gNB 1h-05 and the target gNB 1h-10, may transmit a report on the size of data to be transmitted in the PDCP layer (for example, a buffer status report) to only one of the source gNB 1h-05 and the target gNB 1h-10, and may receive an uplink transmission resource and transmit uplink data to only one gNB. Also, even when the UE 1h-20 receives the handover command message from the source gNB 1h-05, the MAC layer of the first bearer may not be reset so as to prevent data loss by continuing data transmission and reception due to HARQ retransmission. Also, in the case of the RLC layer of the AM mode, RLC retransmission may be continuously performed.

According to another method, in case that the second embodiment (DAPS handover method) of the efficient handover method proposed in the present disclosure is indicated for each bearer in the handover command message, the UE may continuously transmit or receive data to or from the source gNB 1h-05 only for the PDCP layer, the RLC layer, or the MAC layer corresponding to the bearer or logical channel identifier indicated in the second embodiment (DAPS handover method) in the handover command message, or only for data corresponding to the bearer or logical channel identifier. Also, even when the first condition proposed in the present disclosure is satisfied (for example, when uplink data transmission is switched to the target gNB 1h-10), the UE may continuously transmit or receive RLC control data (RLC status report), PDCP control data (ROHC feedback or PDCP status report), or HARQ retransmission to or from the source gNB 1h-05 only for the PDCP layer, the RLC layer, or the MAC layer corresponding to the bearer or logical channel identifier indicated in the second embodiment (DAPS handover method) in the handover command message. Also, in case that the second embodiment (DAPS handover method) of the efficient handover method proposed in the present disclosure is indicated for each bearer in the handover command message, the UE may stop data transmission or reception with the source gNB 1h-05 for the PDCP layer, the RLC layer, or the MAC layer corresponding to the bearer or logical channel identifier not indicated in the second embodiment (DAPS handover method) in the handover command message.

The UE may receive the handover command message. In an embodiment, in case that the DAPS handover method proposed in the present disclosure is indicated in the handover command message, in case that the DAPS handover method is indicated for specific bearers, in case that the DAPS handover method is configured for at least one bearer, in case that the DAPS handover method is configured for a certain bearer, or in case that mapping information between QoS flow and bearer is newly configured, the UE may switch from a first SDAP layer structure or function 1*j*-10 to a second SDAP layer structure or function 1*j*-20 proposed in the present disclosure for each bearer or with respect to the bearer indicated by the DAPS handover method.

In the second SDAP layer structure, the mapping information between the first QoS flow and the bearer for the existing source gNB is maintained, and uplink data to be transmitted to the source gNB and downlink data to be received from the source gNB are processed. The second mapping information between the QoS flow and the bearer newly configured in the handover command message may be configured for the target gNB, and may be used to process uplink data to be transmitted to the target gNB and downlink data to be received from the target gNB. That is, in the second SDAP layer structure proposed in the present disclosure, the first mapping information between the QoS flow and the bearer or the second mapping information between the QoS flow and the bearer for the source gNB is maintained, and data for the source gNB and data for the target gNB are separately processed.

According to an embodiment, the SDAP layer in the second SDAP layer structure may distinguish whether data received from a lower layer is data received from the source gNB or data received from the target gNB through a 1-bit indicator of an SDAP header, a 1-bit indicator of a PDCP header, or information indicated by the PDCP layer. In case that the gNB indicates the DAPS handover method to the UE for each bearer by using the handover command message, the gNB may always indicate the DAPS handover method for a default bearer (default DRB). In this manner, in case that data is generated during the DAPS handover procedure in a new QoS flow that does not correspond to the mapping information between the QoS flow and the bearer, the gNB may enable the UE to always transmit uplink data to the default bearer.

In case that the DAPS handover method is not configured in the default bearer, uplink data transmission for the new QoS flow generated during handover is impossible. Therefore, a data interruption time may occur. According to another method, in case that the UE receives the handover command message (for example, RRCReconfiguration message), the second embodiment (DAPS handover method) is indicated, and SDAP layer configuration information for the target gNB or the second mapping information between the QoS flow and the bearer is configured in the RRC message, the UE may apply the SDAP layer configuration information or the second mapping information between the QoS flow and the bearer when the first condition proposed in the present disclosure is satisfied. Also, when the second embodiment (DAPS handover method) is indicated for each bearer in the handover command message, the UE may maintain and apply only the first mapping information between the QoS flow and the bearer corresponding to the bearer indicated in the second embodiment when the first mapping information between the QoS flow and the bearer for the source gNB is maintained. The first mapping information between the QoS flow and the bearer corresponding to the bearer not indicated in the second embodiment may be released or not applied. When SDAP layer configuration information or the second mapping information between the QoS flow and the bearer for the target gNB are configured in the RRC message, the UE applies the SDAP layer configuration information or the second mapping information between the QoS flow and the bearer for data transmission or reception with the target gNB when the first condition proposed in the present disclosure is satisfied.

According to an embodiment, in the second embodiment of the efficient handover method of FIG. 1H, in second operation 1*h*-02, the UE 1*h*-20 may perform a random access procedure the target gNB 1*h*-10 indicated in the handover command message through the protocol layers of the second bearer. Even when the UE 1*h*-20 performs the random access procedure through the protocol layers of the second bearer, the UE 1*h*-20 may continue to perform data transmission or reception (uplink data transmission or downlink data reception) with the source gNB 1*h*-05 through the protocol layers of the first bearer. In second operation, the UE 1*h*-20 performs a cell selection or reselection procedure, and performs the random access procedure on the target cell indicated in the handover command message (RRCReconfiguration message) received from the source gNB 1*h*-05.

According to an embodiment, in the second embodiment of the efficient handover method of FIG. 1H, in third operation 1*h*-03, when the first condition is satisfied, the UE 1*h*-20 may stop transmitting uplink data to the source gNB 1*h*-05 through the protocol layers 1*h*-22 of the first bearer with respect to the bearer for which the DAPS handover method is configured, and may transmit uplink data to the target gNB 1*h*-10 through the protocol layers 1*h*-21 of the second bearer. At this time, the UE 1*h*-20 may continue to receive downlink data from the source gNB 1*h*-05 and the target gNB 1*h*-10 through the protocol layers of the first bearer and the second bearer. Third operation may be operation in which the UE 1*h*-20 switches uplink transmission from the source gNB 1*h*-05 to the target gNB 1*h*-10 when the first condition is satisfied. Specifically, the UE 1*h*-20 transmits uplink data to the source gNB 1*h*-05 through the first bearer until the first condition is satisfied, and when the first condition is satisfied, the UE 1*h*-20 stops transmitting uplink data to the source gNB 1*h*-05 through the first bearer and starts to transmit uplink data to the target gNB 1*h*-10 through the second bearer.

Specifically, in the second PDCP layer structure proposed for the bearer for which the DAPS handover method is configured in the present disclosure, in case that the first condition is satisfied while uplink data is transmitted through the first bearer, and the indicator is received from the lower layer (in case that the random access procedure from the MAC layer to the target gNB 1*h*-10 is successful) or the upper layer (in case that the first timer has expired in the RRC layer), the PDCP layer may stop uplink data transmission through the first bearer and switch to start uplink data transmission through the second bearer. Also, as in the PDCP layer structure proposed in FIG. 1I, the receiving PDCP layer 1*h*-21 of the second bearer may be driven as a single device with the receiving PDCP layer 1*h*-22 of the first bearer, and may continuously perform seamless data reception from the source gNB 1*h*-05 or the target gNB 1*h*-10 by using the stored transmission/reception data, sequence number information, or information such as header compression and decompression context. The first condition may be one of the following conditions. The first condition below proposes an uplink data transmission switching time point at which a transmission resource is most efficiently used and a data interruption time is minimized as much as possible.

The UE 1h-20 may determine that the first condition is satisfied when the UE 1h-20 successfully completes the random access procedure to the target gNB 1h-10 through the layers (for example, MAC layer) of the second bearer, when the UE 1h-20 successfully completes the random access procedure to the target gNB 1h-10 through the layers (for example, MAC layer) of the second bearer and the first uplink transmission resource is allocated from the target gNB 1h-10, or when the uplink transmission resource is indicated to the UE 1h-20 for the first time.

For example, when the UE 1h-20 receives the handover command message from the source gNB 1h-05 and, when random access to the target gNB 1h-10 is indicated, the indicated random access is a contention free random access (CFRA) procedure (for example, when a pre-specified preamble or UE (1h-20) cell identifier (for example, cell-radio network temporary identifier (C-RNTI)) is allocated),
  when the UE 1h-20 transmits the pre-specified preamble to the cell of the target gNB 1h-10 and receives a RAR message, the UE 1h-20 may determine that the random access procedure has been successfully completed. Therefore, when the UE receives (or is allocated) the first uplink transmission resource allocated (or included or indicated) in the RAR message, the UE may determine that the first condition is satisfied. According to another method, when the UE receives the uplink transmission resource for the first time after the reception of the RAR, the UE may determine that the first condition is satisfied.

When the UE 1h-20 receives the handover command message from the source gNB 1h-05 and, when random access to the target gNB 1h-10 is indicated, the indicated random access is a contention-based random access (CBRA) procedure (for example, when a pre-specified preamble or UE (1h-20) cell identifier (for example, C-RNTI) is not allocated),
  The UE 1h-20 may determine that the random access procedure to the target gNB 1h-10 has been successfully completed when the UE 1h-20 transmits a preamble (for example, a random preamble) to the cell of the target gNB 1h-10, receives a RAR message, transmits message 3 (for example, handover completion message) to the target gNB by using an uplink transmission resource allocated (or included or indicated) in the RAR message, and receives a MAC CE (contention resolution MAC CE) indicating that contention has been resolved by message 4 from the target gNB 1h-10, or when an uplink transmission resource is received on a PDCCH corresponding to the C-RNTI of the UE 1h-20. Therefore, when the UE 1h-20 monitors the PDCCH and receives the uplink transmission resource for the first time on the PDCCH corresponding to the C-RNTI of the UE 1h-20 (or when indicated for the first time), the UE 1h-20 may determine that the first condition is satisfied. According to another method, in case that the size of the uplink transmission resource allocated in the RAR message is sufficient to transmit message 3 and the UE 1h-20 is allowed to additionally transmit uplink data, the UE 1h-20 may determine that the uplink transmission resource has been received for the first time and may determine that the first condition is satisfied. That is, when the RAR is received, the UE may determine that the uplink transmission resource has been received for the first time, and the first condition is satisfied.

In case that the handover method (RACH-less handover) that does not require the random access procedure is indicated together in the handover command message received by the UE 1h-20,
when the uplink transmission resource for the target gNB 1h-10 is included in the handover command message,
  when the UE 1h-20 transmits message 3 (for example, a handover completion message or an RRCReconfigurationComplete message) on the uplink transmission resource of the target gNB 1h-10 and receives the UE (1h-20) identity confirmation MAC CE (UE identity confirmation MAC CE) as message 4 from the gNB, or when the uplink transmission resource is received on the PDCCH corresponding to the C-RNTI of the UE 1h-20, the UE 1h-20 may determine that the random access procedure has been successfully completed, and the first condition is satisfied. According to another method, after the random access procedure is successfully completed, when the UE performs PDCCH monitoring and receives the first uplink transmission resource on the PDCCH corresponding to the C-RNTI of the UE 1h-20, the UE 1h-20 may determine that the first condition is satisfied.

When the uplink transmission resource for the target gNB 1h-10 is not included in the handover command message,
  when the UE 1h-20 performs PDCCH monitoring on the target gNB 1h-10 (or cell) and receives the uplink transmission resource on the PDCCH corresponding to the C-RNTI of the UE 1h-20, when the UE 1h-20 transmits message 3 (for example, a handover completion message or an RRCReconfigurationComplete message) on the uplink transmission resource and receives the UE (1h-20) identity confirmation MAC CE (UE identity confirmation MAC CE) from the gNB, or when the uplink transmission resource is received on the PDCCH corresponding to the C-RNTI of the UE 1h-20, the UE 1h-20 may determine that the random access procedure has been successfully completed, and the first condition is satisfied. According to another method, after the random access procedure is successfully completed, when the UE performs PDCCH monitoring and receives the first uplink transmission resource on the PDCCH corresponding to the C-RNTI of the UE 1h-20, the UE 1h-20 may determine that the first condition is satisfied.

Hereinafter, an efficient method of switching uplink data from the source gNB 1h-05 to the target gNB 1h-10 in the DAPS handover method proposed in the present disclosure is proposed. Whether the first condition described above is satisfied may be identified according to one of the following methods or a combination thereof in the MAC layer or the RRC layer for the target gNB 1h-10 corresponding to the second bearer.

First method: For example, in case that the DAPS handover is indicated in the RRCReconfiguration message received by the UE 1h-20, the UE 1h-20 may configure the MAC layer for the target gNB 1h-10 corresponding to the second bearer, and the MAC layer for the target gNB may perform the random access procedure, and may identify whether the first condition described above is satisfied. Also, when the first condition is satisfied, the MAC layer for the target gNB may indicate, to the upper layer (for example, the PDCP layer) of the bearer for which the DAPS handover method is configured, an indicator to switch uplink data transmission from the source gNB 1*h*-05 through the first bearer to the target gNB 1*h*-10 through the second bearer in the DAPS handover method proposed in the present disclosure.

Second method: According to another method, for example, in case that the DAPS handover is indicated in the RRCReconfiguration message received by the UE 1*h*-20, the UE 1*h*-20 may configure the MAC layer for the target gNB 1*h*-10 corresponding to the second bearer, and the MAC layer for the target gNB may perform the random access procedure, and identify whether the first condition described above is satisfied. Also, when the first condition is satisfied, the MAC layer for the target gNB may indicate to the upper layer (for example, the RRC layer) that the first condition is satisfied. Also, the upper layer (for example, the RRC layer) may indicate, to the lower layer (for example, the PDCP layer) of the bearer for which the DAPS handover method is configured, an indicator to switch uplink data transmission from the source gNB 1*h*-05 through the first bearer to the target gNB 1*h*-10 through the second bearer in the DAPS handover method proposed in the present disclosure. In case that the first condition proposed in the present disclosure is satisfied, or in case that the random access procedure to the target gNB 1*h*-10 is successfully performed, the upper layer (for example, the RRC layer) may stop the first timer. In case that the first timer is stopped, the RRC layer may use an indicator to indicate to switch the uplink data transmission to the PDCP layer of the bearer for which the DAPS handover method.

Third method: In case that the DAPS handover is indicated in the RRCReconfiguration message received by the UE 1*h*-20, the UE 1*h*-20 may configure the MAC layer for the target gNB 1*h*-10 corresponding to the second bearer. When an indicator that the RRC layer of the UE 1*h*-20 performs the DAPS handover is indicated to the lower layer (for example, the MAC layer), the MAC layer for the target gNB may perform the random access procedure and identify whether the first condition described above is satisfied. Also, when the first condition is satisfied, the MAC layer for the target gNB may indicate, to the upper layer (for example, the PDCP layer) of the bearer for which the DAPS handover method is configured, an indicator to switch uplink data transmission from the source gNB 1*h*-05 through the first bearer to the target gNB 1*h*-10 through the second bearer in the DAPS handover method proposed in the present disclosure.

Fourth method: According to another method, in case that the DAPS handover is indicated in the RRCReconfiguration message received by the UE 1*h*-20, the UE 1*h*-20 may configure the MAC layer for the target gNB 1*h*-10 corresponding to the second bearer. When an indicator that the RRC layer of the UE 1*h*-20 performs the DAPS handover is indicated to the lower layer (for example, the MAC layer), the MAC layer for the target gNB may perform the random access procedure and identify whether the first condition described above is satisfied. Also, when the first condition is satisfied, the MAC layer may indicate to the upper layer (for example, the RRC layer) that the first condition is satisfied. In case that the indicator is identified and the first condition proposed in the present disclosure is satisfied, or when the random access procedure to the target gNB 1*h*-10 is successfully performed, the upper layer (for example, the RRC layer) may stop the first timer. Also, the upper layer (for example, the RRC layer) may indicate, to the lower layer (for example, the PDCP layer) of the bearer for which the DAPS handover method is configured, an indicator to switch uplink data transmission from the source gNB 1*h*-05 through the first bearer to the target gNB 1*h*-10 through the second bearer in the DAPS handover method proposed in the present disclosure.

According to the first method, the second method, the third method, or the fourth method described above, when the PDCP layer receives, from the upper layer (for example, the RRC layer) or the lower layer (for example, the MAC layer), the indicator that the first condition is satisfied, or the indicator to switch uplink data transmission from the source gNB 1*h*-05 to the target gNB 1*h*-10 (for example, in case that the DAPS handover method is indicated), the PDCP layer may perform the protocol layer operation proposed below so as to effectively perform switching of uplink data transmission, and may perform one or more of the following operations so as to prevent data loss due to uplink data transmission.

The following operations may be applied to the PDCP layer connected to an AM DRB or a UM DRB (an RLC layer operating in an AM mode or an RLC layer operating in a UM mode). Before the first condition is satisfied, or before receiving the indicator that the first condition is satisfied, when there is data to be transmitted in a buffer, the PDCP layer may notify that there is data to be transmitted by indicating the size or amount of data to be transmitted (for example, PDCP data volume) to the MAC layer of the first bearer for the source gNB 1*h*-05, and may perform uplink data transmission to the source gNB 1*h*-05. The MAC layer of the first bearer for the source gNB 1*h*-05 may perform a scheduling request or a buffer status reporting procedure so as to receive an uplink transmission resource allocated to the source gNB 1*h*-05. When the first condition described above is satisfied, or when the indicator that the first condition is satisfied is received, uplink data transmission switching to the target gNB 1*h*-10 may be performed as follows for the bearer for which the DAPS handover method is configured.

- The UE may use the uplink or downlink ROHC context for the source gNB 1*h*-05 as it is, without initialization, may initialize the uplink or downlink ROHC context for the target gNB 1*h*-10, and may start with an initial state (for example, IR state in U mode).
- In order to switch the uplink data transmission from the first bearer for the source gNB 1*h*-05 to the second bearer for the target gNB 1*h*-10, the PDCP layer may indicate to the MAC layer of the first bearer for the source gNB 1*h*-05 that the size or amount of data to be transmitted is 0 (or is absent). That is, the PDCP layer may indicate that there is no more data to be transmitted by indicating to the MAC layer of the first bearer that the PDCP data volume of the PDCP layer is 0 (even when there is actually data to be transmitted in the buffer, the PDCP layer may indicate to the MAC layer of the first bearer for the source gNB 1*h*-05 that there is no data to be transmitted so as to switch the uplink data transmission).
- However, as proposed in the present disclosure, in case that the handover method (DAPS handover method) of the second embodiment of the present disclosure is indicated, in the case of the bearer in which the handover method (DAPS handover method) of the second embodiment of the present disclosure is indicated, or in case that the first condition is satisfied, when RLC control data (RLC status report) or PDCP control data (PDCP status report or ROHC feedback) for the source gNB 1h-05 is generated, the PDCP layer of the bearer may indicate the data volume corresponding to the RLC control data or PDCP control data to the MAC layer for the source gNB 1h-05, and may perform data transmission to the source gNB 1h-05 or the RLC layer for the source gNB 1h-05.—However, as proposed in the present disclosure, in case that the handover method (DAPS handover method) of the second embodiment of the present disclosure is indicated, in the case of the bearer in which the handover method (DAPS handover method) of the second embodiment of the present disclosure is indicated, and in case that the first condition is satisfied, when RLC control data (RLC status report) or PDCP control data (PDCP status report or ROHC feedback) for the target gNB 1h-10 is generated, the PDCP layer of the bearer may indicate the data volume corresponding to the RLC control data or PDCP control data to the MAC layer for the target gNB 1h-10, and may perform data transmission to the target gNB 1h-10 or the RLC layer for the target gNB 1h-10. When the first condition is not satisfied, the PDCP layer may indicate the data volume corresponding to the generated data (PDCP data PDU or PDCP control PDU) to the MAC layer for the source gNB 1h-05, and may perform data transmission to the source gNB 1h-05 or the RLC layer for the source gNB 1h-05. Therefore, in the structure of the second PDCP layer proposed for the bearer for which the DAPS handover method is configured, when the indicator that the first condition is satisfied is received, the second PDCP layer may indicate, to the target gNB 1h-10, the bearer for the source gNB 1h-05, PDCP control data or RLC control data to be transmitted to the MAC layer for the source gNB 1h-05, or data volume excluding data size when indicating the data volume to the MAC layer for the target gNB 1h-10.

The PDCP layer connected to the AM DRB (the RLC layer operating in the AM mode) (all PDCP PDUs stored in the past are discarded (for example, the PDCP SDUs are not discarded so as to prevent loss of original data)) may perform a new header compression procedure based on the header context for the target gNB 1h-10 for data (PDCP SDUs of the buffer) in ascending order of the allocated count values (or PDCP sequence numbers) before the first condition is satisfied from the first data (for example, PDCP SDU) in which successful delivery from the lower layers (for example, the RLC layer corresponding to the first bearer for the source gNB 1h-05) is not confirmed, or before the indicator that the first condition is satisfied is received. The PDCP layer may apply security keys for the target gNB 1h-10 to perform the integrity procedure or the ciphering procedure again, and may configure the PDCP header and transmit the configured PDCP header to the lower layer (RLC layer of the second bearer for the target gNB 1h-10) to perform retransmission or transmission. That is, the PDCP layer may perform cumulative retransmission from the first data in which successful delivery is not confirmed. According to another method, when the retransmission is performed, the PDCP layer may perform retransmission only for data in which successful delivery is not confirmed from lower layers (for example, RLC layers of the first bearer for the source gNB 1h-05). —More specifically, the PDCP layer connected to the AM DRB (the RLC layer operating in the AM mode) (all PDCP PDUs previously stored for transmission to the source gNB 1h-05 through the first protocol layer connected to the PDCP layer are discarded (for example, PDCP SDUs may not be discarded so as to prevent loss of original data) may perform a new header or data compression procedure by applying a header compression (or data compression) protocol context or security key corresponding to the target gNB 1h-10 based on the allocated count value (or PDCP sequence number) before the first condition is satisfied or before the indicator that the first condition is satisfied is received, only for data (for example, PDCP SDU) in which successful delivery from lower layers (for example, RLC layers), which is the first protocol layer for the source gNB 1h-05, has not been confirmed. The PDCP layer may perform the integrity procedure or the ciphering procedure again, may configure the PDCP header, and may perform retransmission or transmission by transmitting the configured PDCP header to the lower layer that is the second protocol layer for transmission to the target gNB 1h-10. That is, in order to prevent waste of transmission resources, the PDCP layer may perform selective retransmission only for data in which successful delivery is not confirmed. According to another method, the transmission or retransmission operation is performed by releasing the lower layers (for example, transmitting or receiving RLC layers or MAC layers) that are the first protocol layers for transmitting data to the source gNB 1h-05. When the transmission or retransmission procedure is extended to the UM DRB, the PDCP layer connected to the RLC layer operating in the UM mode may regard data that has not yet been transmitted to the lower layer, data in which a PDCP discard timer has not expired, or data to which the PDCP sequence number (or count value) has already been allocated, as data received or newly received from the upper layer, and perform header (or data) compression on the data with the header (or data) compression context or security key for the target gNB 1h-10, without restarting the PDCP discard timer for each piece of the data. Alternatively, the PDCP layer may perform the ciphering or integrity protection procedures, may generate and concatenate the PDCP header, and may perform transmission or retransmission. The PDCP layer may process data in an ascending order of the count values allocated before the procedure is triggered, and may perform transmission or retransmission. The window state variable of the PDCP layer connected to the UM DRB or AM DRB may be maintained and used without initialization.

When there is data to be transmitted in the buffer, the PDCP layer may notify that there is data to be transmitted by indicating the size or amount of data to be transmitted (for example, PDCP data volume) to the MAC layer of the second bearer for the target gNB 1h-10, and may perform uplink data transmission switching to the target gNB 1h-10. The MAC layer of the second bearer for the target gNB 1h-10 may perform a scheduling request or a buffer status reporting procedure so as to receive an uplink transmission resource allocated to the target gNB 1h-10.

For the bearer indicated (or configured) in the second embodiment (or DAPS handover method), in case that the first condition is satisfied, configuration information or context for the data compression protocol (for the source gNB) (for example, uplink data compression protocol) may be released. Alternatively, in case that the first condition is satisfied, the upper layer (for example, the RRC layer) of the UE may indicate or reconfigure the PDCP layer to release configuration information or context for the data compression protocol (for example, uplink data compression protocol). However, for the bearer in which the second embodiment (or the DAPS handover method) is not indicated (or not configured), when the handover command message is received, the UE may release configuration information or context for the data compression protocol (for example, uplink data compression protocol). Alternatively, when the handover command message is received, the upper layer (for example, the RRC layer) of the UE may indicate or reconfigure the PDCP layer to release configuration information or context for the data compression protocol (for the source gNB) (for example, uplink data compression protocol). This is because, for the bearer for which the DAPS handover method is configured, it is necessary to compress data and transmit the compressed data to the source gNB by using the configuration information or context for the data compression protocol for the source gNB until the first condition is satisfied.

As described above, in case that the DAPS handover method is configured for at least one bearer from among the bearers configured in the UE, in case that the DAPS handover method is configured for a certain bearer, in case that the first condition is satisfied, or in case that the UE receives the indicator indicating that the first condition is satisfied, the UE may perform one of the following methods for the bearer for which the DAPS handover method is not configured.

Method 1: In case that the condition 1 is satisfied as described above, the upper layer (for example, the RRC layer) of the UE may trigger or request the PDCP re-establishment procedure for the bearer or bearers for which the DAPS handover method is not configured (even when the target gNB configures the PDCP re-establishment procedure for the bearer in the handover command message, the PDCP re-establishment procedure may be performed when the first condition is satisfied). The PDCP layer receiving the request for the PDCP re-establishment procedure may perform different PDCP re-establishment procedures for each bearer. For example, the PDCP layer may initialize window state variables for the UM DRB, and may perform transmission or retransmission by compressing or ciphering data that has not yet been transmitted to the lower layer or data in which the PDCP discard timer has not expired, in ascending order of count values, based on the header (or data) compression context or security key of the target gNB, or performing the integrity protection. Also, when the reordering timer is running, the PDCP layer may stop and initialize the reordering timer, may sequentially process the received data (PDCP SDU or PDCP PDU), and may transmit the processed data to the upper layer. Also, the PDCP layer may not initialize window state variables for the AM DRB, and may perform transmission or retransmission by performing compression or ciphering based on header (or data) compression context or security keys of the target gNB in ascending order of count values or PDCP sequence numbers from the first data (PDCP SDU or PDCP PDU) in which successful delivery from the lower layer is not confirmed, or performing the integrity protection. The reason why the PDCP re-establishment procedure is not performed when the handover command message is received for the bearer (s) for which the DAPS handover method is not configured and the PDCP re-establishment procedure is performed when the first condition is satisfied is that, when the UE fails the handover procedure to the target gNB, the UE may perform the fallback to the source gNB, the bearers compress data into the header (or data) compression context of the target gNB in the PDCP re-establishment procedure, and data processed by the ciphering or integrity protection with the security key of the target gNB may become useless when the UE has to fall back, and thus, may be discarded. Also, in case that the UE has to fall back, the PDCP re-establishment procedure may be performed again for the bearers, so that data is compressed with the header (or data) compression context of the source gNB for data to be transmitted. Also, the ciphering or integrity protection has be performed again with the security key of the source gNB. Thus, unnecessary processing may occur. Therefore, when the UE performs the DAPS handover method, the PDCP re-establishment procedure may be not triggered or performed for the bearer for which the DAPS handover method is not configured, when the UE receives the handover command message. Alternatively, the target gNB may not configure the PDCP re-establishment procedure for the bearers in the handover command message, and when the first condition is satisfied, the PDCP re-establishment procedure may be triggered or performed. The PDCP re-establishment procedure is not performed for the bearer for which the DAPS handover method is configured.

Second method: In case that the handover command message is received for the bearer(s) for which the DAPS handover method is not configured, the upper layer (for example, the RRC layer) of the UE may trigger or request the PDCP re-establishment procedure. The PDCP layer receiving the request for the PDCP re-establishment procedure may perform different PDCP re-establishment procedures for each bearer. For example, the PDCP layer receiving the request for the PDCP re-establishment process may initialize window state variables for the UM DRB, and may perform transmission or retransmission by compressing or ciphering data that has not yet been transmitted to the lower layer or data in which the PDCP discard timer has not expired, in ascending order of count values, based on the header (or data) compression context or security key of the target gNB, or performing the integrity protection. Alternatively, when the reordering timer is running, the PDCP layer receiving the request for the PDCP re-establishment procedure may stop and initialize the reordering timer, may sequentially process the received data (PDCP SDU or PDCP PDU), and may transmit the processed data to the upper layer. Alternatively, the PDCP layer receiving the request for the PDCP re-establishment procedure may not initialize window state variables for the AM DRB, and may perform transmission or retransmission by performing compression or ciphering based on header (or data) compression context or security keys of the target gNB in ascending order of count values or PDCP sequence numbers from the first data (PDCP SDU or PDCP PDU) in which successful delivery from the lower layer is not confirmed, or performing the integrity protection. In case that the handover command message is received for the bearer(s) for which the DAPS handover method is not configured, the data is compressed with the header (or data) compression context of the target gNB through the PDCP re-establishment procedure, and the data is processed by performing ciphering or integrity protection with the security key of the target gNB. In case that the UE fails the handover procedure to the target gNB (for example, in case that the first timer has expired or when the wireless connection to the target gNB fails), the fallback to the source gNB is possible. Thus, in order to discard the generated or processed data (for example, PDCP PDUs) for transmission from the bearers to the target gNB and re-process data (for example, PDCP SDUs) based on the header (or data) compression context or security key for the source gNB, when the UE performs the fallback, the UE may request and indicate the upper layer of the UE (for example, the RRC layer) to reconfigure the discharge indication, PDCP re-establishment procedure, or the configuration information (security key or header (or data) compression context) for the source gNB with respect to the data (PDCP PDUs) processed based on the configuration information (security key or header (or data) compression context) for the target gNB to the bearers in which the DAPS handover method is not indicated, and generate and process again based on data based on the source gNB configuration information.

In the second embodiment (for example, the DAPS handover method) of the efficient handover method proposed in the present disclosure, even after the UE receives the handover command message (for example, the RRCReconfiguration message), the UE may continue to receive downlink data from the source gNB 1h-05 or the target gNB 1h-10 through the protocol layers of the first bearer for the source gNB 1h-05 or the second bearer for the target gNB 1h-10. In an embodiment, in order for the UE to seamlessly receive downlink data from the source gNB 1h-05 (or the target gNB 1h-10), or in order for the source gNB 1h-05 (or the target gNB 1h-10) to seamlessly transmit downlink data, the RLC status report rather than data may be allowed to continuously perform uplink transmission to the source gNB 1h-05 (or the target gNB 1h-10) for the AM bearers through the protocol layers of the first bearer (or the second bearer). That is, even when the first condition is satisfied and the UE switches the uplink data transmission to the target gNB 1h-10, in case that the UE needs to transmit RLC status report, HARQ ACK or NACK, or PDCP control data (PDCP ROHC feedback or PDCP status report) to the source gNB 1h-05, data transmission is allowed to be transmitted through the first bearer for the source gNB 1h-05. This is because, in the case of the AM bearers, when successful delivery is not indicated by the RLC status report (that is, when the RLC status report is not received) after data is transmitted to a transmitting end, data may not be continuously transmitted thereafter. Specifically, in the second embodiment of the efficient handover method of FIG. 1H, in third operation 1h-03, even when the first condition is satisfied and the UE 1h-20 stops transmitting uplink data to the source gNB 1h-05 through the protocol layers 1h-22 of the first bearer and switches to start to transmit uplink data to the target gNB 1h-10 through the protocol layers 1h-21 of the second bearer, the UE may continue to transmit HARQ ACK or HARQ NACK information, RLC status report (ACK or NACK information), or PDCP control data (for example, PDCP status report or ROHC feedback information) through the protocol layers of the first bearer (or the second bearer), so that downlink data is seamlessly received from the source gNB 1h-05 (or the target gNB 1h-10), or the source gNB 1h-05 (or the target gNB 1h-10) efficiently transmits downlink data.

Also, in the second embodiment of the efficient handover method of FIG. 1H, in third operation 1h-03, even when the first condition is satisfied and the UE 1h-20 stops transmitting uplink data to the source gNB 1h-05 through the protocol layers 1h-22 of the first bearer and switches to start to transmit uplink data to the target gNB 1h-10 through the protocol layers 1h-21 of the second bearer, the UE may continue to perform data transmission due to HARQ retransmission of the MAC layer or data transmission due to retransmission of the AM mode RLC layer so as to prevent data loss to the source gNB 1h-05. In the second embodiment of the efficient handover method of FIG. 1H, in third operation 1h-03, when the first condition is satisfied and the UE 1h-20 stops transmitting uplink data to the source gNB 1h-05 through the protocol layers 1h-22 of the first bearer and switches to start to transmit uplink data to the target gNB 1h-10 through the protocol layers 1h-21 of the second bearer, the source gNB 1h-05 or the target gNB 1h-10 may allocate the transmission resources to the UE by dividing the time, so as to prevent collision between the uplink transmission resource to the target gNB 1h-10 and the uplink transmission resource to the source gNB 1h-05. In case that the uplink transmission resource to the target gNB 1h-10 and the uplink transmission resource to the source gNB 1h-05 collide and overlap each other, the UE may prioritize uplink transmission resource to the source gNB 1h-05 and perform data transmission to the source gNB 1h-05 so as to maintain or downlink data transmission or continuously receive downlink data from the source gNB 1h-05 without problems. According to another embodiment, in case that the uplink transmission resource to the target gNB 1h-10 and the uplink transmission resource to the source gNB 1h-05 collide and overlap each other, the UE may prioritize uplink transmission resource to the target gNB 1h-10 and perform data transmission to the target gNB 1h-10 so as to maintain downlink data transmission from the target gNB 1h-10.

Specifically, in case that the handover (for example, DAPS handover) corresponding to the second embodiment of the present disclosure is indicated the UE receives the handover command message, or is indicated for each bearer, the UE or the bearer to which the DAPS handover is indicated may perform the scheduling request through the first protocol layer until the first condition is satisfied, may transmit the buffer status report to the source gNB 1h-05, may receive the uplink transmission resource, and may transmit the uplink data. The UE may receive downlink data from the source gNB 1h-05. However, in case that the first condition is satisfied, the UE may no longer transmits data to the source gNB 1h-05, may switch the uplink to perform the scheduling request through the second protocol layer, may transmit the buffer status report to the target gNB 1h-10, may receive the uplink transmission resource, and may transmit uplink data to the target gNB 1h-10. However, the UE may continue to receive downlink data from the source gNB 1h-05. Even after uplink transmission switching, HARQ ACK or HARQ NACK, RLC status report, or PDCP control data (for example, PDCP status report or ROHC feedback information) corresponding to the downlink data may be continuously transmitted. Also, even when the first condition is satisfied, the UE may continue to receive downlink data from the source gNB 1*h*-05 or the target gNB 1*h*-10.

In the second embodiment of the efficient handover method of FIG. 1H, in fourth operation 1*h*-04, when the second condition is satisfied, the UE 1*h*-20 may stop receiving downlink data from the source gNB 1*h*-05 through the protocol layers 1*h*-22 of the first bearer, and may release the connection with the source gNB 1*h*-05. The second condition may be one of the following conditions. Also, the PDCP layer 1*h*-21 of the second bearer may continue to perform seamless data transmission or reception with the target gNB 1*h*-10 by using information such as transmission or reception data, sequence number information, or header compression and decompression context, which is stored in the PDCP layer 1*h*-22 of the first bearer.

- When the UE performs the random access procedure to the target gNB 1*h*-10 through the layers 1*h*-21 of the second bearer and receives the RAR, the UE may determine that the second condition is satisfied.
- When the UE performs the random access procedure to the target gNB 1*h*-10 through the layers of the second bearer, receives the RAR, and configures and transmits the handover completion message to the target gNB 1*h*-10, the UE may determine that the second condition is satisfied.
- When the UE completes the random access procedure to the target gNB 1*h*-10 through the layers of the second bearer and transmits data on the PUCCH or PUSCH uplink transmission resource for the first time, or when the PUCCH or PUSCH uplink transmission resource is received for the first time, the UE may determine that the second condition is satisfied.
- When the gNB sets a separate timer in the UE with the RRC message and the timer has expired, the UE may determine that the second condition is satisfied.
- The timer may be started when the UE receives the handover command message from the source gNB 1*h*-05, when random access to the target gNB 1*h*-10 is started (when the preamble is transmitted), when the RAR is received from the target gNB 1*h*-10, when the handover completion message is transmitted to the target gNB 1*h*-10, or when data is transmitted for the first time on the PUCCH or PUSCH uplink transmission resource.
- After the UE performs the random access procedure to the target gNB 1*h*-10 through the layers of the second bearer, receives the RAR, and configures and transmits the handover completion message to the target gNB 1*h*-10, when successful delivery of the handover complete message is confirmed in the MAC layer (HARQ ACK) or the RLC layer (RLC ACK), the UE may determine that the second condition is satisfied.
- After the UE performs the random access procedure to the target gNB 1*h*-10 through the layers of the second bearer, receives the RAR, or configures and transmits the handover completion message to the target gNB 1*h*-10, when the uplink transmission resource is allocated from the target gNB 1*h*-10 for the first time, or when the uplink transmission resource is indicated for the first time, the UE may determine that the second condition is satisfied.
- When the source gNB 1*h*-05 performs the efficient handover proposed in the present disclosure, the source gNB 1*h*-05 may determine when to stop the transmission of downlink data to the UE or when to release the connection with the UE. For example, this may be determined by a certain method (for example, when a certain timer has expired (a timer may be started after handover indication) or when the source gNB 1*h*-05 receives an indication from the target gNB 1*h*-10 that the UE has successfully performed handover to the target gNB 1*h*-10). When downlink data is not received from the source gNB 1*h*-05 for a certain time, the UE may determine that the second condition is satisfied, may determine that the connection with the source gNB 1*h*-05 has been released, and may release the connection.
- When the UE receives, from the target gNB 1*h*-10, the indication to release the connection with the source gNB 1*h*-05 (for example, RRC message (e.g., RRCReconfiguration message), MAC CE, RLC control PDU, or PDCP control PDU), the UE may determine that the second condition is satisfied.
- When the UE receives, from the source gNB 1*h*-05, the indication to release the connection with the source gNB 1*h*-05 (for example, RRC message (e.g., RRCReconfiguration message), MAC CE, RLC control PDU, or PDCP control PDU), the UE may determine that the second condition is satisfied.
- When the UE does not receive downlink data from the source gNB 1*h*-05 for a certain time, the UE may determine that the second condition is satisfied.
- The UE may determine that the second condition is satisfied when the UE successfully completes the random access procedure to the target gNB 1*h*-10 through the layers (for example, MAC layer) of the second bearer, when the UE successfully completes the random access procedure to the target gNB 1*h*-10 through the layers of the second bearer and the first uplink transmission resource is allocated from the target gNB 1*h*-10, or when the uplink transmission resource is indicated to the UE for the first time.
- For example, more specifically, when the UE receives the handover command message from the source gNB 1*h*-05 and, when random access to the target gNB 1*h*-10 is indicated, the indicated random access is a CFRA procedure (for example, when a pre-specified preamble or UE cell identifier (for example, C-RNTI) is allocated),
  - When the UE transmits a pre-specified preamble to the cell of the target gNB 1*h*-10 and receives a RAR message, the UE may determine that the random access procedure has been successfully completed. Therefore, when the first uplink transmission resource allocated, included, or indicated in the RAR message is received, the UE may determine that the second condition is satisfied. According to another method, when the UE receives the uplink transmission resource for the first time after the reception of the RAR, the UE may determine that the second condition is satisfied.
- When the UE receives the handover command message from the source gNB 1*h*-05 and, when random access to the target gNB 1*h*-10 is indicated, the indicated random access is a CBRA procedure (for example, when a pre-specified preamble or UE cell identifier (for example, C-RNTI) is not allocated),
  - The UE may determine that the random access procedure to the target gNB 1*h*-10 has been successfully completed when the UE transmits a preamble (for example, a random preamble) to the cell of the target gNB 1*h*-10, receives a RAR message, transmits message 3 (for example, the handover completion message) by using an uplink transmission resource allocated (or included or indicated) in the RAR message, and receives a MAC CE (contention resolution MAC CE) indicating that contention has been resolved by message 4 from the target gNB 1*h*-10, or when an uplink transmission resource is received on a PDCCH corresponding to the C-RNTI of the UE. Therefore, when the UE monitors the PDCCH and receives the uplink transmission resource for the first time on the PDCCH corresponding to the C-RNTI of the UE, or when indicated for the first time, the UE may determine that the first condition is satisfied. According to another method, in case that the size of the uplink transmission resource allocated in the RAR message is sufficient to transmit message 3 and the UE is allowed to additionally transmit uplink data, the UE may determine that the uplink transmission resource has been received for the first time and may determine that the first condition is satisfied. That is, when the RAR is received, the UE may determine that the uplink transmission resource has been received for the first time, and the first condition is satisfied.

In case that the handover method (RACH-less handover) that does not require the random access procedure is indicated together in the handover command message received by the UE, in case that the uplink transmission resource for the target gNB 1*h*-10 is included in the handover command message, in case that the UE transmits message 3 (for example, a handover completion message or an RRCReconfigurationComplete message) on the uplink transmission resource of the target gNB 1*h*-10 and receives the UE identity confirmation MAC CE as message 4 from the gNB, or in case that the uplink transmission resource is received on the PDCCH corresponding to the C-RNTI of the UE, the UE may determine that the random access procedure has been successfully completed. The UE may determine that the second condition is satisfied. According to another method, after the random access procedure is successfully completed, when the UE performs PDCCH monitoring and receives the first uplink transmission resource on the PDCCH corresponding to the C-RNTI of the UE, the UE may determine that the second condition is satisfied.

When the uplink transmission resource for the target gNB 1*h*-10 is not included in the handover command message, in case that the UE performs PDCCH monitoring on the target gNB 1*h*-10 (or cell) and receives the uplink transmission resource on the PDCCH corresponding to the C-RNTI of the UE, in case that the UE transmits message 3 (for example, a handover completion message or an RRCReconfiguration-Complete message) on the uplink transmission resource and receives the UE identity confirmation MAC CE from the gNB, or in case that the uplink transmission resource is received on the PDCCH corresponding to the C-RNTI of the UE, the UE may determine that the random access procedure has been successfully completed, and the second condition is satisfied. According to another method, after the random access procedure is successfully completed, when the UE performs PDCCH monitoring and receives the first uplink transmission resource on the PDCCH corresponding to the C-RNTI of the UE, the UE may determine that the second condition is satisfied.

In a case in which the UE performs the second embodiment (for example, the DAPS handover method) of the efficient handover method proposed in the present disclosure, when the UE identifies that the RRC layer, MAC layer, RLC layer of the first bearer for the source gNB 1*h*-05 or the RRC layer, MAC layer, or RLC layer of the second bearer for the target gNB 1*h*-10 satisfies the second condition proposed in the present disclosure, the indicator indicating that the second condition is satisfied may be indicated to the PDCP layer of the UE or the bearer performing the DAPS handover method. When the PDCP layer of the UE receives, from the lower layer or the upper layer, the indicator indicating that the second condition is satisfied, or when the second condition is satisfied, the second embodiment of the efficient handover method proposed in the present disclosure may be successfully completed by performing one or more of the following procedures on the bearer or the UE for which the DAPS handover method is configured.

The UE may release the first bearer for the source gNB 1*h*-05 and release the connection with the source gNB 1*h*-05. Before the first bearer for the source gNB 1*h*-05 is released, the RLC re-establishment procedure may be performed on the RLC layer corresponding to the first bearer for the source gNB 1*h*-05 (for example, when the reordering timer is running, the timer may be stopped or initialized, and when the received data is stored in the buffer, the stored data may be processed and transmitted to the upper layer, or, when there is data to be transmitted in the buffer, the data may be discarded), or the MAC layer may be reset.

When the connection with the source gNB 1*h*-05 is released, the UE may trigger the PDCP status reporting procedure so as to report the reception status of downlink data received from the source gNB 1*h*-05 to the target gNB 1*h*-10, may configure the PDCP status report, and may transmit the PDCP status report to the target gNB 1*h*-10.

In case that the second condition is satisfied, the UE may switch from the second PDCP layer structure or function 1*i*-20 to the first PDCP layer structure or function 1*i*-11 or 1*i*-12 proposed in the present disclosure, for each bearer or with respect to the bearer in which the DAPS handover method is indicated, may initialize the reordering variable, and may stop and initialize the reordering timer. The UE may perform the deciphering procedure or header (or data) decompression by applying the security key or header compression decompression context for the source gNB 1*h*-05 to the data stored in the buffer for reordering (for example, data received from the source gNB 1*h*-05), and may discard the security key or header decompression context for the source gNB 1*h*-05. The processed data may be transmitted to the upper layer in ascending order. That is, in case that the second condition is satisfied, the UE may perform the deciphering procedure or header (or data) decompression by applying the security key or header decompression context for the source gNB 1*h*-05 to the data stored in the buffer for reordering (for example, the data received from the source gNB 1*h*-05), and may discard the security key or header decompression context for the source gNB 1*h*-05. According to another method, in case that the second condition is satisfied, the UE may switch from the second PDCP layer structure or function 1*i*-20 to the third PDCP layer structure or function 1*i*-30 proposed in the present disclosure, for each bearer or with respect to the bearer in which the DAPS handover method is indicated. Also, the UE may continue to use the reordering variables and the reordering timer without stopping or initializing the reordering variables and the reordering timer. However, the UE may perform the deciphering procedure or header (or data) decompression by applying the security key or header decompression context for the source gNB 1*h*-05 to the data stored in the buffer for reordering (for example, the data received from the source gNB 1*h*-05), and may discard the security key or header decompression context for the source gNB 1*h*-05. The processed data may be transmitted to the upper layer in ascending order. That is, in case that the second condition is satisfied, the UE may perform the deciphering procedure or header (or data) decompression by applying the security key or header decompression context for the source gNB 1*h*-05 to the data stored in the buffer for reordering (for example, the data received from the source gNB 1*h*-05), and may discard the security key or header decompression context for the source gNB 1*h*-05. The UE may release QoS mapping information of the SDAP layer for the source gNB 1*h*-05, security key information for the source gNB 1*h*-05 of the PDCP layer, header (or data) compression context information for the source gNB 1*h*-05, or the RLC layer or the MAC layer for the source gNB 1*h*-05. Switching from the second PDCP layer structure or function 1*i*-20 to the first PDCP layer structure or function proposed in the present disclosure for each bearer or with respect to the bearer in which the DAPS handover method is indicated may mean the reconfiguration of the PDCP layer. Such reconfiguration may be performed when a reconfiguration indicator of the PDCP layer is received from the upper layer (for example, the RRC layer). For example, the UE receives the handover command message, and the upper layer (for example, the RRC layer) transmits the PDCP layer reconfiguration indicator to the PDCP layer of the bearer with respect to the bearer for which the DAPS handover method is configured. In this manner, the first PDCP layer structure or function may be reconfigured to the second PDCP layer structure or function. For example, when the second condition is satisfied, the upper layer (for example, the RRC layer) transmits the PDCP layer reconfiguration indicator to the PDCP layer of the bearer. In this manner, the second PDCP layer structure or function may be reconfigured to the first PDCP layer structure or function. For example, whenever the PDCP layer reconfiguration indicator is received from the upper layer (for example, the RRC layer) in a toggle manner, the PDCP layer of the bearer may reconfigure the first PDCP layer structure or function to the second PDCP layer structure or function, or may reconfigure the second PDCP layer structure or function to the first PDCP layer structure or function.

In case that the second condition proposed in the present disclosure is satisfied while the DAPS handover method proposed in the present disclosure is performed, the UE may release the first bearers for the source gNB, and may switch again from the second SDAP layer structure and function 1*j*-20 applied to each bearer or the bearer in which the DAPS handover method is indicated to the first SDAP layer structure and function 1*j*-10. In case that the second condition is satisfied, the UE may switch from the second SDAP layer structure or function 1*j*-20 to the first SDAP layer structure or function 1*j*-10 proposed in the present disclosure, for each bearer or with respect to the bearer in which the DAPS handover method is indicated. The UE may maintain the second bearer for the target gNB or the second mapping information between the QoS flow and the bearer. Before releasing the first bearer for the source gNB or the first mapping information between the QoS flow and the bearer, the UE may complete the data processing by applying the first mapping information between the QoS flow and the bearer to data received from the source gNB (for example, all data received from the source gNB), and then, may release the first mapping information between the QoS flow and the bearer or the first bearer. The UE may transmit the processed data to the upper layer in ascending order. That is, in case that the second condition is satisfied, the UE may process data by applying the first mapping information between the QoS flow and the bearer for the source gNB to the data stored in the buffer (for example, the data received from the source gNB) (for example, the procedure of reading SDAP header information, updating the mapping information, configuring the SDAP header, or routing or transmitting to an appropriate upper layer or lower layer based on the first mapping information between the QoS flow and the bearer, and may discard the first mapping information between the QoS flow and the bearer for the source gNB. The SDAP layer may define and apply a 1-bit indicator of a new SDAP header, a 1-bit indicator of the PDCP header, SDAP control data (for example, downlink end marker), or information indicated by the PDCP layer. Based on this, the SDAP layer may identify what kind of data the last data received from the source gNB is. Therefore, after the data processing is performed by applying the first mapping information between the QoS flow and the bearer for the source gNB to the last data received from the source gNB, the first mapping information between the QoS flow and the bearer for the source gNB may be discarded. The SDAP layer may continue to maintain the second mapping information between the QoS flow and the bearer and process uplink data or downlink data to the target gNB based on the mapping information.

When the MAC layer for the source gNB 1*h*-05 is reset and the second PDCP layer structure of the bearer for which the DAPS handover method is configured is switched to the first PDCP layer structure, the RLC layer re-establishment or the release procedure may be performed for the RLC layer for the source gNB 1*h*-05 in the second PDCP layer structure.

In the present disclosure, in case that the second condition is satisfied, or in case that the indicator indicating that the second condition is satisfied is received from the upper layer (for example, the RRC layer) or the lower layer (for example, the MAC layer), the PLC layer re-establishment or release procedure of the first bearer for the source gNB may follow one of the following methods.

First method: for a certain bearer for which the DAPS handover method is configured, in case that the RLC layer of the first bearer for the source gNB is an LTE RLC layer, the upper layer (for example, the RRC layer) may indicate the LTE RLC layer to perform the re-establishment procedure. Specifically, in case that the reordering timer is running in the LTE RLC layer, the reordering timer may be stopped or initialized. Alternatively, when there are stored data, the stored data is processed and transmitted to the upper layer, thereby reducing the transmission delay due to the reordering timer. Also, variables may be initialized and data for transmission may be discarded. Then, the upper layer (for example, the RRC layer) may indicate to release the LTE RLC layer. However, in case that the RLC layer of the first bearer for the source gNB is an NR RLC layer, the upper layer (for example, the RRC layer) may indicate the NR RLC layer to be immediately released without re-establishment. This is because the NR RLC layer always performs out-of-sequence delivery, and thus, there may be no stored data, and even when there is the stored data, the data may be segmented data, and thus, there is no problem even though the stored data is discarded. As described above, different procedures may be applied according to the RLC layer configured for each bearer.

Second method: for a certain bearer for which the DAPS handover method is configured, in case that the RLC layer of the first bearer for the source gNB is an LTE RLC layer, the upper layer (for example, the RRC layer) may indicate the LTE RLC layer to perform the re-establishment procedure. Specifically, in case that the reordering timer is running in the LTE RLC layer, the reordering timer may be stopped or initialized. Also, when there are stored data, the stored data is processed and transmitted to the upper layer, thereby reducing the transmission delay due to the reordering timer. Also, variables may be initialized and data for transmission may be discarded. Alternatively, the upper layer (for example, the RRC layer) may release the LTE RLC layer. However, in case that the RLC layer of the first bearer for the source gNB is an NR RLC layer, the upper layer (for example, the RRC layer) may indicate the NR RLC layer to be immediately released without re-establishment. This is because the NR RLC layer always performs out-of-sequence delivery, and thus, there may be no stored data, and even when there is the stored data, the data may be segmented data, and thus, there is no problem even though the stored data is discarded. As described above, different procedures may be applied according to the RLC layer configured for each bearer.

Third method: For a certain bearer for which the DAPS handover method is configured, in case that the RLC layer of the first bearer for the source gNB is an LTE RLC layer and the target gNB transmits, to the UE, an RRC message (for example, RRCReconfiguration) including an indicator to release the connection with the source gNB or the first bearer for the source gNB, an indicator (for example, reestablishRLC) for re-establishing the LTE RLC layer may be transmitted by being included in configuration information (for example, rlc-config) of the LTE RLC layer for the bearer in the RRC message (or may include an indicator to release the LTE RLC layer). Therefore, in case that an indication to release the connection with the source gNB is received, or in case that the second condition is satisfied, the upper layer (for example, the RRC layer) may read the RRC message and may indicate the LTE RLC layer to perform the re-establishment procedure according to the indication for the LTE RLC re-establishment procedure (or release). Specifically, when the reordering timer is running in the LTE RLC layer, the reordering timer may be stopped or initialized. When there are stored data, the stored data is processed and transmitted to the upper layer, thereby reducing the transmission delay due to the reordering timer. Also, variables may be initialized and data for transmission may be discarded. Then, the upper layer (for example, the RRC layer) may release the LTE RLC layer. For a certain bearer for which the DAPS handover method is configured, in case that the RLC layer of the first bearer for the source gNB is an NR RLC layer and the target gNB transmits, to the UE, an RRC message (for example, RRCReconfiguration) including an indicator to release the connection with the source gNB or the first bearer for the source gNB, an indicator to release the NR RLC layer may be transmitted by being included in configuration information (for example, rlc-config) of the NR RLC layer for the bearer in the RRC message. As described above, the target gNB may indicate different procedures with the RRC message according to the RLC layer configured for each bearer, and accordingly, the UE may apply the procedures for each bearer.

Fourth method: For a certain bearer for which the DAPS handover method is configured, in case that the RLC layer of the first bearer for the source gNB is an LTE RLC layer and the target gNB transmits, to the UE, an RRC message (for example, RRCReconfiguration) including an indicator to release the connection with the source gNB or the first bearer for the source gNB, an indicator (for example, reestablishRLC) for re-establishing the LTE RLC layer may be transmitted by being included in configuration information (for example, rlc-config) of the LTE RLC layer for the bearer in the RRC message (or may include an indicator to release the LTE RLC layer). Therefore, in case that an indication to release the connection with the source gNB is received, or in case that the second condition is satisfied, the upper layer (for example, the RRC layer) may read the RRC message and may indicate the LTE RLC layer to perform the re-establishment procedure according to the indication for the LTE RLC re-establishment procedure (or release). Specifically, when the reordering timer is running in the LTE RLC layer, the reordering timer may be stopped or initialized. When there are stored data, the stored data is processed and transmitted to the upper layer, thereby reducing the transmission delay due to the reordering timer. Also, variables may be initialized and data for transmission may be discarded. Alternatively, the upper layer (for example, the RRC layer) may release the LTE RLC layer. For a certain bearer for which the DAPS handover method is configured, when the RLC layer of the first bearer for the source gNB is an NR RLC layer and the target gNB transmits, to the UE, an RRC message (for example, RRCReconfiguration) including an indicator to release the connection with the source gNB or the first bearer for the source gNB, an indicator to release the NR RLC layer or an indicator to re-establish the NR RLC layer may be transmitted by being included for the bearer in the RRC message. As described above, the target gNB may indicate different procedures with the RRC message according to the RLC layer configured for each bearer, and accordingly, the UE may apply the procedures for each bearer.

The receiving PDCP layer may process or store the data received due to the re-establishment procedure of the lower layer (for example, the RLC layer), or may perform the header decompression procedure based on the header compression context (ROHC or Ethernet header compression (EHC)) for the stored data (received from the source gNB 1h-05) or all the stored data (for the source gNB 1h-05) for UM DRBs.

The receiving PDCP layer may process or store the data received due to the re-establishment procedure of the lower layer (for example, the RLC layer), or may perform the header decompression procedure based on the header compression context (ROHC or EHC) for the stored data (received from the source gNB 1h-05) or all the stored data (for the source gNB 1h-05) for AM DRBs.

According to another method, the receiving PDCP layer may process or store the data received due to the re-establishment procedure of the lower layer (for example, the RLC layer). In case that the indicator (drb-Continue ROHC or drb-Continue EHC) to continuously use the header compression context is not set for UM DRB or AM DRBs, the receiving PDCP layer may perform the header decompression procedure on the stored data (received from the source gNB 1h-05) or all the stored data based on the header compression context (ROHC or EHC).

After the above procedure is performed, the transmitting or receiving PDCP layer may discard or release the security key or header compression contexts for the source gNB 1h-05.

In FIG. 1F of the present disclosure, when the handover command message 1f-20 is transmitted to the UE, the gNB may define indicators for the embodiments proposed in the present disclosure in the handover command message (for example, the RRCReconfiguration message), and may indicate to the UE which embodiment to trigger the handover procedure corresponding to. The UE may perform the handover procedure according to the handover method indicated in the handover command message. For example, the UE may perform handover to the target gNB 1h-10 while minimizing a data interruption time by performing the second embodiment (DAPS handover method) of the efficient handover method proposed in the present disclosure. According to another method, in the handover command message, the indicators for the embodiments proposed in the present disclosure may be defined for each bearer. Which embodiment to be applied to the bearer during handover and which bearer to which the embodiment is applied during handover may be more specifically indicated. For example, it may be indicate to apply the second embodiment of the present disclosure only to the AM bearer in which the RLC layer driven in the AM mode is running, or it may be extended and applied to the UM bearer in which the RLC layer driven in the UM mode is running Also, it may be assumed that the embodiments proposed in the present disclosure are applied to DRB. However, when necessary (for example, when the UE maintains the SRB for the source gNB 1h-05 and fails handover to the target gNB 1h-10, and the handover failure message is reported or restored to the SRB for the source gNB 1h-05, it may be extended and applied to the SRB.

In the embodiments of the present disclosure, when the UE performs data transmission and reception with the source gNB 1h-05 through the protocol layers of the first bearer and performs data transmission and reception with the target gNB 1h-10 through the protocol layers of the second bearer, the MAC layer of the first bearer and the MAC layer of the second bearer may each operate separate discontinuous reception (DRX) cycles to reduce battery consumption of the UE. That is, the UE may continue to apply the DRX cycle of the MAC layer when transmitting and receiving data through the protocol layers of the first bearer even after receiving the handover command message. The UE may stop DRX according to the first condition or the second condition of the present disclosure. Also, the UE may separately operate the application of the DRX cycle to the MAC layer of the second bearer according to the indication of the target gNB 1h-10.

Also, in the present disclosure, that the UE stops uplink transmission to the source gNB 1h-05 through the protocol layers of the first bearer and stops downlink data reception from the source gNB 1h-05 means that the UE re-establishes, resets, or releases the protocol layers (PHY layer, MAC layer, RLC layer, or PDCP layer) of the first bearer.

In the embodiments of the present disclosure, for convenience of explanation, it has been described that the UE configures the first bearer for the source gNB 1h-05 or the second bearer for the target gNB 1h-10. It may be easily extended to the case in which the UE configures a plurality of first bearers for the source gNB 1h-05 or a plurality of second bearers for the target gNB 1h-10, and the same may be applied. According to another method, it may be easily extended to the case in which a plurality of bearers for a plurality of target gNBs 1h-10 are configured, and the same may be applied. For example, the UE may perform the handover procedure to the first target gNB 1h-10 to configure second bearers. In case that handover fails, the UE performs the handover procedure to the second target gNB 1h-10 to configure second bearers. The UE may search for and determine one cell satisfying a certain condition (for example, a certain signal intensity or more) for itself from among the target gNBs 1h-10, and may perform the handover procedure thereon.

Figure 1I:
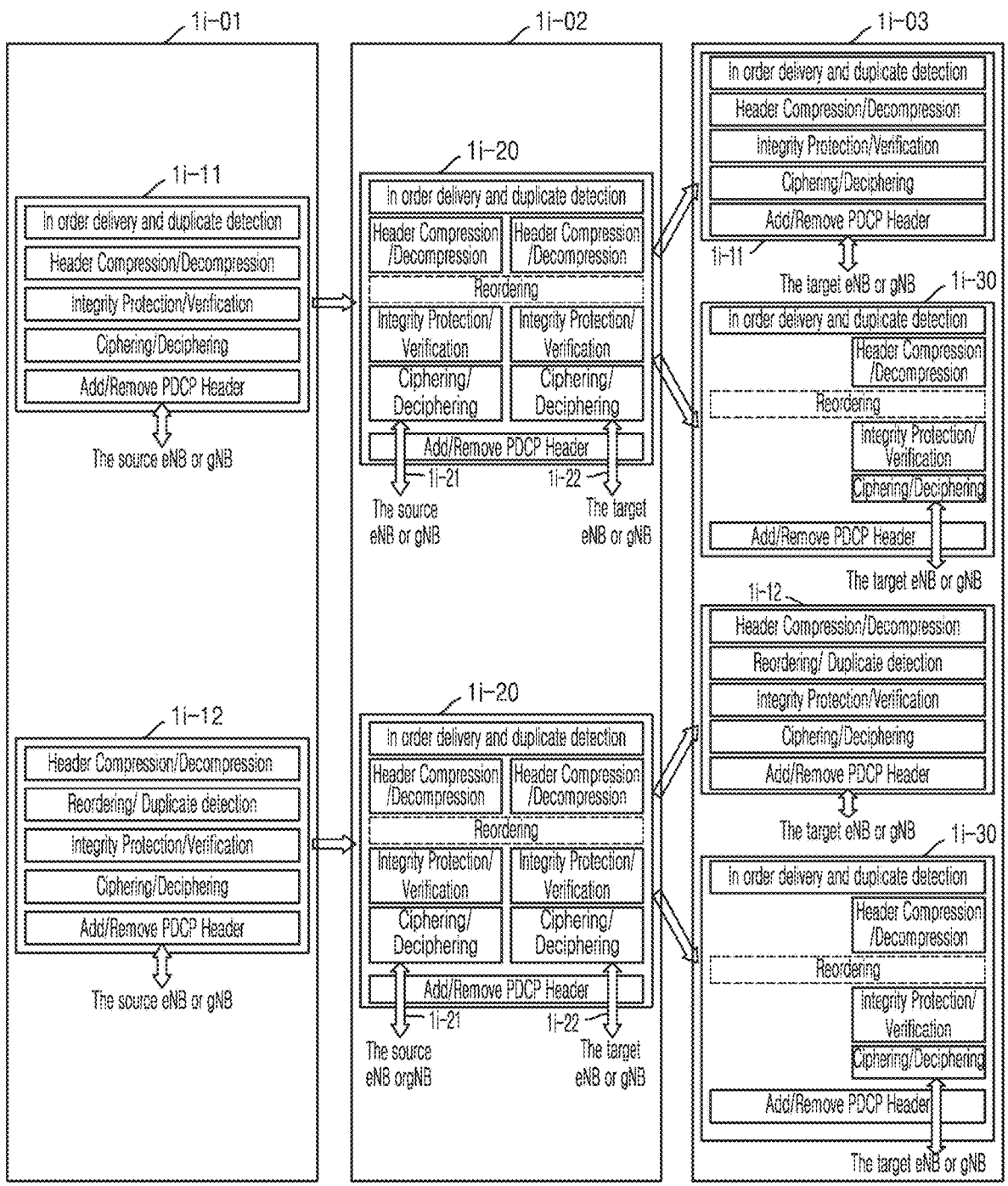
FIG. 1I is a diagram illustrating structures of an efficient packet data convergence protocol (PDCP) layer applied to a dual active protocol stack (DAPS) handover method, which is the second embodiment of the efficient handover method proposed in the present disclosure, and a method of applying the structures.

FIG. 1I is a diagram illustrating structures of an efficient PDCP layer applied to the DAPS handover method, which is the second embodiment of the efficient handover method proposed in the present disclosure, and a method of applying the structures.

FIG. 1I proposes a specific structure and functions of the efficient PDCP layer applied to the DAPS handover method, which is the second embodiment of the efficient handover method proposed in the present disclosure, and the structures of the PDCP layers proposed below may be applied to different PDCP layer structures for each bearer at different times while performing the DAPS handover procedure.

For example, before the handover command message is received from the gNB, the UE processes, transmits, or receives data by applying the first PDCP layer structure and function 1i-11 or 1i-12 proposed in the present disclosure for each bearer (1i-01).

However, in case that the UE receives the handover command message from the gNB and indicates the DAPS handover method proposed in the present disclosure in the handover command message, or in case that the DAPS handover method is indicated for specific bearers, the UE processes, transmits, or receives data by applying the second PDCP layer structure and function 1i-20 proposed in the present disclosure to each bearer or the bearers in which the DAPS handover method is indicated (1i-02). That is, in case that the UE receives the handover command message and the DAPS handover method proposed in the present disclosure is indicated in the handover command message, or in case that the DAPS handover method is indicated for specific bearers, the UE may switch from the first PDCP layer structure or function 1*i*-11 or 1*i*-12, which has been used for each bearer, to the second PDCP layer structure or function 1*i*-20 proposed in the present disclosure for each bearer or with respect to the bearer in which the DAPS handover method is indicated.

According to another method, when the first condition is satisfied, the UE may switch from the first PDCP layer structure or function 1*i*-11 or 1*i*-12, which has been used for each bearer, to the second PDCP layer structure or function 1*i*-20 proposed in the present disclosure, for each bearer or with respect to the bearer in which the DAPS handover method is indicated (1*i*-02). In case that the UE receives the handover command message and indicates the DAPS handover method proposed in the present disclosure in the handover command message, in case that the DAPS handover method is indicated for specific bearers, or in case that the PDCP reordering timer value is newly set, the UE may update the reordering variable with the PDCP sequence number or count value expected to receive next when the UE switches from the first PDCP layer structure or function 1*i*-11 or 1*i*-12 to the second PDCP layer structure or function 1*i*-20 proposed in the present disclosure, for each bearer or with respect to the bearer in which the DAPS handover method is indicated, and may stop and restart the reordering timer.

In case that the second condition proposed in the present disclosure is satisfied while the DAPS handover method proposed in the present disclosure is performed, the UE may release the first bearers for the source gNB, and may switch again from the second PDCP layer structure and function 1*i*-20 applied to each bearer or the bearer in which the DAPS handover method is indicated to the first PDCP layer structure and function 1*i*-11 or the 1*i*-12. In case that the second condition is satisfied and the UE switches from the second PDCP layer structure or function 1*i*-20 to the first PDCP layer structure or function 1*i*-11 or 1*i*-12 proposed in the present disclosure for each bearer or with respect to the bearer in which the DAPS handover method is indicated, the UE may initialize reordering variables and stop and initialize the reordering timer. The UE may perform the deciphering procedure or header (or data) decompression by applying the security key or header decompression context for the source gNB to the data stored in the buffer for reordering (for example, the data received from the source gNB), and may discard the security key or header decompression context for the source gNB. The UE may transmit the processed data to the upper layer in ascending order. That is, in case that the second condition is satisfied, the UE may perform the deciphering procedure or header (or data) decompression by applying the security key or header decompression context for the source gNB to the data stored in the buffer for reordering (for example, the data received from the source gNB), and may discard the security key or header decompression context for the source gNB.

According to another embodiment, in case that the second condition proposed in the present disclosure is satisfied while the DAPS handover method proposed in the present disclosure is performed, the UE may release the first bearers for the source gNB, and may switch from the second PDCP layer structure and function 1*i*-20 applied to each bearer or the bearer in which the DAPS handover method is indicated to the third PDCP layer structure and function the 1*i*-30. In case that the second condition is satisfied and the UE switches from the second PDCP layer structure or function 1*i*-20 to the third PDCP layer structure or function 1*i*-30 proposed in the present disclosure for each bearer or with respect to the bearer in which the DAPS handover method is indicated, the UE may use the reordering variables and the reordering timer without stopping or initializing the reordering variables and the reordering timer. However, the UE may perform the deciphering procedure or header (or data) decompression by applying the security key or header decompression context for the source gNB to the data stored in the buffer for reordering (for example, the data received from the source gNB), and may discard the security key or header decompression context for the source gNB. The UE may transmit the processed data to the upper layer in ascending order. That is, in case that the second condition is satisfied, the UE may perform the deciphering procedure or header (or data) decompression by applying the security key or header decompression context for the source gNB to the data stored in the buffer for reordering (for example, the data received from the source gNB), and may discard the security key or header decompression context for the source gNB.

As proposed in FIG. 1I of the present disclosure, when the UE performs handover by applying the first PDCP layer structure and function 1*i*-11 or 1*i*-12, the second PDCP layer structure and function 1*i*-20, or the third PDCP layer structure and function 1*i*-30 of the first PDCP layer, which is different from each other, for each bearer at different times, the UE may minimize a data interruption time without data loss.

The first PDCP layer structure 1*i*-11 or 1*i*-12 proposed in FIG. 1I may have a (1-1)th PDCP layer structure, a (1-2)th PDCP layer structure, a (1-3)th PDCP layer structure, or a (1-4)th PDCP layer structure proposed below in the present disclosure, and an embodiment of the present disclosure may have the following features.

1> (In the case of the (1-1)th PDCP layer structure) For example, when the UE applies the first PDCP layer structure and function 1*i*-11 to the PDCP layer (for example, E-UTRA PDCP layer or LTE PDCP layer) connected to the AM RLC layer (for example, E-UTRA AM RLC layer), it may have the following features.

2> The receiving PDCP layer may first perform out-of-window data detection or duplicate data detection for the received data. (Because RLC AM has retransmission and the size of the LTE RLC SN and the PDCP SN may be different from each other, duplicate data or out-of-window data may be received. The window indicates the area of the PDCP sequence number or count value in which valid data is received.)

3> The UE performs the deciphering procedure and the header decompression procedure and then discards the out-of-window data or duplicate data. (Because useful information for the header decompression procedure (for example, IR packet or header compression information) may be included, the out-of-window data or duplicate data may be identified and then discarded.)

2> The UE may directly decrypt the received data, which is not discarded, without ordering and may perform the header decompression procedure. This is because the E-UTRA AM RLC layer arranges data in sequence and transmits the data to the PDCP layer.

2> When the data is transmitted to the upper layer, the data is transmitted in ascending order of count values.

1> (In the case of the (1-2)th PDCP layer structure) For example, when the UE applies the first PDCP layer structure and function 1*i*-11 to the PDCP layer (for example, E-UTRA PDCP layer or LTE PDCP layer) connected to the UM RLC layer (for example, E-UTRA UM RLC layer), the embodiment of the present disclosure following features.

2> The out-of-window data detection or duplicate data detection procedure is not performed. This is because the UM E-UTRA RLC layer does not have a retransmission procedure.

2> The deciphering procedure is directly performed on the received data and the header decompression procedure is performed.

2> The reordering procedure may be performed to transmit data to the upper layer (for example, in ascending order).

1> (In the case of the (1-3)th PDCP layer structure) For example, when the UE applies the first PDCP layer structure and function 1$i$-11 to the PDCP layer (for example, E-UTRA PDCP layer or LTE PDCP layer) configured as a split bearer, a packet duplication bearer, or an LWA bearer, the embodiment of the present disclosure always applies the reordering procedure and the reordering timer, and may have the following features.

2> The out-of-window data detection of duplicate data detection is first performed on the received data. (Because RLC AM has retransmission or data may be received from different RLC layers at different times and the sizes of LTE RLC SN and PDCP SN may be different, the out-of-window data or duplicate data may be received.)

3> The deciphering procedure is performed. However, the header decompression procedure is not performed. (This is because E-UTRA PDCP is unable to set the header compression protocol for the split bearer or the LWQ bearer.)

3> Data is discarded after the integrity protection or verification procedure is performed thereon. In case that the integrity verification procedure fails, the data may be discarded and reported to the upper layer.

3> The out-of-window or duplicate data is discarded.

2> When not discarded, the deciphering procedure is directly performed without ordering the received data. In case that the integrity protection or verification is set, the integrity verification is performed. Data is discarded after the integrity protection or verification procedure is performed thereon. When the integrity verification procedure fails, the data may be discarded and reported to the upper layer.

2> When the ordering is performed on the received data and the data are arranged in sequence in ascending order without a gap in the PDCP sequence numbers or count values, the header compression procedure is performed and (when the header compression procedure or decompression procedure is configured) data is transmitted to the upper layer in ascending order.

2> When the reordering timer is running,
  3> when data corresponding to the count value having the same value as the value obtained by subtracting 1 from the value maintained by the reordering variable is transmitted to the upper layer, or when data is all transmitted to the upper layer without a gap in the PDCP sequence number (or count value),
    4> the reordering timer is stopped and initialized.

2> When the reordering timer is not running,
  3> when there is data stored in the buffer without being transmitted to the upper layer, or when there is a gap in the PDCP sequence number (or count value),
    4> the reordering timer is started.
    4> The reordering variable is updated with the PDCP sequence number or count value expected to receive next.

2> When the reordering timer has expired,
  3> in case that the header decompression procedure is configured in the ascending order of the PDCP sequence numbers or count values for a value less than the reordering variable value, the header decompression procedure is performed and the stored data is transmitted to the upper layer.
  3> In case that the header decompression procedure is configured in the ascending order of the PDCP sequence numbers or count values continuously for the value equal to or greater than the reordering variable value for the stored data, the header decompression procedure is performed and the stored data is transmitted to the upper layer.
  3> The variable value for the last data transmitted to the upper layer is updated with the PDCP sequence number or count value of the last transmitted data.
  3> When there is data stored in the buffer without being transmitted to the upper layer, or when there is a gap in the PDCP sequence number (or count value),
    4> the reordering timer is started.
    4> The reordering variable is updated with the PDCP sequence number or count value expected to receive next.

1> (In the case of the (1-4)th PDCP layer structure) For example, when the UE applies the first PDCP layer structure and function 1$i$-12 to the NR PDCP layer, the reordering procedure and the reordering timer are always applied, and the embodiment of the present disclosure may have the following features.

2> The deciphering procedure is first performed on the received data.

2> In case that the integrity protection or verification procedure is configured, the integrity protection or verification procedure may be performed on the received data, and when the integrity verification procedure fails, the data may be discarded and reported to the upper layer.

2> The out-of-window data detection or duplicate data detection is performed on the received data. (After the deciphering procedure is performed, the out-of-window data detection or duplicate detection is performed. According to another method, only when the integrity protection or verification procedure is configured, the deciphering procedure is performed, and the out-of-window data detection or duplicate detection is then performed. When the integrity protection or verification procedure is not configured, the out-of-window data detection or duplicate detection is performed, and the deciphering procedure is then performed on data that is not discarded.)

3> The out-of-window or duplicate data is discarded.

2> In case that the data is not discarded, the ordering is performed on the received data, and the data are arranged in sequence in ascending order without a gap in the PDCP sequence numbers or count values, the header compression procedure is performed and (when the header compression procedure or decompression procedure is configured) data transmitted upper layer in ascending order.

2> When the data is transmitted to the upper layer, the data is transmitted in ascending order of count values.

2> When the reordering timer is running,

3> when data corresponding to the count value having the same value as the value obtained by subtracting 1 from the value maintained by the reordering variable is transmitted to the upper layer, when data is all transmitted to the upper layer without a gap in the PDCP sequence number (or count value), or when the value of the variable storing the PDCP sequence number or count value of the data to be transmitted to the upper layer is greater than or equal to the value of the reordering variable,
    4> the reordering timer is stopped and initialized.
2> When the reordering timer is not running,
    3> when there is data stored in the buffer without being transmitted to the upper layer, when there is a gap in the PDCP sequence number (or count value), or when the variable value storing the count value of the first data that is not transmitted to the upper layer is less than the reordering variable value,
        4> the reordering variable is updated with the PDCP sequence number or count value expected to receive next.
        4> The reordering timer is started.
2> When the reordering timer has expired,
    3> in case that the header decompression procedure is configured in the ascending order of the PDCP sequence numbers or count values for a value less than the reordering variable value, the header decompression procedure is performed and the stored data is transmitted to the upper layer.
    3> In case that the header decompression procedure is configured in the ascending order of the PDCP sequence numbers or count values continuously for the value equal to or greater than the reordering variable value for the stored data, the header decompression procedure is performed and the stored data is transmitted to the upper layer.
    3> The variable value for the first data that is not transmitted to the upper layer is updated with the PDCP sequence number or count value of the first data that is not transmitted to the upper layer.
    3> when there is data stored in the buffer without being transmitted to the upper layer, when there is a gap in the PDCP sequence number (or count value), or when the variable value storing the count value of the first data that is not transmitted to the upper layer is less than the reordering variable value,
        4> the reordering variable is updated with the PDCP sequence number or count value expected to receive next.
        4> The reordering timer is started.

The second PDCP layer structure 1*i*-20 proposed in FIG. 1I may have a (2-1)th PDCP layer structure or a (2-2)th PDCP layer structure proposed in the present disclosure, and may have the same features.

The present disclosure proposes the second PDCP layer structure 1*i*-20 that is efficient in handover. The second PDCP layer structure may be applied to the second embodiment of the efficient handover method of minimizing the data interruption time proposed in the present disclosure.

In the second PDCP layer structure, the UE may perform data transmission or reception with the source gNB 1*i*-21 through protocol layers of the first bearer (for example, an SDAP layer, a PDCP layer, an RLC layer, or a MAC layer). The UE may perform data transmission or reception with the target gNB 1*i*-22 through protocol layers of the second bearer (for example, an SDAP layer, a PDCP layer, an RLC layer, or a MAC layer).

The PDCP layer of the first bearer and the PDCP layer of the second bearer may be configured in the UE, respectively, but logically, may operate as a single PDCP layer device, as in 1*i*-20. Specifically, the single PDCP layer may divide the functions of the PDCP layer to implement the functions of an upper PDCP layer (for example, sequence number allocation function, reordering function, in-sequence delivery function, or duplicate detection function) and the functions of two lower PDCP layers for each source gNB and each target gNB (for example, deciphering or ciphering function, header (or data) compression or header (or data) decompression function, integrity protection or verification function, or duplicate detection function). Also, as proposed above, in the DAPS handover method, when the UE satisfies the first condition while transmitting uplink data to the source gNB, the UE switches to the target gNB, and downlink data may be continuously received from the source gNB and the target gNB. Therefore, the header (or data) compression protocol context may maintain and apply only one context for the source gNB or the target gNB for the uplink, and may maintain and apply two contexts for the source gNB or the target gNB for the downlink.

Based on the second PDCP layer structure proposed above, the second PDCP layer structure (for example, the E-UTRA PDCP layer for the DAPS handover method) proposed in the present disclosure may have the following features.

The upper transmitting PDCP layer may function to allocate the PDCP sequence number to data received from the upper layer. In the two lower transmitting PDCP layer functions 1*i*-21 and 1*i*-22 for each source gNB and each gNB, a separate security key set with each source gNB and each target gNB may be used to apply the header (or data) compression context or security key set with the source gNB to data to be transmitted to the source gNB and to apply the header (or data) compression context or security key set with the target gNB to data to be transmitted to the target gNB. In case that the header (or data) compression procedure is configured, the header (or data) compression procedure is applied. In case that the integrity protection is configured, the integrity protection procedure is applied to the PDCP headers and data (PDCP SDU), the ciphering procedure is applied, data to be transmitted to the source gNB is transmitted to the transmitting RLC layer of the first bearer, and data to be transmitted to the target gNB is transmitted to the transmitting RLC layer of the second bearer. The two lower transmitting PDCP layer functions 1*i*-21 and 1*i*-22 may perform parallel data processing in which the header compression, integrity protection, or ciphering procedure is performed in parallel so as to accelerate a data processing speed. In the two lower transmitting PDCP layer functions, the integrity protection or ciphering procedure may be performed by using different security keys. Also, logically, different data compression, integrity protection, or ciphering procedures may be performed by applying different compression contexts, security key, or security algorithms within the single transmitting PDCP layer.

In the receiving PDCP layer functions, for data received from each lower layer, specifically, for data received from two RLC layers for each source gNB and each target gNB, the out-of-window data detection or duplicate detection procedure may be independently performed on data received from each RLC layers based on PDCP sequence number or count value in the lower receiving PDCP layer functions 1*i*-21 and 1*i*-22 for the source gNB or the target gNB. According to another method, for convenience of implementation, the out-of-window data detection or duplicate detection procedure may be performed on all received data without distinguishing the RLC layers based on the PDCP sequence number or count value. According to another method, for more accurate duplicate detection, the out-of-window data detection may be performed on all received data without distinguishing the RLC layers based on the PDCP sequence number or count value, and the duplicate detection procedure may be independently performed on data received from each RLC layer. According to another method, in case that data received from different gNBs overlap each other, the out-of-window data detection may be performed on all received data based on the PDCP sequence number or count value without distinguishing the RLC layers in order to prevent data loss for the header compression protocol. Also, after the deciphering procedure or integrity protection procedure or the header (or data) decompression procedure is performed on data received from each RLC layer, the duplicate detection procedure may be performed on the entire data.

The lower functions of the receiving PDCP layer may directly apply the deciphering procedure on the received data by using a separate header (or data) compression context or security key set with each source gNB and each target gNB. Also, the lower functions of the receiving PDCP layer may apply the integrity verification procedure to the PDCP header and data (PDCP SDU) when the integrity protection is configured.

In the (2-1)th PDCP layer structure, the header (or data) decompression procedure may be performed directly on the data received from the RLC layers of the first bearer for each source gNB without ordering. Also, the header (or data) decompression procedure may be performed directly on the data received from the RLC layers of the second bearer for each target gNB without ordering. Also, in order to distinguish between the data received from the RLC layers of the first bearer for each source gNB and the data received from the RLC layers of the second bearer for each target gNB, an indicator may be defined for each data to determine whether data is received from the source gNB or data received from the target gNB. According to another method, a 1-bit indicator of a PDCP header, an SDAP header, or an RLC header may be defined to determine whether data is received from the source gNB or data received from the target gNB. Also, for data received from the RLC layers of the first bearer for the source gNB that has completed the header (or data) compression procedure and data received from the RLC layers of the second bearer for the target gNB, the duplicate detection procedure (the procedure of discarding all but one data (applicable including data previously received or transmitted to the upper layer) for each PDCP sequence number or count value) may be performed based on the PDCP sequence number or count value. For the data received from the RLC layers of the first bearer for the source gNB and the data received from the RLC layers of the second bearer for the target gNB, the reordering procedure may be performed in ascending order based on the PDCP sequence number or count value, and data may be sequentially transmitted to the upper layer. Because the single PDCP layer may receive data from different gNBs, that is, the first bearer or the second bearer in any order, it may be necessary to always perform the reordering procedure.

The two lower receiving PDCP layer functions may perform parallel data processing of performing the header compression, integrity protection, or ciphering procedure in parallel so as to accelerate the data processing speed based on the PDCP sequence number or count value. The integrity protection or ciphering procedure or the decompression procedure may be performed by using different header (or data) compression contexts or security keys. Also, logically, different data integrity protection or ciphering procedures or decompression procedures may be performed by applying different header (or data) compression contexts or security keys or security algorithms within a single transmitting PDCP layer. Also, in the lower receiving PDCP layer functions, the out-of-sequence deciphering or integrity verification procedure may be performed on each received data regardless of the order of the PDCP sequence number or count value.

When distinguishing between the layers of the first bearer and the layers of the second bearer, considering that they are connected to different MAC layers, considering that they have different logical channel identifiers or that they are different RLC layers connected to different MAC layers, or considering that different encryption keys are used, the single PDCP layer may perform the ciphering or deciphering procedure with different security keys for uplink data and downlink data so as to distinguish between the layers of the first bearer (or the first RLC layer) and the layers of the second bearer (or the second RLC layer), and may perform compression or decompression by using different compression protocol contexts.

Based on the second PDCP layer structure proposed above, the second PDCP layer structure (for example, the NR PDCP layer for the DAPS handover method) proposed in the present disclosure may have the following features.

The upper transmitting PDCP layer may function to allocate the PDCP sequence number to data received from the upper layer. In the two lower transmitting PDCP layer functions 1i-21 and 1i-22 for each source gNB and each gNB, a separate security key set with each source gNB and each target gNB may be used to apply the header (or data) compression context or security key set with the source gNB to data to be transmitted to the source gNB and to apply the header (or data) compression context or security key set with the target gNB to data to be transmitted to the target gNB. When the header (or data) compression procedure is configured, the header (or data) compression procedure is applied. In case that the integrity protection is configured, the integrity protection procedure is applied to the PDCP headers and data (PDCP SDU), the ciphering procedure is applied, data to be transmitted to the source gNB is transmitted to the transmitting RLC layer of the first bearer, and data to be transmitted to the target gNB is transmitted to the transmitting RLC layer of the second bearer.

The two lower transmitting PDCP layer functions 1i-21 and 1i-22 may perform parallel data processing in which the header compression, integrity protection, or ciphering procedure is performed in parallel so as to accelerate a data processing speed. In the two lower transmitting PDCP layer functions, the integrity protection or ciphering procedure may be performed by using different security keys. Also, logically, different data compression, integrity protection, or ciphering procedures may be performed by applying different compression contexts, security key, or security algorithms within the single transmitting PDCP layer.

In the receiving PDCP layer functions, for data received from each lower layer, specifically, for data received from two RLC layers for each source gNB and each target gNB, the out-of-window data detection or duplicate detection procedure may be independently performed on data received from each RLC layers based on PDCP sequence number or count value in the lower receiving PDCP layer functions 1i-21 and 1i-22 for the source gNB or the target gNB. According to another method, for convenience of implementation, the out-of-window data detection or duplicate detection procedure may be performed on all received data without distinguishing the RLC layers based on the PDCP sequence number or count value. According to another method, for more accurate duplicate detection, the receiving PDCP layer may perform the out-of-window data detection on all received data without distinguishing the RLC layers based on the PDCP sequence number or count value, and may independently perform the duplicate detection procedure on data received from each RLC layer. According another embodiment, in case that data received from different gNBs overlap each other, the receiving PDCP layer function may perform the out-of-window data detection on all received data without distinguishing the RLC layers based on the PDCP sequence number or count value so as to prevent data loss for the header compression protocol, and may perform the duplicate detection procedure on the entire data after receiving the deciphering procedure, the integrity protection procedure, or the header (or data) decompression procedure for data received from the RLC layers.

The lower functions of the receiving PDCP layer directly apply the deciphering procedure on the received data by using a separate header (or data) compression context or security key set with each source gNB and each target gNB, and when the integrity protection is configured, may apply the integrity verification procedure to the PDCP header and data (PDCP SDU).

In the (2-2)th PDCP layer structure, after the reordering procedure is applied on the data received from the RLC layers of the first bearer for each source gNB and the data received from RLC layers of the second bearer for each target gNB, the header (or data) decompression procedure may be performed by applying the header (or data) compression context of each gNB (the source gNB or the target gNB) for each data received from each gNB (the source gNB or the target gNB) in ascending order of PDCP sequence number or count value. Also, in order to distinguish between the data received from the RLC layers of the first bearer for each source gNB and the data received from the RLC layers of the second bearer for each target gNB, an indicator may be defined for each data to determine whether data is received from the source gNB or data received from the target gNB.

According to another method, a 1-bit indicator of a PDCP header, an SDAP header, or an RLC header may be defined to determine whether data is received from the source gNB or data received from the target gNB. Also, for data received from the RLC layers of the first bearer for the source gNB that has completed the header (or data) compression procedure and data received from the RLC layers of the second bearer for the target gNB, the duplicate detection procedure (the procedure of discarding all but one data (applicable including data previously received or transmitted to the upper layer) for each PDCP sequence number or count value) may be performed based on the PDCP sequence number or count value. For the data received from the RLC layers of the first bearer for the source gNB and the data received from the RLC layers of the second bearer for the target gNB, data may be sequentially transmitted to the upper layer in ascending order based on the PDCP sequence number or count value. Because the single PDCP layer may receive data from different gNBs, that is, the first bearer or the second bearer in any order, it may be necessary to always perform the reordering procedure.

The two lower receiving PDCP layer functions may perform parallel data processing of performing the header compression, integrity protection, or ciphering procedure in parallel so as to accelerate the data processing speed based on the PDCP sequence number or count value. Also, the two lower receiving PDCP layer functions may perform the integrity protection or ciphering procedure or the decompression procedure by using different header (or data) compression contexts or security keys. Also, logically, different data integrity protection or ciphering procedures or decompression procedures may be performed by applying different header (or data) compression contexts or security keys or security algorithms within a single transmitting PDCP layer. Also, in the lower receiving PDCP layer functions, the out-of-sequence deciphering or integrity verification procedure may be performed on each received data regardless of the order of the PDCP sequence number or count value.

When distinguishing between the layers of the first bearer and the layers of the second bearer, considering that they are connected to different MAC layers, considering that they have different logical channel identifiers or that they are different RLC layers connected to different MAC layers, or considering that different encryption keys are used, the single PDCP layer may perform the ciphering or deciphering procedure with different security keys for uplink data and downlink data so as to distinguish between the layers of the first bearer (or the first RLC layer) and the layers of the second bearer (or the second RLC layer), and may perform compression or decompression by using different compression protocol contexts.

The present disclosure may proposes a third PDCP layer structure 1i-30 that is efficient in handover. The third PDCP layer structure may be applied to the second embodiment of the efficient handover method of minimizing the data interruption time proposed in the present disclosure. Also, the PDCP layer function in the third PDCP layer structure proposed in the present disclosure may be the same as the second PDCP layer structure proposed in the present disclosure. However, the third PDCP layer structure may release the first bearer for the source gNB in the second PDCP layer structure. Specifically, the third PDCP layer structure proposed in the present disclosure has the same function as the second PDCP layer structure proposed above, but may have a structure in which the first bearer for the source gNB (for example, the SDAP layer, the PDCP layer, the RLC layer, or the MAC layer) is released. Therefore, the third PDCP layer structure may release QoS mapping information of the SDAP layer for the source gNB, security key information for the source gNB of the PDCP layer, header (or data) compression context information for the source gNB, or the RLC layer or MAC layer for the source gNB.

Figure 1J:
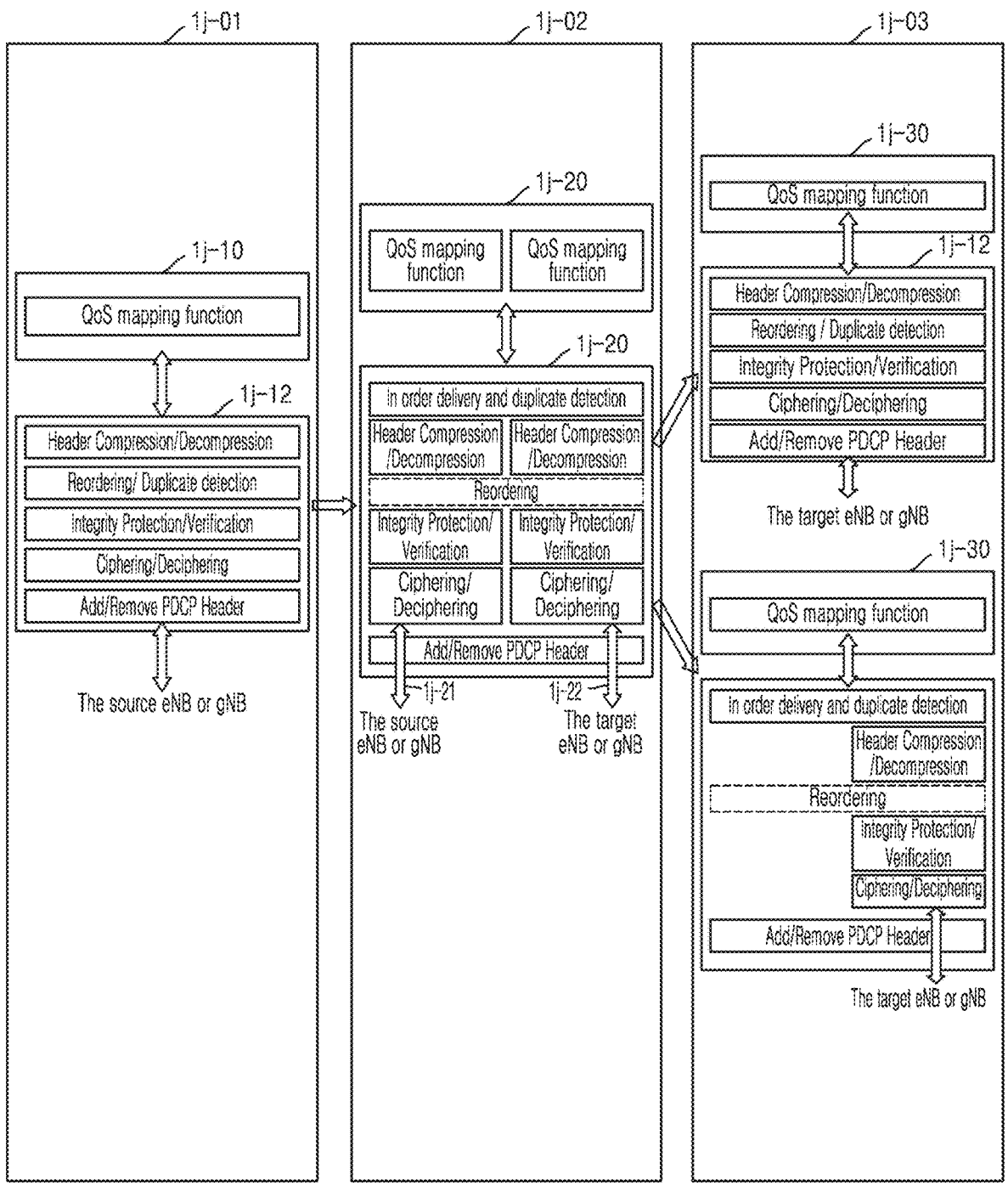
FIG. 1J is a diagram illustrating structures of an efficient service data adaptation protocol (SDAP) layer applied to a DAPS handover method, which is the second embodiment of the efficient handover method proposed in the present disclosure, and a method of applying the structures.

FIG. 1J is a diagram illustrating structures of an efficient SDAP layer applied to a DAPS handover method, which is the second embodiment of the efficient handover method proposed in the present disclosure, and a method of applying the structures.

FIG. 1J proposes a specific structure and functions of the efficient SDAP layer applied to the DAPS handover method, which is the second embodiment of the efficient handover method proposed in the present disclosure, and the structures of the SDAP layers proposed below may be applied to different SDAP layer structures for each bearer at different times while performing the DAPS handover procedure.

For example, before the handover command message is received from the gNB, the UE processes, transmits, or receives data by applying the first SDAP layer structure and function 1j-10 proposed in the present disclosure for each bearer (1j-01). In the first SDAP layer structure and function, the SDAP layer may maintain and apply first mapping information between one QoS flow and the bearer for the source gNB for the transmitting uplink data or the receiving downlink data (for example, a procedure of reading SDAP header information, updating the mapping information, configuring the SDAP header, or routing or transmitting to an appropriate upper layer or a lower layer based on the first mapping information between the QoS flow and the bearer).

However, in case that the UE receives the handover command message from the gNB and indicates the DAPS handover method proposed in the present disclosure in the handover command message, or in case that the DAPS handover method is indicated for specific bearers, the UE processes, transmits, or receives data by applying the second SDAP layer structure and function 1j-20 proposed in the present disclosure to each bearer or the bearers in which the DAPS handover method is indicated (1j-02). That is, in case that the handover command message is received and the DAPS handover method proposed in the present disclosure is indicated in the handover command message, in case that the DAPS handover method is indicated for specific bearers, in case that the DAPS handover method is configured for at least one bearer, or in case that the DAPS handover method is configured for a certain bearer, the UE may switch from a first SDAP layer structure or function 1j-10, which has been used for each bearer, to a second SDAP layer structure or function 1j-20 proposed in the present disclosure for each bearer or with respect to the bearer indicated by the DAPS handover method.

According to another method, when the first condition proposed in the present disclosure is satisfied (for example, when the random access procedure for the target gNB is completed or when the first timer is stopped), the UE may switch from the first SDAP layer structure or function 1j-10, which has been used for each bearer, to the second SDAP layer structure or function 1j-20 proposed in the present disclosure for each bearer or with respect to the bearer in which the DAPS handover method is indicated (1j-02). In case that the UE receives the handover command message and the DAPS handover method proposed in the present disclosure is indicated in the handover command message, when the DAPS handover method is indicated for specific bearers, or in case that mapping information between the QoS flow and the bearer is newly configured, the UE may switch from the first SDAP layer structure or function or 1i-10 to the second SDAP layer structure or function 1i-20 proposed in the present disclosure for each bearer or with respect to the bearer in which the DAPS handover method is indicated.

In the second SDAP layer structure, the first mapping information between the QoS flow and the bearer for the existing source gNB is maintained, and uplink data to be transmitted to the source gNB and downlink data to be received from the source gNB are processed. The second mapping information between the QoS flow and the bearer newly configured in the handover command message may be configured for the target gNB, and the UE may use the configured information to process uplink data to be transmitted to the target gNB and downlink data to be received from the target gNB. That is, in the second SDAP layer structure proposed in the present disclosure, the first mapping information between the QoS flow and the bearer or the second mapping information between the QoS flow and the bearer for the source gNB is maintained, and data for the source gNB and data for the target gNB are separately processed.

Also, in case that the first condition proposed in the present disclosure is satisfied, it is necessary to switch uplink data transmission to the target gNB for the bearers in which the DAPS handover method is indicated. Therefore, a procedure of changing, switching, or reconfiguring the first mapping information between the QoS flow and the bearer for the source gNB to the second mapping information between the QoS flow and the bearer for the target gNB may be performed for the uplink. As the mapping information is changed from the first mapping information between the QoS flow and the bearer to the second mapping information between the QoS flow and the bearer as described above, the UE transmits, to the target gNB, SDAP control data generated for each changed QoS flow (for example, an end marker indicating that the data is the last data for the changed QoS flow). Thus, when the target gNB receives uplink data from the UE, the UE may perform data processing by reflecting the change in the mapping information between the QoS flow and the bearer. The SDAP layer in the second SDAP layer structure may distinguish whether data received from a lower layer is data received from the source gNB or data received from the target gNB through a 1-bit indicator of an SDAP header, a 1-bit indicator of a PDCP header, or information indicated by the PDCP layer. In case that the gNB indicates the DAPS handover method for each bearer to the UE with the handover command message, the DAPS handover method is indicated for the default bearer (default DRB). Thus, in case that data is generated in a new QoS flow that does not correspond to the mapping information between the QoS flow and the bearer during the DAPS handover procedure, the UE may always transmit uplink data to the default bearer. When the DAPS handover method is not configured in the default bearer, uplink data transmission for the new QoS flow generated during handover is impossible. Therefore, a data interruption time may occur.

In case that the second condition proposed in the present disclosure is satisfied while the DAPS handover method proposed in the present disclosure is performed, the UE may release the first bearers for the source gNB, and may switch again from the second SDAP layer structure and function 1j-20 applied to each bearer or the bearer in which the DAPS handover method is indicated to the first SDAP layer structure and function 1j-10. In case that the second condition is satisfied, the UE may switch from the second SDAP layer structure or function 1j-20 to the first SDAP layer structure or function 1j-10 proposed in the present disclosure, for each bearer or with respect to the bearer in which the DAPS handover method is indicated. The UE may maintain the second bearer for the target gNB or the second mapping information between the QoS flow and the bearer. Before releasing the first bearer for the source gNB or the first mapping information between the QoS flow and the bearer, the UE may complete the data processing by applying the first mapping information between the QoS flow and the bearer to data received from the source gNB (for example, all data received from the source gNB), and then, may release the first mapping information between the QoS flow and the bearer or the first bearer. The UE may transmit the processed data to the upper layer in ascending order. That is, in case that the second condition is satisfied, the UE may process data by applying the first mapping information between the QoS flow and the bearer for the source gNB to the data stored in the buffer (for example, the data received from the source gNB) (for example, the procedure of reading SDAP header information, updating the mapping information, configuring the SDAP header, or routing or transmitting to an appropriate upper layer or lower layer based on the first mapping information between the QoS flow and the bearer), and may discard the first mapping information between the QoS flow and the bearer for the source gNB.

The SDAP layer may define and apply a 1-bit indicator of a new SDAP header, a 1-bit indicator of the PDCP header, SDAP control data (for example, downlink end marker), or information indicated by the PDCP layer. Based on this, the SDAP layer may identify what kind of data the last data received from the source gNB is. Therefore, after the data processing is perform by applying the first mapping information between the QoS flow and the bearer for the source gNB to the last data received from the source gNB, the SDAP layer may discard the first mapping information between the QoS flow and the bearer for the source gNB. The SDAP layer may continue to maintain the second mapping information between the QoS flow and the bearer and process uplink data or downlink data to the target gNB based on the mapping information.

In the present disclosure, when the UE receives the handover command message in FIG. 1F and applies the bearer configuration information included in the handover command message, applying the bearer configuration information in different ways according to the handover type indicated in the handover command message is proposed.

In case that the UE receives the handover command message and the first handover method (for example, the first embodiment of the present disclosure or the general handover method) is indicated in the handover command message, ReconfigWithSync information, or MobilityControlInfo information, when the second embodiment (DAPS handover method) proposed in the present disclosure is not configured, or when no bearer is configured in the bearer configuration information in the second embodiment (DAPS handover method) proposed in the present disclosure, in case that the default bearer is configured in the SDAP layer configuration information configured in the handover command message, the default bearer for the source gNB may be set as the default bearer for the target gNB indicated in the configuration information.

In case that the second mapping information between the QoS flow and the bearer is configured in the SDAP layer configuration information configured in the handover command message, the first mapping information between the QoS flow and the bearer applied for the source gNB may be released, and the second mapping information between the QoS flow and the bearer may be applied. According to another method, the first mapping information between the QoS flow and the bearer applied for the source gNB may be replaced with the second mapping information between the QoS flow and the bearer.

In case that a data discard timer value is set in the PDCP layer configuration information configured in the handover command message, the discard timer value may be directly applied to the PDCP layer corresponding to the bearer identifier of the configuration information.

In case that a drb-ContinueROHC indicator is set to false in the PDCP layer configuration information configured in the handover command message, the header compression or decompression protocol context may be initialized in the PDCP layer corresponding to the bearer identifier of the configuration information. In case that the drb-ContinueROHC indicator is set to true, the header compression or decompression protocol context is not initialized in the PDCP layer corresponding to the bearer identifier of the configuration information.

In case that a reordering timer value is set in the PDCP layer configuration information configured in the handover command message, the reordering timer value may be directly applied to the PDCP layer corresponding to the bearer identifier of the configuration information.

When the handover command message is received, the PDCP layer may be re-established. For example, window state variables may be initialized for SRB and the stored data (PDCP SDU or PDCP PDU) may be discarded. Window state variables for UM DRB may be initialized, and the transmission or retransmission may be performed by performing compression or ciphering or integrity protection on data that has not yet been transmitted to the lower layer or data for which the PDCP discard timer has not expired, in ascending order of count values, based on the header (or data) compression context or security key of the target gNB. When the reordering timer is running, the reordering timer is stopped and initialized. The received data (PDCP SDU or PDCP PDU) may be processed in sequence and transmitted to the upper layer. For AM DRB, window state variables are not initialized, and the transmission or retransmission may be performed by performing compression or ciphering or integrity protection based on the header (or data) compression context or security key in ascending order of PDCP sequence number or count value from the first data (PDCP SDU or PDCP PDU) for which successful delivery is not confirmed from the lower layer.

In case that the security key-related configuration information or security algorithm is set in the security configuration information configured in the handover command message, the UE may derive a new security key or security configuration information by using the configuration information, may release the existing security key or security configuration information, or may replace the existing security key or security configuration information with the new security key or security configuration information.

In case that a new logical channel identifier is configured in the RLC layer configuration information configured in the handover command message, the UE may release the existing logical channel identifier corresponding to the bearer identifier indicated in the RLC layer configuration information, or may replace the existing logical channel identifier with the new logical channel identifier.

In case that the RLC re-establishment procedure is configured in the RLC layer configuration information configured in the handover command message, the UE may perform the RLC re-establishment procedure for the RLC layer corresponding to the bearer identifier indicated in the RLC layer configuration information. That is, specifically, the UE may perform an RLC re-establishment procedure, and the transmitting RLC layer may perform a procedure of discarding all stored data. Also, in case that the reordering timer is running, the receiving RLC layer may stop and initialize the reordering timer, and may process all stored data and transmit the processed data to the upper layer. Also, the UE may reset the MAC layer. Also, the UE may reset the MAC layer for the source gNB and use the MAC layer for the target gNB.

The MAC layer may be reset, and data transmission or reception may be stopped for the source gNB and each bearer. Also, the MAC layer may stop PDCCH monitoring on the first UE identifier (C-RNTI) allocated from the source gNB. Also, the MAC layer may stop a procedure of requesting scheduling to the source gNB, or may release the transmission resource for scheduling. The PHY or MAC layer may perform the random access procedure to the target gNB. When the handover procedure to the target gNB is successfully completed, the PHY or MAC layer may resume data transmission or reception to the target gNB, and may start PDCCH monitoring on the second UE identifier (C-RNTI) allocated from the target gNB. The PHY or MAC layer may receive a system frame number from the target gNB and perform synchronization. The PHY or MAC layer may start or perform a procedure of requesting scheduling to the target gNB.

The PHY layer may stop the procedure of performing channel measurement, channel measurement report, or transmitting HARQ ACK or NACK to the source gNB. The PHY layer performs a downlink synchronization procedure with respect to the target gNB. Configuration information about the target gNB (or Spcell or Pcell) received in the handover command message may be configured in the lower layer or the PHY layer. When the handover procedure to the target gNB is successfully completed, the PHY layer may start or transmit HARQ ACK or NACK information to the target gNB. The PHY or MAC layer may receive a system frame number from the target gNB and perform synchronization. The PHY or MAC layer may start or perform a procedure of requesting scheduling to the target gNB.

In case that the RLC layer configuration information configured in the handover command message is newly configured, the UE may perform the RLC re-establishment procedure on the RLC layer corresponding to the bearer identifier indicated in the RLC layer configuration information.

In case that the second priority for the logical channel is newly configured in the MAC layer configuration information configured in the handover command message, the UE may release the first priority corresponding to the logical channel identifier indicated in the configuration information, or may replace the first priority corresponding to the logical channel identifier with the second priority newly configured above.

In case that the second priority bit rate (prioritisedBitRate, PBR) for the logical channel is newly configured in the MAC layer configuration information configured in the handover command message, the UE may release the first priority bit rate (prioritisedBitRate, PBR) corresponding to the logical channel identifier indicated in the configuration information, or may replace the first priority bit rate (prioritisedBitRate, PBR) corresponding to the logical channel identifier with the second priority bit rate (prioritisedBitRate, PBR) newly configured above. The priority bit rate is a value that increases for each logical channel every a certain time (for example, TTI). When the uplink transmission resource is received, the UE may perform a logical channel prioritization (LCP) procedure, may transmit data for the logical channel considering the priority and the priority bit rate, and may transmit more data as the priority is higher or the value of the priority bit rate is greater.

In case that the second bucket size (bucketSizeDuration) for the logical channel is newly configured in the MAC layer configuration information configured in the handover command message, the UE may release the first bucket size (bucketSizeDuration) corresponding to the logical channel identifier indicated in the configuration information, or may replace the first bucket size (bucketSizeDuration) corresponding to the logical channel identifier with the second bucket size (bucketSizeDuration) newly configured above. The bucket size indicates the maximum value that the priority bit rate may have when the priority bit rate is accumulated.

When second allowable SCell information, allowable sub-carrier spacing information, maximum PUSCH period, or logical channel group configuration information is configured in the MAC layer configuration information configured in the handover command message, the UE may release the previously configured first allowable S Cell information, allowable sub-carrier spacing information, maximum PUSCH period, or logical channel group configuration information, or may replace the previously configured first allowable SCell information, allowable subcarrier spacing information, maximum PUSCH period, or logical channel group configuration information with the second allowable SCell information, allowable subcarrier spacing information, maximum PUSCH period, or logical channel group configuration information newly configured above.

When the UE receives the handover command message, when the second handover method (for example, the second embodiment of the present disclosure or the DAPS handover method) is indicated or configured in the handover command message, ReconfigWithSync information, or mobilityControlInfo information, when the DAPS handover method is indicated or configured for each bearer identifier, when the second embodiment (DAPS handover method) proposed in the present disclosure is configured for a certain bearer in the bearer configuration information, or when the second embodiment (DAPS handover method) proposed in the present disclosure is configured for at least one bearer in the bearer configuration information, in case that the default bearer is configured in the SDAP layer configuration information configured in the handover command message, the UE may perform the DAPS handover method proposed above in the present disclosure, may apply the second SDAP layer structure to maintain the default bearer for the existing source gNB, and may configure the default bearer information indicated in the configuration information as the default bearer for the target gNB. According to another method, when the first condition proposed in the present disclosure is satisfied, the UE may switch the default bearer for the existing source gNB to the default bearer for the target gNB indicated in the configuration information.

In case that the second mapping information between the QoS flow and the bearer is configured in the SDAP layer configuration information configured in the handover command message, the UE may perform the DAPS handover method proposed above in the present disclosure, and may apply the second SDAP layer structure to maintain the first mapping information between the QoS flow and the bearer applied for the source gNB, and may apply the second mapping information between the QoS flow and the bearer to data for the target gNB. According to another method, in case that the first condition proposed in the present disclosure is satisfied, the UE may apply the second mapping information between the QoS flow and the bearer for the target gNB.

In case that the data discard timer value is set in the PDCP layer configuration information configured in the handover command message, the UE may perform the DAPS handover method proposed above in the present disclosure, and apply the second PDCP layer structure to directly apply the discard timer value to the PDCP layer corresponding to the bearer identifier of the configuration information.

The PDCP layer in which the DAPS handover method is indicated or configured in the handover command message is not re-established, and may perform the following procedure. For example, for SRB, the UE may initialize window state variables (the variable initialization may be omitted for fallback when the DAPS handover fails) or may discard the stored data (PDCP SDU or PDCP PDU). For UM DRB, the UE may continue to perform data transmission or reception with the source gNB for data that has not yet been transmitted to the lower layer or data for which the PDCP discard timer has not expired, without initializing window state variables. For AM DRB, the UE may continue to perform data transmission or reception with the source gNB without initializing window state variables.

The PDCP layer in which the DAPS handover method is not indicated or configured in the handover command message may re-establish the PDCP layer. For example, the UE may initialize window state variables for SRB and may discard the stored data (PDCP SDU or PDCP PDU). The UE may initialize window state variables for UM DRB, and may perform the transmission or retransmission by performing compression or ciphering or integrity protection on data that has not yet been transmitted to the lower layer or data for which the PDCP discard timer has not expired, in ascending order of count values, based on the header (or data) compression context or security key of the target gNB. When the reordering timer is running, the UE may stop or initialize the reordering timer. The UE may process the received data (PDCP SDU or PDCP PDU) in sequence and transmit the processed data to the upper layer. For AM DRB, the UE may not initialize window state variables, and may perform the transmission or retransmission by performing compression or ciphering or integrity protection based on the header (or data) compression context or security key in ascending order of PDCP sequence number or count value from the first data (PDCP SDU or PDCP PDU) for which successful delivery is not confirmed from the lower layer. Also, the RLC layer may also perform the re-establishment procedure.

In case that the drb-ContinueROHC indicator is set to false in the PDCP layer configuration information in which the DAPS handover method is indicated or configured in the handover command message, the UE may perform the DAPS handover method proposed above in the present disclosure, and may apply the second PDCP layer structure to use the header compression or decompression protocol context for the source gNB, as it is, in the PDCP layer corresponding to the bearer identifier of the configuration information, to initialize the header compression or decompression protocol context for the target gNB, and to start from an initial state (for example, IR state). In case that the drb-ContinueROHC indicator is set to true, the UE may perform the DAPS handover method proposed above in the present disclosure, and may apply the second PDCP layer structure to use the header compression or decompression protocol context for the source gNB, as it is, in the PDCP layer corresponding to the bearer identifier of the configuration information, to equally apply the header compression or decompression protocol context for the target gNB to the header compression or decompression protocol context for the source gNB. For example, the header compression or decompression protocol context for the source gNB may be applied as it is by being copied to the header compression or decompression protocol context for the target gNB. According to another method, the same header compression or decompression protocol context may be applied to the target gNB or the source gNB.

In case that the DAPS handover method is indicated in the handover command message or when the reordering timer value is set in the configured PDCP layer configuration information, the UE may perform the DAPS handover method proposed above in the present disclosure, and may apply the second PDCP layer structure to directly apply the reordering timer value to the PDCP layer corresponding to the bearer identifier of the configuration information.

In case that the security key-related configuration information or security algorithm is configured in the security configuration information in which the DAPS handover method is indicated or configured in the handover command message, or in case that there is an indicator indicating a new procedure in the PDCP layer configuration information, the UE may derive a new security key or security configuration information by using the configuration information, may perform the DAPS handover method proposed above in the present disclosure, may apply the second PDCP layer structure to maintain the existing security key or security configuration information for the source gNB, and may configure the security key or security configuration information for the target gNB as the new security key or security configuration information.

In case that a new logical channel identifier is configured in the RLC layer configuration information of the bearer in which the DAPS handover method is indicated or configured in the handover command message, the UE may perform the DAPS handover method proposed above in the present disclosure, may apply the second PDCP layer structure to maintain the existing logical channel identifier for the RLC layer or MAC layer of the first bearer for the source gNB corresponding to the bearer identifier indicated in the RLC layer configuration information, and may configure the new logical channel identifier indicated in the configuration information with respect to the RLC layer or the MAC layer of the second bearer for the target gNB.

The UE may not perform the RLC re-establishment procedure on the RLC layer for the source gNB in the RLC layer configuration information of the bearer in which the DAPS handover method configured in the handover command message is indicated or configured. Specifically, the transmitting RLC layer may continue to transmit the stored data without performing the RLC re-establishment procedure. Also, the receiving RLC layer may continuously process the stored data together with the receiving data so that data interruption time does not occur. However, in case that the first condition proposed in the present disclosure is satisfied, the PDCP layer for which the DAPS handover method is configured may transmit a data discard indicator for PDCP user data (PDCP data PDU) so as to indicate the discard of data (PDCP data PDU) to the RLC layer for the source gNB with respect to the AM bearer or the UM bearer according to the method proposed in the present disclosure, Therefore, the RLC layer for the source gNB discards the PDCP data PDU, but may transmit PDCP control PDU without discarding the PDCP control PDU.

The PLC re-establishment procedure may be performed on the RLC layer of the bearer in which the DAPS handover method configured in the handover command message is not indicated or configured. In case that the RLC re-establishment procedure is configured, the RLC re-establishment procedure may be performed. That is, specifically, the RLC re-establishment procedure is performed so that the transmitting RLC layer may perform the procedure of discarding all stored data (PDCP Data PDU or PDCP control PDU). Also, in case that the reordering timer is running, the receiving RLC layer may stop and initialize the reordering timer, and may process all stored data and transmit the processed data to the upper layer.

In case that a new logical channel identifier is configured in the RLC layer configuration information of the bearer in which the DAPS handover method is indicated or configured in the handover command message, the UE may perform the DAPS handover method proposed above in the present disclosure, may apply the second PDCP layer structure to maintain the existing logical channel identifier for the RLC layer or MAC layer of the first bearer for the source gNB corresponding to the bearer identifier indicated in the RLC layer configuration information, and may configure the new logical channel identifier indicated in the configuration information with respect to the RLC layer or the MAC layer of the second bearer for the target gNB.

In case that the RLC layer configuration information of the bearer in which the DAPS handover method is indicated or configured in the handover command message is newly configured, the DAPS handover method proposed above in the present disclosure may be performed, and the second PDCP layer structure is applied. Thus, for the RLC layer of the first bearer for the source gNB corresponding to the bearer identifier indicated in the RLC layer configuration information, the existing RLC configuration information may be maintained. For the RLC layer of the second bearer for the target gNB, the new RLC layer configuration information indicated in the configuration information may be configured.

Figure 1K:
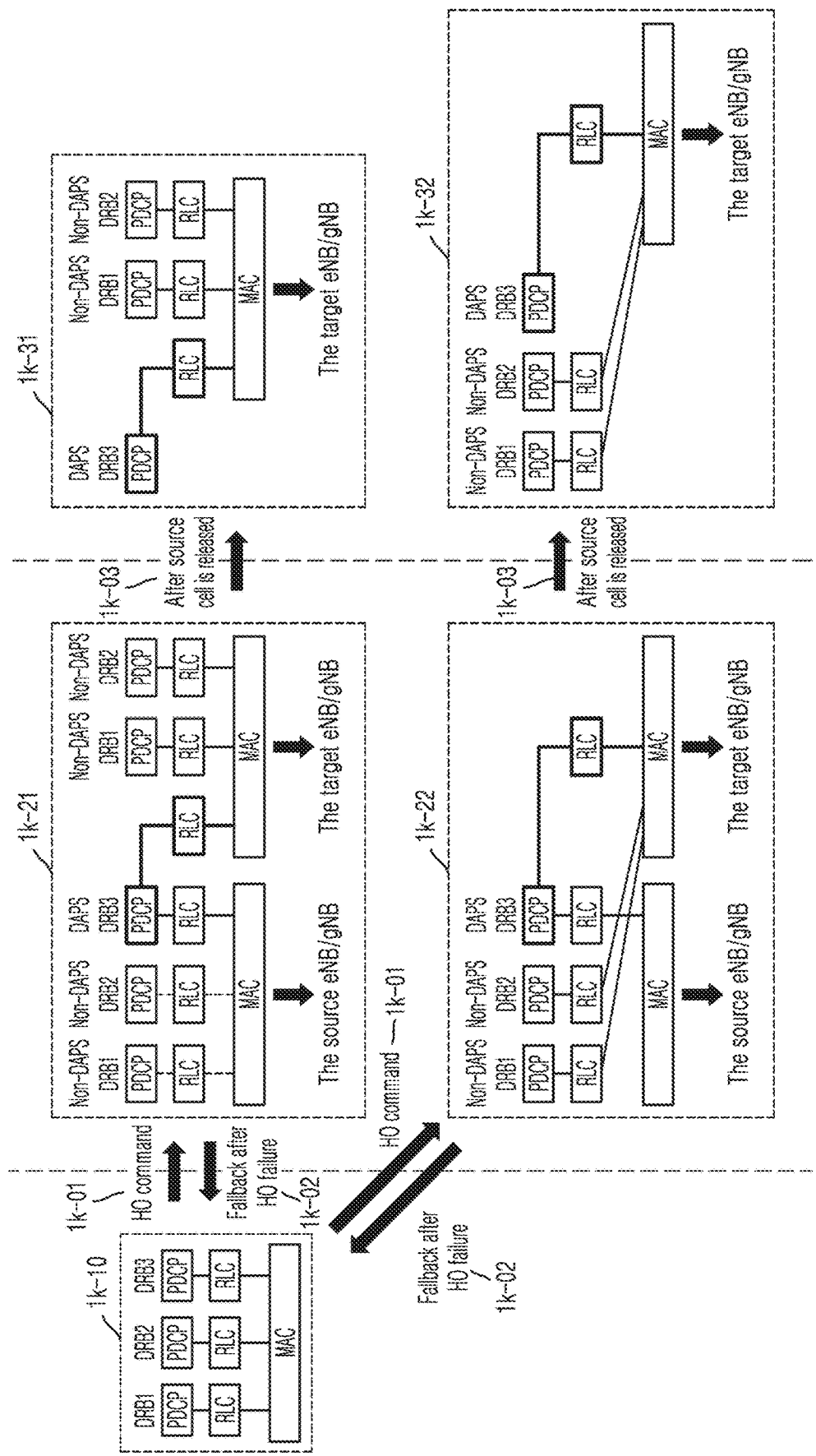
FIG. 1K is a diagram illustrating a method of applying bearer-specific configuration information when a DAPS handover method is configured, according to an embodiment of the present disclosure.

Method 1, Method 2, or Method 3 of configuring the MAC layer proposed in FIG. 1K of the present disclosure may be performed.

Method 1, Method 2, or Method 3 of configuring the MAC layer proposed in FIG. 1K is performed, and the data transmission or reception may be continuously performed for the bearers in which the DAPS handover method is indicated or configured in the MAC layer. The MAC layer is not reset, and the data transmission or reception may be stopped for the bearers in which a DAPS handover method is not indicated or configured.

The PDCCH monitoring for the first UE identifier (C-RNTI) allocated from the source gNB may be continuously performed without resetting the MAC layer for the source gNB. Also, the MAC layer for the source gNB may continue to perform a scheduling request to the source gNB. The PHY or MAC layer for the target gNB may apply the configuration to the configuration information to be received in the handover command message and perform the random access procedure to the target gNB. When the handover procedure to the target gNB is successfully completed, the PHY or MAC layer for the target gNB may start data transmission or reception to the target gNB, and may start PDCCH monitoring on the second UE identifier (C-RNTI) allocated from the target gNB. The PHY or MAC layer may receive a system frame number from the target gNB and perform synchronization. The PHY or MAC layer for the target gNB may start or perform a procedure of requesting scheduling to the target gNB. Until the connection with the source gNB is released or until the second condition proposed in the present disclosure is satisfied, the UE may perform PDCCH monitoring for the first UE identifier allocated from the source gNB in the PHY or MAC layer for the source gNB, and may perform PDCCH monitoring for the second UE identifier allocated from the target gNB in the PHY or MAC layer for the target gNB. When the connection with the source gNB is released, or when the second condition proposed in the present disclosure is satisfied, the UE may stop the PDCCH monitoring for the first UE identifier allocated from the source gNB in the PHY or MAC layer for the source gNB, or may release the transmission resource for the scheduling request.

The PHY layer for the source gNB may continue to perform the procedure of maintaining configuration information, performing channel measurement for the source gNB, performing a channel measurement report, or transmitting HARQ ACK or NACK. The PHY or MAC layer for the target gNB performs a downlink synchronization procedure with respect to the target gNB. The PHY or MAC layer for the target gNB may configure configuration information about the target gNB (or Spcell or Pcell) received in the handover command message in the lower layer or the PHY layer for the target gNB. When the handover procedure to the target gNB is successfully completed, the PHY or MAC layer for the target gNB may start or transmit HARQ ACK or NACK information to the target gNB. The PHY or MAC layer for the target gNB may receive a system frame number from the target gNB and perform synchronization. The PHY or MAC layer for the target gNB may start or perform a procedure of requesting scheduling to the target gNB, a procedure of performing channel measurement, or a procedure of reporting a channel measurement result. Until the connection with the source gNB is released or until the second condition proposed in the present disclosure is satisfied, the UE may perform PDCCH monitoring for the first UE identifier allocated from the source gNB in the PHY or MAC layer for the source gNB, and may perform PDCCH monitoring for the second UE identifier allocated from the target gNB in the PHY or MAC layer for the target gNB. When the connection with the source gNB is released, or when the second condition proposed in the present disclosure is satisfied, the UE may stop the PDCCH monitoring for the first UE identifier allocated from the source gNB in the PHY or MAC layer for the source gNB, or may release the transmission resource for the scheduling request.

Method 1, Method 2, or Method 3 of configuring or processing the SRB proposed in FIG. 1K of the present disclosure may be performed.

In case that the second priority for the logical channel is newly configured in the MAC layer configuration information configured in the handover command message, the DAPS handover method proposed above in the present disclosure may be performed, and the second PDCP layer structure may be applied. The existing configuration information may be maintained for the MAC layer of the first bearer for the source gNB corresponding to the indicated bearer identifier, and a new logical channel identifier indicated in the configuration information may be configured for the MAC layer of the second bearer for the target gNB. The newly configured second priority corresponding to the logical channel identifier indicated in the configuration information may be configured. According to another method, when the first condition proposed in the present disclosure is satisfied, the priority may be applied to the MAC layer of the second bearer for the target gNB for each logical channel identifier.

In case that the second priority bit rate (prioritisedBitRate, PBR) for the logical channel is newly configured in the MAC layer configuration information configured in the handover command message, the UE may perform the DAPS handover method proposed above in the present disclosure. The second PDCP layer structure may be applied, the existing configuration information may be maintained for the MAC layer of the first bearer for the source gNB corresponding to the indicated bearer identifier, and a new logical channel identifier indicated in the configuration information may be configured for the MAC layer of the second bearer for the target gNB. The newly configured second priority bit rate corresponding to the logical channel identifier indicated in the configuration information may be configured. According to another method, in case that the first condition proposed in the present disclosure is satisfied, the second priority bit rate may start to be applied to the logical channel identifier in the MAC layer of the second bearer for the target gNB (in this way, when different handover methods are indicated for each bearer, uplink transmission resources may be fairly distributed). The priority bit rate is a value that increases for each logical channel every certain time (for example, TTI) when starting to be applied to each logical channel identifier. When the uplink transmission resource is received, the LCP procedure may be performed. Data for the logical channel may be transmitted considering the priority and the priority bit rate. As the priority is higher or the value of the priority bit rate is greater, more data may be transmitted.

Also, in case that the DAPS handover method is applied, when the first condition proposed in the present disclosure is not yet satisfied, and thus, the UE needs to transmit uplink data through the first bearer for the source gNB, the MAC layer of the first bearer may, when performing the LCP procedure, select only the bearers or logical channel identifiers, in which the DAPS handover method (or the handover method that may continue to transmit data to the source gNB even after receiving the handover command message) is indicated, as the target of the LCP procedure and perform the LCP procedure. For the bearers or logical channel identifiers to which the DAPS handover method is not applied, the uplink data may not be transmitted to the source gNB when the handover command message is received. Thus, the bearers or logical channel identifiers should not be selected as the target of the LCP procedure.

In case that the second bucket size (bucketSizeDuration) for the logical channel is newly configured in the MAC layer configuration information configured in the handover command message, the UE may perform the DAPS handover method proposed above in the present disclosure. The second PDCP layer structure may be applied. The existing configuration information may be maintained for the MAC layer of the first bearer for the source gNB corresponding to the bearer identifier indicated above. A new logical channel identifier indicated in the configuration information may be configured for the MAC layer of the second bearer for the target gNB. The newly configured second bucket size corresponding to the logical channel identifier indicated in the configuration information may be configured. According to another method, when the first condition proposed in the present disclosure is satisfied, the second bucket size may start to be applied to the logical channel identifier in the MAC layer of the second bearer for the target gNB (in this way, when different handover methods are indicated for each bearer, uplink transmission resources may be fairly distributed). The bucket size indicates the maximum value that the priority bit rate may have when the priority bit rate is accumulated.

When second allowable S Cell information, allowable sub-carrier spacing information, maximum PUSCH period, or logical channel group configuration information is configured in the MAC layer configuration information configured in the handover command message, the UE performs the DAPS handover method proposed above of the present disclosure, may apply the second PDCP layer structure to maintain the existing configuration information for the MAC layer of the first bearer for the source gNB corresponding to the bearer identifier indicated above, and may configure the second allowable SCell information, allowable sub-carrier spacing information, maximum PUSCH period, or logical channel group configuration information indicated in the configuration information for the MAC layer of the second bearer for the target gNB.

FIG. 1K is a diagram illustrating a method of applying bearer-specific configuration information when a DAPS handover method is configured, according to an embodiment of the present disclosure.

As proposed in FIG. 1K in the present disclosure, in case that the UE receives the handover command message (1*k*-01), when the second handover method (for example, the second embodiment of the present disclosure or the DAPS handover method) is indicated in the ReconfigWithSync information, in case that the DAPS handover method is indicated for each bearer identifier or logical channel identifier, in case that the DAPS handover method is configured for at least one bearer, or in case that the DAPS handover method is configured for a certain bearer, the UE may generate or establish the MAC layer for the target gNB (or target cell) at the time of receiving the handover command message. The UE may continue to transmit or receive data with the source gNB only for bearers (AM bearers or UM bearers) in which the DAPS handover method is indicated through the MAC layer for the source gNB (or source cell) before until the first condition proposed in the present disclosure is satisfied from the time when the handover command message is received. When the first condition is satisfied, the UE may switch the uplink data to the target gNB, and may receive downlink data from the source gNB until the connection with the source gNB is released. However, for the bearers in which the DAPS handover method is not indicated, the UE may not perform data transmission or reception with the source gNB continuously or before until the first condition proposed in the present disclosure is satisfied from the time when the handover command message is received. Therefore, in order to cause the UE to perform the operation proposed in the present disclosure, one or more of the following methods may be applied, and may be modeled as in FIGS. 1K-2I or 1K-22. When the second condition proposed in the present disclosure is satisfied and the source gNB is released, it may be modeled as 1K-31 or 1K-32.

The SRBs configured in the MAC layer for the source gNB may be stopped when the UE receives the handover command message as proposed in the present disclosure and the second handover method (for example, the second embodiment of the present disclosure or the DAPS handover method) is indicated in the ReconfigWithSync information, when the DAPS handover method is indicated for each bearer identifier or logical channel identifier, when the DAPS handover method is configured for at least one bearer, or when the DAPS handover method is configured for a certain bearer. The upper layer (for example, the RRC layer device) of the UE may indicate the MAC layer for the source gNB to perform the reconfiguration (MAC reconfiguration) with configuration information except for the configuration information related to the bearer in which the DAPS handover method is not indicated in the handover command message in the configuration information of the current MAC layer. According to another method, the upper layer (for example, the RRC layer) of the UE may indicate the MAC layer for the source gNB to perform the reconfiguration (MAC reconfiguration) with configuration information including only the configuration information related to the bearer in which the DAPS handover method is indicated in the handover command message in the configuration information of the current MAC layer. When the UE reconfigures the MAC layer for the source gNB, the MAC layer for the source gNB of the UE may maintain only the logical channel identifiers in which the DAPS handover method is indicated, or the priority bit rate or bucket size corresponding to the logical channel identifiers, and may release, no longer use, or no longer apply the logical channel identifiers corresponding to the bearer in which the DAPS handover method is not indicated, or the priority bit rate or bucket size corresponding to the logical channel identifiers. Also, the upper layer (for example, the RRC layer) of the UE may perform the PDCP re-establishment procedure or RLC re-establishment procedure on the bearer in which the DAPS handover method is not indicated, may apply the PDCP configuration information or RLC configuration information configured in the handover message, or may stop the bearer. Alternatively, the upper layer of the UE may stop the bearer in the MAC layer for the source gNB, or it may be configured in the MAC layer for the target gNB (it may be configured in the MAC layer for the target gNB when the first condition is satisfied). In the handover command message, it may be indicated to the MAC layer for the target gNB so that bearer configuration information such as the logical channel identifier, priority bit rate, or bucket size configured for the target gNB with respect to the bearer in which the DAPS handover method is not indicated is configured or applied to the MAC layer for the target gNB. Alternatively, the upper layer of the UE may switch the connection of the PDCP layer or the RLC layer corresponding to the bearer in which the DAPS handover method is not indicated from the MAC layer for the source gNB to the MAC layer for the target gNB. In this case, when the MAC layer for the source gNB of the UE performs the LCP procedure for data transmission from that time point, only logical channel identifiers corresponding to the bearer in which the DAPS handover method is indicated are selected as a candidate group, and the LCP procedure may be performed thereon. The procedure, performed by the upper layer (for example, the RRC layer), of reconfiguring the MAC layer for the source gNB may partially reset the MAC layer for the source gNB (partial MAC reset) to perform the same procedure. For example, configuration information of the MAC layer for the bearer in which the DAPS handover method is not indicated may be initialized or released, or the application thereof may be stopped. The data transmission or reception with the source gNB may be performed until the first condition proposed in the present disclosure is satisfied. For the logical channel identifier corresponding to the bearer in which the DAPS handover method is not indicated, the MAC layer for the source gNB may first initialize the bit rate, may no longer apply a priority bit rate cumulative calculation procedure, and may release or stop the bearer. Also, for the logical channel identifier corresponding to the bearer in which the DAPS handover method is indicated, the MAC layer for the source gNB may continue to maintain the priority bit rate, and may perform the cumulative calculation procedure. When the first condition is satisfied, the data transmission may be switched to the target gNB. The MAC layer for the target gNB may initialize the priority bit rate for the newly configured logical channel identifiers (logical channel identifiers corresponding to the bearer in which the DAPS handover method is indicated or the bearer in which the DAPS handover method is not indicated), or may start the cumulative calculation (according to another method, when the handover command message for the MAC layer for the target gNB is received, the priority bit rate may be initialized and the cumulative calculation may be started). When the bearers in which the DAPS handover method is not indicated have been configured or have been stopped, the MAC layer for the target gNB may be configured or resumed to perform data transmission or reception with the target gNB, and may initialize the priority bit rate or start cumulative calculation. The data reception is performed from the source gNB or the target gNB until the second condition proposed in the present disclosure is satisfied. When the second condition is satisfied (1k-03), the MAC layer for the source gNB is reset. The RLC layer, the PDCP layer, or the bearer configuration information corresponding to the bearer in which the DAPS handover method connected to the MAC layer for the source gNB is not indicated may be released from the MAC layer for the source gNB. The RLC layer or bearer configuration information corresponding to the bearer in which the DAPS handover method is indicated may be released from the second PDCP layer structure or the MAC layer for the source gNB (1k-31 or 1k-32). In case that the handover procedure fails and the connection with the source gNB is valid as proposed below in the present disclosure, the UE may perform a fallback procedure to the source gNB (1k-02), may resume SRB configured in the MAC layer of the source gNB, may report handover failure, may apply the existing bearer configuration information of the source gNB before receiving the handover command message again, may apply the configuration information of the original MAC layer (for example, the RRC layer may reconfigure the MAC layer configuration information used before receiving the handover command message for the MAC layer configuration), and may resume data transmission or reception with the source gNB for each bearer (1k-10). According to another method, the upper layer (for example, the RRC layer) of the UE may indicate the RLC re-establishment procedure for the bearer in which the DAPS handover method is indicated or the bearer that is not indicated. According to another method, when the source gNB performs the DAPS handover method, configuration information of the MAC layer for the source gNB to be applied may be set as an RRC message.

In the methods proposed in the present disclosure, in case that the UE receives the handover command message, in case that the second handover method (for example, the second embodiment of the present disclosure or the DAPS handover method) is indicated in the ReconfigWithSync information, in case that the DAPS handover method is indicated for each bearer identifier or logical channel identifier, when the DAPS handover method is configured for at least one bearer, or in case that the DAPS handover method is configured for a certain bearer, SRBs configured in the MAC layer for the source gNB may apply one or more of the following methods.

In case that the UE receives the handover command message, when the second handover method (for example, the second embodiment of the present disclosure or the DAPS handover method) is indicated in the ReconfigWithSync information, in case that the DAPS handover method is indicated for each bearer identifier or logical channel identifier, in case that the DAPS handover method is configured for at least one bearer, or in case that the DAPS handover method is configured for a certain bearer, Method 1: SRB may be stopped in the MAC layer for the source gNB. Alternatively, window state variables may be initialized by performing the RLC layer re-establishment procedure or the PDCP layer re-establishment procedure of the SRBs, and the stored data (PDCP SDU, PDCP PDU, RLC SDU, or RLC PDU) may be discarded. Alternatively, SRBs may be configured in the MAC layer for the target gNB according to the configuration received in the handover message. According to another method, SRBs of the MAC layer for the source gNB may be configured according to the configuration received in the handover message, and may be switched and connected to the MAC layer for the target gNB. When the UE fails the handover procedure and performs a fallback procedure, the UE may resume the SRBs stopped in the MAC layer for the source gNB or reconfigure the SRBs configured in the target gNB to the existing configuration for the source gNB, and may be switched and connected to the MAC layer for the source gNB and resumed.

Method 2: SRB may be stopped in the MAC layer for the source gNB. Alternatively, the RLC layer re-establishment procedure or the PDCP layer re-establishment procedure of the SRBs may be stopped without being performed. Alternatively, SRBs may be configured in the MAC layer for the target gNB according to the configuration received in the handover message. According to another method, SRBs of the MAC layer for the source gNB may be configured according to the configuration received in the handover message, and may be switched and connected to the MAC layer for the target gNB. When the UE fails the handover procedure and performs a fallback procedure, the UE may resume the SRBs stopped in the MAC layer for the source gNB or reconfigure the SRBs configured in the target gNB to the existing configuration for the source gNB, and may be switched and connected to the MAC layer for the source gNB and resumed.

Method 3: SRB may be stopped in the MAC layer for the source gNB. Alternatively, the RLC layer re-establishment procedure of the PDCP layer re-establishment procedure of the SRBs is not performed, and window state variables are not initialized, but the stored data (PDCP SDU, PDCP PDU, RLC SDU, or RLC PDU) may be discarded (in order to prevent non-transmitted RRC messages from being transmitted unnecessarily later). Alternatively, SRBs may be configured in the MAC layer for the target gNB according to the configuration received in the handover message. According to another method, SRBs of the MAC layer for the source gNB may be configured according to the configuration received in the handover message, and may be switched and connected to the MAC layer for the target gNB. When the UE fails the handover procedure and performs a fallback procedure, the UE may resume the SRBs stopped in the MAC layer for the source gNB or reconfigure the SRBs configured in the target gNB to the existing configuration for the source gNB, and may be switched and connected to the MAC layer for the source gNB and resumed.

The present disclosure proposes a method of, when the UE performs the second embodiment (DAPS handover method) of the efficient handover method proposed in the present disclosure and the UE fails handover, quickly falling back to the source gNB and reconfiguring the connection by using the features of the DAPS handover method proposed above. Specifically, the feature of the DAPS handover method proposed in the present disclosure may mean that data transmission or reception is performed while maintaining the connection with the source gNB even when the handover procedure is performed. Fallback using a wireless connection connected to an existing source gNB even when handover fails is specifically proposed in the present disclosure below.

As described with reference to FIG. 1H of the present disclosure, in the second embodiment of the efficient handover method (DAPS handover method), even when the UE receives the handover command message from the source gNB, the UE may perform the handover procedure to the target gNB while maintaining data transmission or reception with the source gNB, as proposed in 1h-02. Also, the present disclosure proposes a procedure of falling back to the source gNB when the handover procedure to the target gNB fails.

As proposed above, in case that the UE fails the handover procedure to the target gNB, a method of determining whether the wireless connection between the UE and the source gNB is valid is required in order to fall back to the source gNB. In case that the wireless connection between the UE and the source gNB is not valid, the UE fails the handover, and when the fallback to the source gNB is performed, the fallback procedure to the source gNB also fails. Thus, the data interruption time excessively increases, resulting in significant data loss. Also, in case that the wireless connection between the UE and the source gNB is valid, it is also necessary to maintain the SRB configured in the UE and the source gNB.

First, the present disclosure proposes new timers applicable to the handover method and specific operations of the timers. Also, according to the present disclosure, specific operations of the timers may be different from each other according to the type of the handover method indicated by the handover command message in the gNB. Also, a method of releasing or maintaining the connection with the source gNB or the SRB configuration according to the handover method is proposed.

In the present disclosure, in order to efficiently perform the handover procedure, a first timer (for example, T304), a second timer (for example, T310), a third timer (for example, T312), or a fourth timer (for example, a timer for fallback) may be introduced, and may be driven and applied in the handover procedure. The first timer (for example, T304), the second timer (for example, T310), the third timer (for example, T312), or the fourth timer (for example, the timer for fallback) proposed in the present disclosure may perform different operations as follows according to the type of the handover method indicated by the handover command message. For example, the first timer (for example, T304) is a timer for determining whether handover has been successfully performed. Also, the second timer (for example, T310) is a timer for determining whether the wireless connection is valid. Also, the third timer (for example, T312) is an auxiliary timer for determining whether the wireless connection is valid, and a timer for triggering a frequency measurement procedure and reporting a frequency measurement result. The fourth timer (for example, the timer for fallback) is a timer for, when handover fails while performing the second embodiment (DAPS handover method) of the efficient handover method proposed in the present disclosure, performing the fallback procedure to the source gNB, transmitting a message indicating that handover failure has been performed to the source gNB, and determining whether the fallback procedure has been successfully performed or has failed.

Specific operations of the first timer (for example, T304), the second timer (for example, T310), the third timer (for example, T312), or the fourth timer (for example, the timer for fallback) proposed in the present disclosure so as to support the efficient handover method are proposed as follows according to the indicated handover method.

1> The UE receives, from the lower layer (for example, the MAC layer or the PHY layer), an out-of-sync indication indicating that the synchronization of the radio connection signal does not match a certain number of times (for example, which may be set by the gNB), and when a problem in the physical layer is detected, may start the second timer (for example, T310) when the first timer is not running The UE stops the second timer when an in-sync indication indicating that the synchronization of the radio connection signal well matches is received from the lower layer a certain number of times (for example, which may be set by the gNB), when the handover procedure is triggered (started), or when the RRC connection re-establishment procedure is started. When the second timer has expired, the UE triggers or starts the RRC connection re-establishment procedure. Alternatively, the UE transitions to the RRC idle mode and triggers or starts the RRC connection re-establishment procedure.

1> The UE starts the third timer when the frequency measurement procedure is triggered for the frequency measurement identifier for which the third timer is configured while the second timer is running The UE stops the third timer when an in-sync indication indicating that the synchronization of the radio connection signal well matches is received from the lower layer a certain number of times (for example, which may be set by the gNB), when the handover procedure is triggered (started), or when the RRC connection re-establishment procedure is started. When the third timer has expired, the UE triggers or starts the RRC connection re-establishment procedure. Alternatively, the UE transitions to the RRC idle mode and triggers or starts the RRC connection re-establishment procedure.

1> In case that the first handover method (for example, the first embodiment or the general handover method) is indicated in the handover command message (message including mobility indication (MobilityControl info or ReconfigurationWithSync) or handover indication in RRCReocnfiguartion message) received from the gNB by the UE, in case that the UE receives the handover command message and the first handover method (for example, the first embodiment of the present disclosure or the general handover method) is indicated in the handover command message, ReconfigWithSync information, or MobilityControlInfo information, in case that the second embodiment (DAPS handover method) proposed in the present disclosure is not configured, or in case that the second embodiment (DAPS handover method) proposed in the present disclosure is not configured for a certain bearer in the bearer configuration information, 2> In the present disclosure, the UE triggers the handover procedure and starts the first timer when receiving the handover command message (message including mobility indication (MobilityControl info or ReconfigurationWithSync) or handover indication in the RRCReocnfiguartion message).

2> When the handover procedure is triggered, the UE releases the SRB (for example, SRB1) configured for the source gNB and configures the SRB (for example, SRB1) for the target gNB based on the configuration information configured in the handover command message.

2> When the handover procedure is triggered, the UE stops the second timer when the second timer is running When the first timer is running, the second timer may not be started even when the condition for starting the second timer is satisfied (when the asynchronous indicator of the radio connection signal is received from the lower layer a certain number of times). That is, when the first timer is running, the second timer may not be used.

2> When the handover procedure is triggered, the UE stops the third timer when the third timer is running Only when the second timer is running, the UE may start the third timer when the condition for starting the third timer is satisfied (when the frequency measurement procedure is triggered for the frequency measurement identifier for which the third timer is configured).

That is, because the second timer is not used when the first timer is running, the third timer may also not be used.

2> When the UE successfully completes the handover procedure to the target gNB, or when the UE successfully completes the random access procedure, the UE stops the first timer.

2> When the first timer has expired (for example, when the handover procedure to the target gNB fails), the UE performs the RRC connection re-establishment procedure (the connection with the gNB is released and the RRC connection procedure is performed again from the beginning, that is, the cell selection or reselection procedure may be performed, the random access procedure may be performed, and the RRC connection reestablishment request message may be transmitted).

1> In case that the second handover method (for example, the second embodiment or the DAPS handover method) is indicated in the handover command message (message including mobility indication (MobilityControl info or ReconfigurationWithSync) or handover indication in RRCReconfiguartion message) received from the gNB by the UE (or which be extended and applied even when the conditional handover method is indicated together), when the second embodiment (DAPS handover method) proposed in the present disclosure is configured in the handover command message, ReconfigWithSync information, and MobilityControlInfo information when the UE receives the handover command message, when the second embodiment (DAPS handover method) proposed in the present disclosure is configured for a certain bearer in the bearer configuration information, or when the second embodiment (DAPS handover method) proposed in the present disclosure is configured for at least one bearer in the bearer configuration information, 2> In the present disclosure, when the UE receives the handover command message (message including mobility indication (MobilityControl info or ReconfigurationWithSync) or handover indication in the RRCReocnfiguartion message), the UE triggers the handover procedure and starts the first timer. When the conditional handover method is indicated together, the UE may select one cell from among a plurality of target cells and start the first timer when the handover procedure is started or the random access procedure is performed.

2> When the handover procedure is triggered, the UE maintains or stops the SRB (for example, SRB1) configured for the source gNB when the DAPS handover method is started, and may configure the SRB (for example, SRB1) for the target gNB based on the configuration information configured in the handover command message. According to another method, when the handover procedure is triggered, the UE maintains or stops the SRB (for example, SRB1) configured for the source gNB when the DAPS handover method is started, initialize a window state variable by re-establishing the PDCP layer or re-establishing the RLC layer with respect to the SRB for the source gNB, stop the timer and indicate to discard the stored data (PDCP SDU or PDCP PDU) (which may be performed when the fallback procedure proposed in the present disclosure is triggered), and configure the SRB (for example, SRB1) for the target gNB based on the configuration information configured in the handover command message. According to another method, the UE may configure the first bearer for the source gNB and the second bearer for the target gNB by applying the second PDCP layer structure proposed in the present disclosure to the SRB. According to another method, when the second PDCP layer structure is applied to the SRB, the UE may initialize the window state variable by re-establishing the PDCP layer for the first bearer or re-establishing the RLC device, stop the timer, and indicate to discard the stored data (PDCP SDU or PDCP PDU) (which may be performed when the fallback procedure proposed in the present disclosure is triggered). That is, according to another method, when the fallback procedure proposed in the present disclosure is triggered, the UE may perform a procedure of discarding data (for example, old RRC messages) remaining in the SRB for the source gNB or stored in the buffer. Alternatively, the UE may indicate or trigger a procedure, performed by the upper layer (for example, the RRC layer) of the UE, of discarding data (for example, old RRC messages) remaining in the PDCP layer for the SRB or stored in the buffer. This is because it is necessary to prevent old RRC messages from being transmitted to the source gNB.

2> When the UE triggers the DAPS handover method upon triggering the handover procedure, it may not be stopped even when the second timer for the source gNB is running Even when the first timer is running (or not running), when the condition for starting the second timer (when the asynchronous indicator of the radio connection signal is received from the lower layer a certain number of times) is satisfied, the second timer may be started. The second timer may be operated for the wireless connection between the UE and the source gNB. According to another method, two second timers are operated, wherein one second timer is operated for the wireless connection between the UE and the source gNB, and the other second timer is operated for the wireless connection between the UE and the target gNB. That is, even when the first timer is running, the second timer may be used for the wireless connection with the source gNB or the target gNB. However, even when the second timer has expired, when the first timer has not expired and is running, the UE may not trigger the RRC connection re-establishment procedure. That is, specifically, when the second timer for the source gNB has expired, when the first timer has not expired and is running or the random access procedure is being performed to the target gNB even when the wireless connection failure (RLF) occurs, or when the handover procedure is performed to the target gNB, the UE may release the radio connection with the source gNB without triggering the RRC connection re-establishment procedure. Also, the UE does not release the RRC configuration information (for example, bearer configuration information, etc.) configured from the source gNB, and may be reused when the RRC connection re-establishment procedure is triggered later. Also, when the first timer does not expire and is running even when the second timer has expired, the UE may report to the source gNB or the target gNB that the source connection has failed, without triggering the RRC connection re-establishment procedure, may release the connection with the source gNB (for example, may release the first bearers for the source gNB), or may stop the first bearers for the source gNB. However, when the second timer has expired, the UE may trigger the RRC connection re-establishment procedure when the first timer has expired, has been stopped, or has not started and is thus not running The second timer is operated even when the handover procedure is performed, in order for the UE to perform the fallback procedure when the wireless connection between the UE and the source gNB or the target gNB is monitored to determine that the handover failure occurs, and the wireless connection with the source gNB or the target gNB is valid. Also, when the second timer for the target gNB has expired, the RRC connection re-establishment procedure may be triggered when the first timer has expired, has been stopped, or has not started and is thus not running when the wireless connection with the target gNB fails, or when the random access procedure to the target gNB was successfully performed.

2> When the UE triggers the DAPS handover method upon triggering the handover procedure, it may not be stopped even when the third timer for the source gNB is running Only when the second timer is running, the UE may start the third timer when the condition for starting the third timer is satisfied (when the frequency measurement procedure is triggered for the frequency measurement identifier for which the third timer is configured). That is, because the UE uses the second timer even when the first timer is running, the third timer may also be used. The third timer may be operated for the wireless connection between the UE and the source gNB. According to another method, two third timers are operated, wherein one third timer is operated for the wireless connection between the UE and the source gNB, and the other third timer is operated for the wireless connection between the UE and the target gNB. That is, even when the first timer is running, the third timer may be used for the wireless connection with the source gNB or the target gNB. However, even when the third timer has expired, when the first timer has not expired and is running, the UE may not trigger the RRC connection re-establishment procedure. Also, when the first timer does not expire and is running even when the third timer expires, the UE may report to the source gNB or the target gNB that the source connection has failed, without triggering the RRC connection re-establishment procedure, may release the connection with the source gNB (for example, may release the first bearers for the source gNB), or may stop the first bearers for the source gNB. However, when the third timer has expired, the UE may trigger the RRC connection re-establishment procedure when the first timer has expired, has been stopped, or has not started and is thus not running The third timer is operated even when the handover procedure is performed, in order to perform the fallback procedure when the wireless connection between the UE and the source gNB or the target gNB is monitored to determine that the handover failure occurs, and the wireless connection with the source gNB is valid, and to report the frequency measurement result in the fallback procedure.

2> When the UE successfully completes the handover procedure to the target gNB, the UE stops the first timer.

2> When the first timer has expired (for example, when the handover procedure to the target gNB fails), when the maximum number of retransmissions to the target gNB has been exceeded in the RLC layer, when the handover command message is received, but the UE fails to handover because the configuration information of the handover command message exceeds the capability of the UE or an error occurs in the application of the configuration information, when a problem occurs in the random access to the target gNB and the random access procedure is continuously attempted, but the first timer has expired and the handover procedure fails, when the second timer or the third timer is driven for the target gNB, or when the second timer or the third timer has expired before the completion of the handover procedure, or when the T304 timer is stopped or expired and it is determined that the handover procedure has failed, 3> when the second timer or the third timer for the wireless connection between the UE and the source gNB has not expired (or when the second timer or the third timer for the wireless connection between the UE and the source gNB has not started or is running) or when the wireless connection between the UE and the source gNB is valid, 4> The UE may determine that the wireless connection between the UE and the source gNB is valid, and may perform the fallback procedure proposed in the present disclosure.

4> When the UE starts the fallback procedure, the UE may resume or newly configure the SRB when the SRB (for example, SRB1, or MAC, RLC, or PDCP layer of SRB1) configured for the source gNB) is stopped, and may perform the fallback procedure on the SRB (for example, SRB1). According to another method, when the second PDCP layer structure proposed in the present disclosure is applied to the SRB, the UE may perform the fallback procedure through the first bearer for the source gNB, and may release the second bearer for the target gNB. For example, the UE may switch the uplink data transmission to the first bearer for the source gNB, may indicate that there is data to be transmitted to the RLC layer or the MAC layer of the first bearer, and may transmit the handover failure report message for the fallback procedure through the first bearer. Also, when the fallback procedure is triggered, the UE may perform a procedure of discarding data (for example, old RRC messages) remaining in the SRB for the source gNB or stored in the buffer, or the upper layer (for example, the RRC layer) of the UE may indicate or trigger a procedure of discarding data (for example, old RRC messages) remaining in the PDCP layer for SRB or stored in the buffer. This is because it is necessary to prevent old RRC messages from being transmitted to the source gNB.

4> In the fallback procedure, the UE configures a report message indicating that the handover has failed through the SRB (for example, SRB1) configured with the source gNB, and reports the handover failure to the source gNB. When the UE transmits, to the source gNB, the report message indicating that handover has failed, the frequency measurement result measured by the UE is reported together so as to help quickly restoring the connection with the source gNB. According to another method, the UE may define and transmit MAC control information (for example, handover failure may be indicated by indicating that there is data to be transmitted in new MAC control information or buffer status report, or by defining a special value), RLC control information, or PDCP control information, and indicate to the source gNB that the handover has failed. According to another method, the UE may transmit the RRC connection re-establishment request message to the SRB (for example, SRB0 or SRB1) for the source gNB. According to another embodiment, the fallback procedure may be a procedure of releasing the second bearer for the target gNB for each bearer or in the second PDCP layer structure of the bearer for which the DAPS handover method is configured when the handover fails, or switching to the first PDCP layer structure, and allowing the UE to resume data transmission or reception through the first bearer for the source gNB. The presence of data to be transmitted to the MAC layer of the first bearer may be indicated, and the UE may report to the source gNB that there is a scheduling request or data to be transmitted (for example, a buffer status report), or transmit new MAC CE, RLC control data, or PDCP control data to fall back to the source gNB, and indicate the source gNB to resume data transmission. The SRB for the source gNB may be newly configured or resumed. Also, when the handover fails, the fallback procedure is previously configured for each bearer, or the bearers for which the DAPS handover method is not configured do not have the second PDCP layer structure. The UE may release, from the MAC layer for the target gNB, the PDCP layer, the RLC layer, or the bearer configuration information, or the logical channel identifier information reconfigured in the configuration information of the handover command message, or may switch, connect, and configure to the MAC layer for the source gNB, and then, may resume data transmission or reception to the source gNB for each bearer. This is because, when the UE receives the handover command message, the UE may apply the bearer configuration information configured in the handover command message to the MAC layer for the target gNB with respect to the bearer in which the DAPS handover method is not indicated, and may switch the connection of the PDCP layer or the RLC layer corresponding to the bearer, in which the DAPS handover method is not indicated, from the MAC layer for the source gNB to the MAC layer for the target gNB, and connect thereto. For example, when the handover command message is received, the upper layer (for example, the RRC layer) of the UE may indicate the MAC layer for the source gNB to perform the reconfiguration (MAC reconfiguration) by using configuration information except for the configuration information related to the bearer in which the DAPS handover method is not indicated in the handover command message in the configuration information of the current MAC layer for the source gNB. Alternatively, the upper layer (for example, the RRC layer) of the UE may indicate the MAC layer for the source gNB to perform the reconfiguration (MAC reconfiguration) by using configuration information including only the configuration information related to the bearer in which the DAPS handover method is indicated in the handover command message in the configuration information of the current MAC layer. That is, when the handover command message is received, the configuration information of the PDCP layer, RLC layer, or MAC layer of the bearer in which the DAPS handover method is not indicated is released in the MAC layer for the source gNB, and it is possible to apply or connect to the MAC layer for the target gNB according to the bearer configuration for the target gNB. Therefore, when the UE performs the fallback procedure, the bearer for which the DAPS handover method is not configured has to be reconfigured in the MAC layer for the source gNB. For example, when the UE performs the fallback procedure, the upper layer (for example, the RRC layer) of the UE may indicate the MAC layer for the source gNB to perform the reconfiguration (MAC reconfiguration) by using the configuration information together with the bearer configuration information in which the DAPS handover method is indicated, including the configuration information related to the bearer in which the DAPS handover method is not indicated in the handover command message in the configuration information of the current MAC layer. Alternatively, when the fallback procedure is performed, the UE may reconfigure or restore the bearer configuration before the reception of the handover command message (for example, PDCP layer configuration information, RLC layer configuration information, MAC layer configuration information, or PHY layer configuration information), and may be applied to the bearers for the source gNB (PDCP layer configuration information, RLC layer configuration information, MAC layer configuration information, or PHY layer of SRB or AM DRB or UM DRB).

4> In the fallback procedure, when the UE transmits, to the source gNB, the report message indicating that the handover has failed (for example, RRC message, MAC CE or RLC control data, or PDCP control data proposed above), the fourth timer may be started. When the UE receives an indication or message from the source gNB in response to the report message indicating that the handover has failed, which is transmitted by the UE, the UE may stop the fourth timer. However, when the fourth timer has expired, or when the response message has not been received until the fourth timer has expired, the UE performs the RRC connection re-establishment procedure (may release the connection with the gNB and perform the RRC connection procedure again from the beginning, that is, may perform the cell selection or reselection procedure, perform the random access procedure, and may transmit the RRC connection re-establishment request message). When the RRC connection re-establishment procedure is triggered due to the expiration of the fourth timer, the second timer or the third timer may be stopped when the second timer or the third timer is running 3> When the second timer or the third timer for the wireless connection between the UE and the source gNB or the target gNB has expired, or when the wireless connection between the UE and the source gNB or the target gNB is not valid, 4> The UE performs the RRC connection re-establishment procedure (the connection with the gNB may be released and the RRC connection procedure may be performed again from the beginning, that is, the cell selection or reselection procedure may be performed, the random access procedure may be performed, and the RRC connection re-establishment request message may be transmitted).

2> When the UE performs the DAPS handover procedure and the second condition proposed in the present disclosure is satisfied, the connection with the source gNB may be released, or the SRB for the source gNB may be released, and the second timer or the third timer for the source gNB may be stopped and initialized when the second timer or the third timer is running Only when the second timer or the third timer is stopped, an unnecessary RRC connection re-establishment procedure due to expiration of the second timer or the third timer may be prevented. This is because, when the second condition is satisfied, it may mean that the handover procedure has been successfully performed, and the first timer is stopped and the expiration of the second timer or the third timer may trigger an unnecessary RRC connection re-establishment procedure. According to another method, in case that the first condition proposed in the present disclosure is satisfied, or in case that the handover procedure is successfully completed, the UE may release the SRB for the source gNB, or the second timer or the third timer may be stopped and initialized when the second timer or the third timer for the source gNB is running Only when the second timer or the third timer is stopped, an unnecessary RRC connection re-establishment procedure due to expiration of the second timer or the third timer may be prevented. This is because, when the first condition is satisfied, it may mean that the handover procedure has been successfully performed, and the first timer is stopped and the expiration of the second timer or the third timer may trigger an unnecessary RRC connection re-establishment procedure.

According to the method proposed in the present disclosure, when the UE determines that the handover failure has occurred, and the proposed condition is satisfied and the fallback procedure is performed, the UE may allow the source gNB to confirm the handover failure of the UE by transmitting, to SRB1 or SRB1 to which the second PDCP layer structure is applied, the RRC message (for example, ULInformationTransferMRDC message or FailureInformation message) by including information indicating that the handover failure has occurred therein. In case that the source gNB detects the handover failure of the UE, the source gNB may configure an RRC message (for example, an RRCReconfiguration message or an RRCRelease message) in response thereto and transmit the RRC message to the UE. When the UE receives an RRCReconfiguration message (RRC message received through SRB1 or SRB1 to which the second PDCP layer structure is applied) as a response RRC message to the handover failure report, the UE may complete the application of the configuration information and may transmit, in response thereto, the RRCReconfigurationComplete message again to the source gNB through SRB1 or SRB1 to which the second PDCP layer structure is applied. In case that is indicated in RRCReconfiguration or the access to another cell is indicated, the random access procedure to the cell is completed, and an RRCReconfigurationComplete message may be transmitted through SRB1. However, in case that the UE receives the RRCRelease message as the response RRC message to the handover failure report, the UE may transition to the RRC idle mode or the RRC inactive mode according to the configuration information indicated in the RRCRelease message. An additional response RRC message to the RRC message may no longer be transmitted to the gNB.

Figure 1L:
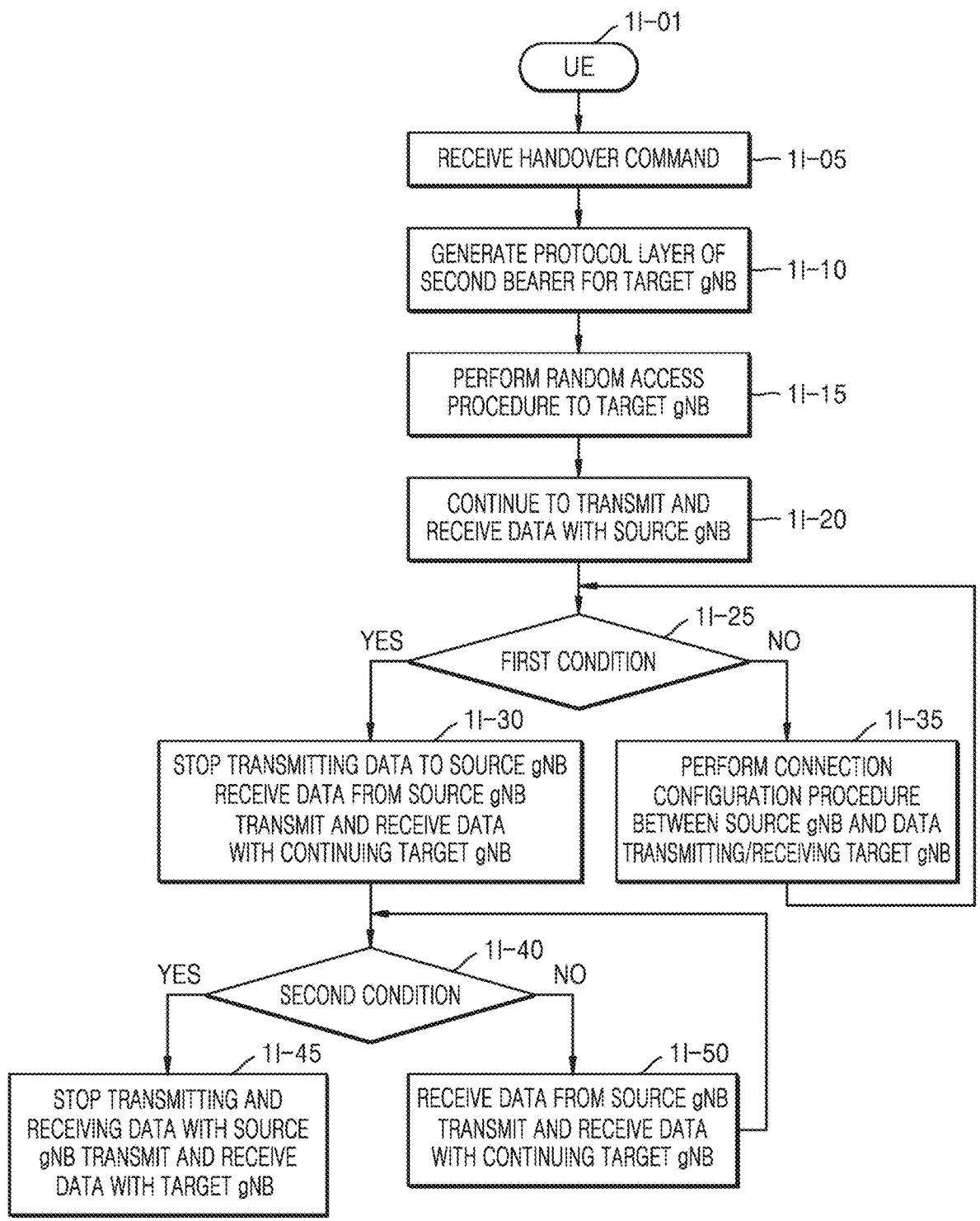
FIG. 1L is a diagram illustrating an operation of a user equipment that is applicable to embodiments proposed in the present disclosure.

FIG. 1L is a diagram illustrating an operation of a UE that is applicable to embodiments proposed in the present disclosure.

In FIG. 1L, the UE 11-05 may transmit or receive data with the source gNB through the first PDCP layer structure for each bearer. However, in case that the handover command message is received and the DAPS handover method of the second embodiment proposed in the present disclosure is indicated in the handover command message, in case that the DAPS handover method is indicated for each bearer, or when the UE switches to the second PDCP layer for each bearer or the bearers in which the DAPS handover method is indicated with respect to the target gNB indicated in the message, and configures and establishes the protocol layers of the second bearer, and the random access procedure is performed to the target gNB through the established protocol layers (11-10, 11-15), the UE may continue to transmit or receive data (uplink data transmission and downlink data reception) with the source gNB through the protocol layers of the first bearer (11-20).

When the first condition is satisfied (11-25), the UE may stop transmitting uplink data to the source gNB through the protocol layers of the first bearer, and may switch uplink data transmission to transmit uplink data to the target gNB through protocol layers of the second bearer. The UE may continue to receive downlink data from the source gNB and the target gNB through the protocol layers of the first bearer and the second bearer (11-30). Also, the PDCP layer of the second bearer may continue to perform seamless data transmission or reception with the target gNB by using information such as transmission or reception data, sequence number information, or header compression and decompression context, which is stored in the PDCP layer of the first bearer. When the first condition is not satisfied, the first condition may be continuously checked while continuously performing the procedure that has been previously being performed (11-35).

Also, when the second condition is satisfied, the UE may stop receiving downlink data from the source gNB through the protocol layers of the first bearer (11-45). Also, the PDCP layer of the second bearer may continue to perform seamless data transmission or reception with the target gNB by using information such as transmission or reception data, sequence number information, or header compression and decompression context, which is stored in the PDCP layer of the first bearer.

When the second condition is not satisfied, the second condition may be continuously checked while continuously performing the procedure that has been previously being performed (11-50).

A specific embodiment of the PDCP layer proposed in the present disclosure may perform different procedures according to the type of the handover indicated in the handover command message received by the UE as follows.

In case that the type of the handover indicated in the handover command message received from the source gNB by the UE indicates the handover of the first embodiment (for example, the general handover procedure), in case that the UE receives the handover command message and the first handover method (for example, the first embodiment of the present disclosure or the general handover method) is indicated in the handover command message, ReconfigWithSync information, or MobilityControlInfo information, in case that the second embodiment (DAPS handover method) proposed in the present disclosure is not configured, in case that the second embodiment (DAPS handover method) proposed in the present disclosure is not configured for a certain bearer in the bearer configuration information, for the bearer in which the second embodiment (DAPS handover method) proposed in the present disclosure is not configured in the bearer configuration information, the UE may perform the PDCP layer re-establishment procedure (PDCP re-establishment) to the PDCP layer for each bearer. For example, the UE may initialize window state variables for the SRB and discard stored data (PDCP SDU or PDCP PDU). The UE may initialize window state variables for the UM DRB, and may perform transmission or retransmission by compressing or ciphering data that has not yet been transmitted to the lower layer or data in which the PDCP discard timer has not expired, in ascending order of count values, based on the header (or data) compression context or security key of the target gNB, or performing the integrity protection. Also, the UE may stop and initialize the reordering timer when the reordering timer is running, and may sequentially process the received data (PDCP SDU or PDCP PDU) and transmit the processed data to the upper layer. The UE may not initialize window state variables for the AM DRB, and may perform transmission or retransmission by performing compression or ciphering based on header (or data) compression context or security keys of the target gNB in ascending order of count values or PDCP sequence numbers from the first data (PDCP SDU or PDCP PDU) in which successful delivery from the lower layer is not confirmed, or performing the integrity protection. Also, the receiving PDCP layer may process or store the data received due to the re-establishment procedure of the lower layer (for example, the RLC layer). When there is no indicator (drb-Continue ROHC) to continuously use the header compression context for AM DRBs, the receiving PDCP layer may perform the header decompression procedure on the stored data based on the header compression context (ROHC). Also, the receiving PDCP layer may process or store the data received due to the re-establishment procedure of the lower layer (for example, the RLC layer device), and may perform the header decompression procedure on the stored data for AM DRBs based on the header compression context (Ethernet Header Compression (EHC)). According to another method, the receiving PDCP layer may process or store the data received due to the re-establishment procedure of the lower layer (for example, the RLC layer). In case that there is no indicator (drb-Continue EHC) to continuously use the header compression context for AM DRBs, the receiving PDCP layer may perform the header decompression procedure on the stored data based on the header compression context (EHC).

In case that the type of the handover indicated in the handover command message received from the source gNB by the UE indicates the handover of the second embodiment (or when directed for each bearer), when the UE receives the handover command message, when the second embodiment (DAPS handover method) proposed in the present disclosure is configured in the handover command message, ReconfigWithSync information, or MobilityControlInfo information, when the second embodiment (DAPS handover method) proposed in the present disclosure is configured for a certain bearer in the bearer configuration information, when the second embodiment (DAPS handover method) proposed in the present disclosure is configured in the bearer configuration information for at least one bearer, or for the bearer in which the second embodiment (DAPS handover method) proposed in the present disclosure is configured in the bearer configuration information, the UE may receive the handover command message, and the PDCP layer in which the DAPS handover method is indicated may perform the following procedures without performing the PDCP re-establishment procedure. For example, the UE may initialize window state variables for the SRB (when the DAPS handover fails, variable initialization may be omitted for fallback), or the stored data (PDCP SDU or PDCP PDU) may be discarded. For UM DRB, data transmission or reception with the source gNB may be continuously performed with the source gNB for data that has not yet been transmitted to the lower layer or data in which the PDCP discard timer has not expired, without initializing window state variables. For AM DRB, data transmission or reception with the source gNB may be continuously performed without initializing window state variables. Also, the uplink or downlink ROHC context for the source gNB may be used without being initialized, and the uplink or downlink ROHC context for the target gNB may be initialized and started in the initial state (for example, the IR state of the U mode). According to another method, the uplink or downlink ROHC context for the source gNB may be initialized and started in the initial state (for example, the IR state of the U mode), and the uplink or downlink ROHC context for the target gNB may be initialized and started in the initial state (for example, the IR state of the U mode).

The UE may perform the procedures proposed in the present disclosure when the first condition is satisfied for each bearer (or the bearer in which the second embodiment is indicated).

The UE may perform the procedures proposed in the present disclosure when the second condition is satisfied for each bearer (or the bearer in which the second embodiment is indicated).

When the UE receives the handover command message for the bearer in which the second embodiment (or DAPS handover method) is not indicated (or is not configured), the UE may release the configuration information or context for the data compression protocol (for example, uplink data compression protocol). Alternatively, when the UE receives the handover command message, the upper layer (for example, the RRC layer) of the UE may indicate or reconfigure the PDCP layer to release the configuration information or context for the data compression protocol (for example, uplink data compression protocol). However, for the bearer in which the second embodiment (or the DAPS handover method) is indicated (or configured), the UE may release the configuration information or context for the data compression protocol (for the source gNB) when the first condition proposed in the present disclosure is satisfied (for example, uplink data compression protocol). Alternatively, when the first condition is satisfied, the upper layer (for example, the RRC layer) of the UE may indicate or reconfigure the PDCP layer to release the configuration information or context for the data compression protocol (for the source gNB) (for example, uplink data compression protocol). This is because, for the bearer for which the DAPS handover method is configured, data must be able to be compressed and transmitted to the source gNB by using the configuration information or context for the data compression protocol for the source gNB until the first condition is satisfied.

The handover command message is received and one of the following methods may be applied to the bearer or the PDCP layer in which the DAPS handover method is not indicated.

Method 1: For the bearer or the PDCP layer for which the DAPS handover method is not configured, the PDCP re-establishment procedure may not be triggered or performed when the handover command message is received. Alternatively, when the PDCP re-establishment procedure is configured for the bearers in the handover command message and the first condition proposed in the present disclosure is satisfied, the target gNB may trigger or perform the PDCP re-establishment procedure (even when the PDCP re-establishment procedure for the bearer is configured in the handover command message, the target gNB may perform the PDCP re-establishment procedure when the first condition is satisfied). Specifically, in case that the first condition is satisfied, the upper layer (for example, the RRC layer) of the UE may trigger or request the PDCP re-establishment procedure for the bearer or the bearers for which the DAPS handover method is not configured. The PDCP layer receiving the request for the PDCP re-establishment procedure may perform different PDCP re-establishment procedures for each bearer. For example, the PDCP layer may initialize window state variables for the UM DRB, and may perform transmission or retransmission by compressing or ciphering data that has not yet been transmitted to the lower layer or data in which the PDCP discard timer has not expired, in ascending order of count values, based on the header (or data) compression context or security key of the target gNB, or performing the integrity protection. Alternatively, when the reordering timer is running, the PDCP layer may stop and initialize the reordering timer, may sequentially process the received data (PDCP SDU or PDCP PDU), and may transmit the processed data to the upper layer. Alternatively, the PDCP layer may not initialize window state variables for the AM DRB, and may perform transmission or retransmission by performing compression or ciphering based on header (or data) compression context or security keys of the target gNB in ascending order of count values or PDCP sequence numbers from the first data (PDCP SDU or PDCP PDU) in which successful delivery from the lower layer is not confirmed, or performing the integrity protection. The reason why the PDCP re-establishment procedure is not performed when the handover command message is received for the bearer(s) for which the DAPS handover method is not configured and the PDCP re-establishment procedure is performed when the first condition is satisfied is that, when the UE fails the handover procedure to the target gNB, the UE may perform the fallback to the source gNB, the bearers compress data into the header (or data) compression context of the target gNB in the PDCP re-establishment procedure, and data processed by the ciphering or integrity protection with the security key of the target gNB may become useless when the UE has to fall back, and thus, may be discarded. Also, in case that the UE has to fall back, the PDCP re-establishment procedure may be performed again for the bearers, so that data is compressed with the header (or data) compression context of the source gNB for data to be transmitted. Also, the ciphering or integrity protection has be performed again with the security key of the source gNB. Thus unnecessary processing may occur. Therefore, when the UE performs the DAPS handover method, the PDCP re-establishment procedure is not triggered or performed for the bearer for which the DAPS handover method is not configured when the handover command message is received. When the first condition is satisfied, the PDCP re-establishment procedure may be triggered or performed. The PDCP re-establishment procedure may not be performed for the bearer for which the DAPS handover method is configured Second method: When the handover command message is received for the bearer(s) for which the DAPS handover method is not configured, the upper layer (for example, the RRC layer) of the UE may trigger or request the PDCP re-establishment procedure. The PDCP layer receiving the request for the PDCP re-establishment procedure may perform different PDCP re-establishment procedures for each bearer. For example, the PDCP layer may initialize window state variables for the UM DRB, and may perform transmission or retransmission by compressing or ciphering data that has not yet been transmitted to the lower layer or data in which the PDCP discard timer has not expired, in ascending order of count values, based on the header (or data) compression context or security key of the target gNB, or performing the integrity protection. Also, when the reordering timer is running, the PDCP layer may stop and initialize the reordering timer, may sequentially process the received data (PDCP SDU or PDCP PDU), and may transmit the processed data to the upper layer. Also, the PDCP layer may not initialize window state variables for the AM DRB, and may perform transmission or retransmission by performing compression or ciphering based on header (or data) compression context or security keys of the target gNB in ascending order of count values or PDCP sequence numbers from the first data (PDCP SDU or PDCP PDU) in which successful delivery from the lower layer is not confirmed, or performing the integrity protection. When the handover command message is received for the bearer(s) for which the DAPS handover method is not configured, the data is compressed with the header (or data) compression context of the target gNB through the PDCP re-establishment procedure, and the data is processed by performing ciphering or integrity protection with the security key of the target gNB. When the UE fails the handover procedure to the target gNB (for example, when the first timer has expired or when the wireless connection to the target gNB fails), the fallback to the source gNB is possible. Thus, in order to discard the generated or processed data (for example, PDCP PDUs) for transmission from the bearers to the target gNB and re-process data (for example, PDCP SDUs) based on the header (or data) compression context or security key for the source gNB, when the UE performs the fallback, the UE may request and indicate the upper layer of the UE (for example, the RRC layer) to reconfigure the discharge indication, PDCP re-establishment procedure, or the configuration information (security key or header (or data) compression context) for the source gNB with respect to the data (PDCP PDUs) processed based on the configuration information (security key or header (or data) compression context) for the target gNB to the bearers in which the DAPS handover method is not indicated, and generate and process again based on data based on the source gNB configuration information.

Also, in case that the source gNB indicates, to the UE, the handover to which the embodiments proposed in the present disclosure are applied, the source gNB may start data forwarding to the target gNB when the following third condition is satisfied. The third condition may mean satisfying one or more of the following conditions.

When an indication indicating that the UE has successfully completed handover is received from the target gNB, When the handover command message is transmitted to the UE, When the handover command message is transmitted to the UE and the successful delivery of the handover command message (HARQ ACK or NACK or RLC ACK or NACK) is confirmed, When the source gNB receives, from the UE, an indication indicating the release of the connection with the source gNB (for example, an RRC message (e.g., RRCReconfiguration message), MAC CE, RLC control PDU, or PDCP control PDU, When the timer has expired by transmitting the handover command message to the UE and driving a certain timer, When the confirmation (HARQ ACK, NACK, RLC ACK, or NACK) information for successful delivery of downlink data is not received from the UE for a certain time, The present disclosure proposes the operation of the UE that specifically performs the techniques proposed above.

1> When the UE receives the handover command message (for example, RRCReconfiguration message), or when ReconfigWithSync information (in case of the NR gNB) or MobilityControlInfo information (in case of the LTE gNB) is received in the RRCReconfiguration message, one or more of the following operations may be performed.

2> The first timer proposed in the present disclosure is started.

2> When the second handover method (for example, the second embodiment of the present disclosure or the DAPS handover method) is not indicated, when the DAPS handover method is not indicated for each bearer identifier or logical channel identifier, when the DAPS handover method is not configured for at least one bearer, or when the DAPS handover method is not configured for a certain bearer, 3> when the second timer for the source gNB proposed in the present disclosure is running, the second timer may be stopped.

2> When the second handover method (for example, the second embodiment of the present disclosure or the DAPS handover method) is indicated, when the DAPS handover method is indicated for each bearer identifier or logical channel identifier, when the DAPS handover method is configured for at least one bearer, or when the DAPS handover method is configured for a certain bearer, or for the bearer for which the DAPS handover method is configured, one or more of the following operations may be performed.

3> Even when the second timer for the source gNB proposed in the present disclosure is running, the second timer is not stopped.

3> SRBs for the source gNB are stopped.

3> The MAC layer for the target gNB may be generated or established.

3> A new UE identifier (for example, C-RNTI) may be applied in the target gNB or the MAC or PHY layer for the target gNB.

3> Pieces of configuration information for the target gNB configured in the handover message may be configured in the lower layers (for example, the SDAP layer, the PDCP layer, the RLC layer, the MAC layer for the target gNB, or the PHY layer).

3> S Cells configured in the source gNB may be regarded as being in the inactive state.

3> The RLC layers may be generated or established for the target gNB or in the MAC layer for the target gNB based on the configuration information of the RLC layer received in the handover command message.

3> The logical channel identifier or related configuration information (for example, priority, prioritizedBiteRate, or BucketSizeDuration) may be generated or established for the target gNB or in the MAC layer for the target gNB based on the configuration information of the MAC layer received in the handover command message.

3> In the configuration information for the source gNB or the current, previous, or existing configuration information (for example, MAC layer configuration information), configuration information (logical channel identifier, priority, prioritizedBiteRate, BucketSizeDuration, etc.) except for the configuration information of the MAC layer related to the bearers in which the DAPS handover method is not configuration in the handover command message may be reconfigured in the lower layer (for example, the MAC layer). According to another method, in the configuration information for the source gNB or the current, previous, or existing configuration information (for example, MAC layer configuration information (logical channel identifier, priority, prioritizedBiteRate, BucketSizeDuration, etc.)), only the configuration information of the MAC layer related to the bearers in which the DAPS handover method is not configuration in the handover command message may be reconfigured in the lower layer (for example, the MAC layer). Specifically, the MAC layer configuration information (logical channel identifier, priority, prioritizedBiteRate, BucketSizeDuration, etc.) for the bearer in which the DAPS handover method is configured in the MAC layer for the source gNB is maintained or configured, and the MAC layer configuration information (logical channel identifier, priority, prioritizedBiteRate, BucketSizeDuration, etc.) for the bearer in which the DAPS handover method is not configured may be released. According to another method, when the source gNB performs the DAPS handover method, configuration information of the MAC layer for the source gNB to be applied may be set as an RRC message.

3> The PDCP layer corresponding to the SRB or SRB identifier may be generated or established for the target gNB or the MAC layer for the target gNB, and the ciphering or deciphering algorithm, integrity protection, or integrity verification algorithm may be configured in the PDCP layer together with the security keys for the target gNB received in the handover command message. When the ciphering function or the integrity function is configured or is not released, the PDCP layer may configure the ciphering function or the integrity protection function by applying the security key or algorithm 3> When there is PDCP layer configuration information for the SRB or SRB identifier, the PDCP layer configuration information is applied, and when there is no PDCP layer configuration information, default configuration information is applied.

3> For the bearer (SRB or DRB) in which the DAPS handover method is configured, the PDCP re-establishment procedure indicator may always be set to false so that the PDCP re-establishment procedure is not triggered. This is because, when the PDCP re-establishment procedure is performed, the data interruption time may occur in the DAPS handover method. Alternatively, the PDCP re-establishment procedure may be indicated for the SRB, and the PDCP re-establishment procedure may not be indicated for the DRB. This is because the SRB for the source gNB and the SRB for the target gNB may be independently configured.

3> For the bearer (SRB or DRB) in which the DAPS handover method is configured, the first PDCP layer structure may be reconfigured to the second PDCP layer structure.

3> When configuration information (for example, QoS and bearer mapping information) of the SDAP layer is included, the configuration information of the SDAP layer may be configured for the target gNB. The configuration information of the existing SDAP layer for the source gNB may be maintained and released when the connection with the source gNB is released.

3> When the entire configuration information is newly configured (full configuration), the default value of the first timer or the second timer is applied and operated to the target gNB, the basic configuration information is applied to the PHY layer or the MAC layer, and the basic configuration information is also applied to SRBs. The configuration information for the current gNB or the source gNB is maintained and applied.

2> Otherwise (for example, when the second handover method (e.g., the second embodiment of the present disclosure or the DAPS handover method) is not indicated, when the DAPS handover method is not indicated for each bearer identifier or logical channel identifier, when the DAPS handover method is not configured for at least one bearer, or when the DAPS handover method is not configured for a certain bearer, or for the bearer in which the DAPS handover is not configured), one or more of the following operations may be performed.

3> The MAC layer for the source gNB or the current gNB may be reset.

3> S Cells configured in the source gNB may be regarded as being in the inactive state.

3> A new UE identifier (for example, C-RNTI) may be applied in the source gNB, the current gNB, or the MAC or PHY layer for the current gNB.

3> When the RLC re-establishment procedure is indicated, the RLC re-establishment procedure may be performed.

3> When the PDCP re-establishment procedure is indicated, the PDCP re-establishment procedure may be performed.

3> Pieces of configuration information for the target gNB configured in the handover message may be reconfigured in the lower layers (for example, the SDAP layer, the PDCP layer, the RLC layer, the MAC layer for the current gNB or the cell group, or the PHY layer).

3> When configuration information (for example, QoS and bearer mapping information) of the SDAP layer is included, the configuration information of the SDAP layer may be reconfigured as the configuration information of the SDAP layer.

3> When the entire configuration information is newly configured (full configuration), all pieces of configuration information (SDAP layer, PDCP layer, RLC layer, MAC layer, or PHY layer configuration information) for the current gNB or the source gNB are released. >>3> The default value of the first timer or the second timer is applied and operated to the current gNB or the source gNB, the basic configuration information is applied to the PHY layer or the MAC layer, and the basic configuration information is also applied to SRBs.

1> When the first timer proposed in this disclosure has expired (for example, when the handover procedure has failed), 2> when the first timer for the source gNB has expired, 3> when it is configured in the random access related configuration information, the designated preamble information is released.

3> When the second handover method (for example, the second embodiment of the present disclosure or the DAPS handover method) is indicated, when the DAPS handover method is indicated for each bearer identifier or logical channel identifier, when the DAPS handover method is configured for at least one bearer, or when the DAPS handover method is configured for a certain bearer, when the wireless connection between the source gNB and the UE has not failed, or when the wireless connection has not failed (when the second timer or the third timer has not expired), 4> The stopped SRBs configured in the source gNB or the MAC layer for the source gNB (or the target gNB).

4> The handover failure message may be configured and transmitted to the source gNB through the resumed SRBs. Alternatively, DRBs may be resumed and the data transmission or reception may be resumed.

3> Otherwise (for example, when the DAPS handover method is not configured, or when the DAPS handover method is configured but the wireless connection with the source gNB fails), 4> The configuration information of the UE may be configured back to the configuration information previously used by the source gNB.

4> The RRC connection re-establishment procedure may be triggered and performed.

1> When the UE detects the wireless connection problem in the PHY layer,

2> When the second handover method (for example, the second embodiment of the present disclosure or the DAPS handover method) is configured, when the DAPS handover method is configured for each bearer identifier or logical channel identifier, when the DAPS handover method is configured for at least one bearer, when the DAPS handover method is configured for a certain bearer, and when the first timer is running and an out-of-sync indication indicating that the synchronization of the radio connection signal from the lower layer (for example, the MAC layer or the PHY layer) is out of synchronization is received a certain number of times (for example, which may be set by the gNB) and the problem is detected in the PHY layer,
   3> the second timer (for example, T310) may be started.
2> In case that the out-of-sync indication indicating that the synchronization of the radio connection signal from the lower layer (for example, the MAC layer or the PHY layer) is out of synchronization is received a certain number of times (for example, which may be set by the gNB), the problem is detected in the PHY layer, and the first timer or the T300, T301, T304, T311, or T319 timer is not running,
   3> the second timer (for example, T310) may be started. However, in case that the DAPS handover method is not configured and the first timer is running, the second timer is not started even when the PHY layer problem is detected.
1> When the RRC layer of the UE receives the handover command message (for example, RRCReconfiguration message), or when ReconfigWithSync information (in case of the NR gNB) or MobilityControlInfo information (in case of the LTE gNB) has been received in the RRCReconfiguration message, or when the random access procedure triggered by the target gNB or the MAC layer of the cell group has been successfully completed,
2> the first timer for the source gNB, target gNB, or the cell group is stopped.
2> When the second timer for the source gNB is running (during handover), the second timer is stopped. This is because, when the second timer expires, an unnecessary RRC connection re-establishment procedure may be triggered.
2> According to another method, when the second handover method (for example, the second embodiment of the present disclosure or the DAPS handover method) is configured, or when the DAPS handover method is configured for each bearer identifier or logical channel identifier,
   3> when the second timer for the source gNB is running, the second timer is stopped. This is because, when the second timer expires, an unnecessary RRC connection re-establishment procedure may be triggered.
2> the third timer for the source gNB, target gNB, or the cell group is stopped.

According to an embodiment of the present disclosure, an operating method of a UE in a wireless communication system may include: receiving, from a source gNB, an RRC reconfiguration message indicating handover, the RRC reconfiguration message including DRB configuration information; in case that the DRB configuration information includes an indicator indicating a configuration of a DAPS for at least one DRB, generating a MAC entity for a target gNB; configuring a MAC entity for the target gNB based on MAC configuration information included in the RRC reconfiguration message indicating the handover; suspending a SRB for the source gNB; and establishing or configuring a SRB for the target gNB.

According to an embodiment, the operating method of the UE may further include, in case that the DRB configuration information includes an indicator indicating a configuration of a DAPS for the at least one DRB, reconfiguring a PDCP entity with respect to at least one DRB for which the DAPS is configured, the PDCP entity being not re-established.

According to an embodiment, the reconfiguring of the PDCP entity may include, based on RLC configuration information included in the RRC reconfiguration message indicating the handover, establishing or configuring an RLC entity for the target gNB with respect to at least one DRB for which the DAPS is configured.

According to an embodiment, the reconfiguring of the PDCP entity may include configuring the PDCP with a header compression and decompression function and a security function for the target gNB.

According to an embodiment, the operating method of the UE may further include, in case that the DRB configuration information includes an indicator indicating a configuration of a DAPS for the at least one DRB, applying a new RNTI value indicated by the RRC reconfiguration message indicating the handover to the MAC entity for the target gNB.

According to an embodiment, the operating method of the UE may further include: receiving the RRC reconfiguration message from the target gNB after the handover to the target gNB is completed; in case that the RRC reconfiguration message received from the target gNB includes an indicator for release of the source gNB and the source gNB is a gNB related to NR, releasing an RLC entity for the source gNB with respect to the at least one DRB; and in case that the source gNB is a gNB related to LTE, re-establishing the RLC entity for the source gNB with respect to the at least one DRB.

According to an embodiment, the RRC reconfiguration message indicating the handover may include an indicator indicating a configuration of a DAPS for at least one DRB, and may not include an indicator indicating a configuration of a DAPS for at least one SRB.

According to an embodiment, the operating method of the UE may further include, in case that the DRB configuration information does not include an indicator indicating a configuration of a DAPS for at least one DRB, resetting the MAC entity for the UE.

According to an embodiment, the operating method of the UE may further include, in case that the DRB configuration information does not include an indicator indicating a configuration of a DAPS for at least one DRB, re-establishing a PDCP entity or an RLC entity for the SRB of the UE or at least one DRB for which the DAPS is not configured.

According to an embodiment of the present disclosure, the UE in the wireless communication system may include: a transceiver; and at least one processor configured to: receive, from a source gNB, an RRC reconfiguration message indicating handover through the transceiver, the RRC reconfiguration message including DRB configuration information; in case that the DRB configuration information includes an indicator indicating a configuration of a DAPS for at least one DRB, generate a MAC entity for a target gNB; configure a MAC entity for the target gNB based on MAC configuration information included in the RRC reconfiguration message indicating the handover; suspend SRB for the source gNB; and establish or configure a SRB for the target gNB.

According to an embodiment, in case that the DRB configuration information includes an indicator indicating a configuration of a DAPS for at least one DRB, the at least one processor may be further configured to reconfigure a PDCP entity with respect to at least one DRB for which the DAPS is configured, and may not re-establish the PDCP entity.

According to an embodiment, the at least one processor may be further configured to, based on RLC configuration information included in the RRC reconfiguration message indicating the handover, establish or configure an RLC entity for the target gNB with respect to at least one DRB for which the DAPS is configured, and configure a header compression and decompression function and a security function for the target gNB with respect to the PDCP entity.

According to an embodiment, the at least one processor may be further configured to: receive an RRC reconfiguration message from the target gNB through the transceiver after the handover to the target gNB is completed; in case that the RRC reconfiguration message received from the target gNB includes an indicator for release of the source gNB and the source gNB is a gNB related to NR, release an RLC entity for the source gNB with respect to the at least one DRB; and in case that the source gNB is a gNB related to LTE, re-establish the RLC entity for the source gNB with respect to the at least one DRB.

According to an embodiment, in case that the DRB configuration information does not include the indicator indicating a configuration of a DAPS for at least one DRB, the at least one processor may be further configured to reset the MAC entity for the UE.

According to an embodiment, in case that the DRB configuration information does not include the indicator indicating a configuration of a DAPS for at least one DRB, the at least one processor may be further configured to re-establish a PDCP entity or an RLC entity for the SRB of the UE or at least one DRB for which the DAPS is not configured.

Figure 1M:
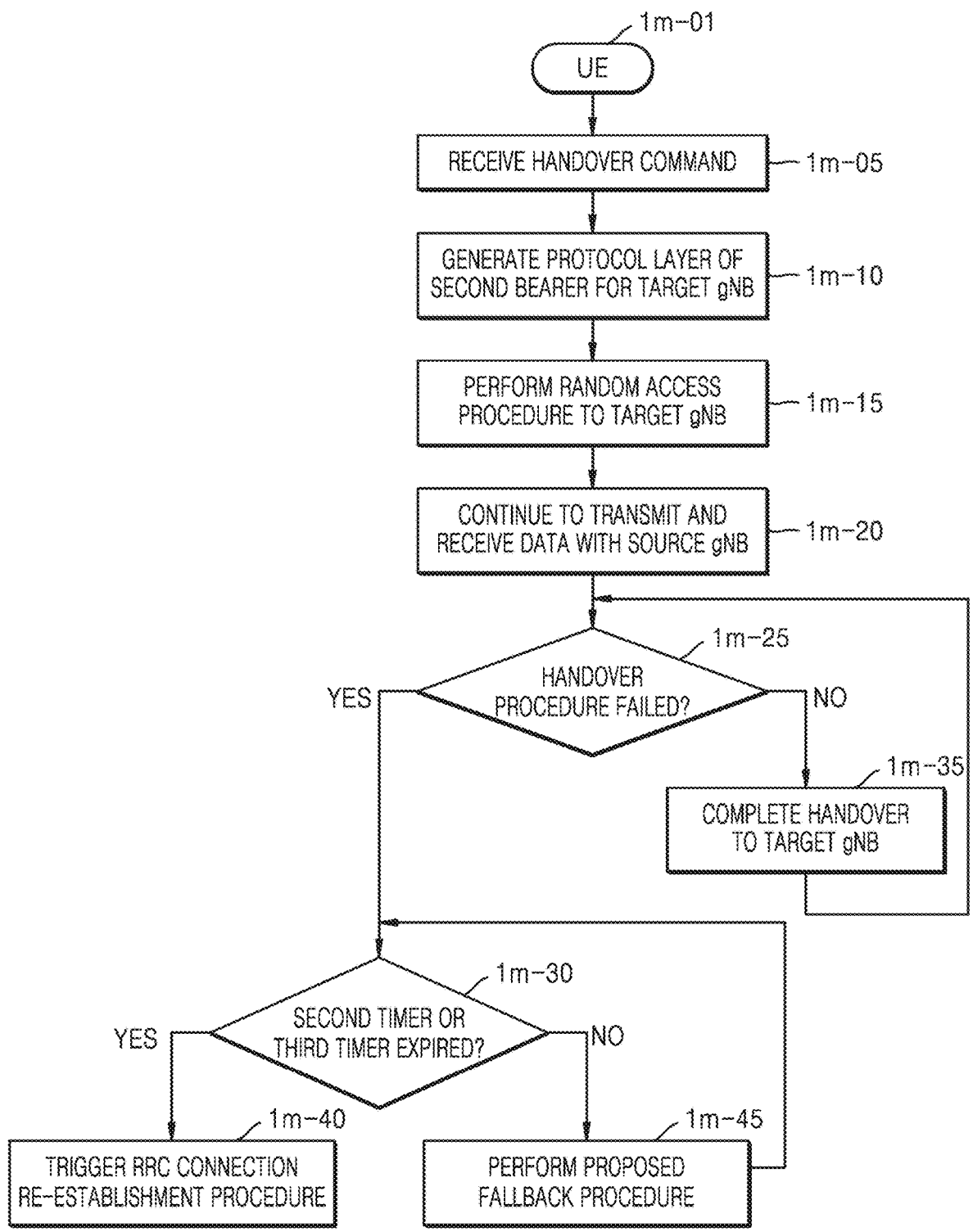
FIG. 1M is a diagram illustrating an operation of a user equipment that performs a fallback procedure when handover fails in a DAPS handover method proposed in the present disclosure.

FIG. 1M is a diagram illustrating an operation of a UE that performs a fallback procedure when handover fails in a DAPS handover method proposed in the present disclosure.

In FIG. 1M, a UE 1m-01 may transmit or receive data with a source gNB through a first PDCP layer structure for each bearer. However, when a handover command message is received (1m-05) and the DAPS handover method of the second embodiment proposed in the present disclosure is indicated in the handover command message, or even when, for a target gNB indicated in the message, the UE switches to a second PDCP layer structure for each bearer or bearers in which the DAPS handover method is indicated, configures and establishes protocol layers of the second bearer and performs a random access procedure to the target gNB through the established protocol layers (1m-10, 1m-15), the UE may continue to transmit or receive data (uplink data transmission and downlink data reception) with the source gNB through the protocol layers of the first bearer (1m-20).

When the UE successfully completes the handover procedure (1m-25), the UE finishes the handover procedure according to the second embodiment (DAPS handover method) of the handover method proposed in the present disclosure.

However, when the UE fails the handover procedure (1m-25) (for example, when the first timer has expired (when the handover procedure to the target gNB fails), when the maximum number of retransmissions has been exceeded in the RLC layer, when the handover command message is received but configuration information of the handover command message exceeds the capability of the UE or the handover fails due to an error in the application of the configuration information, when the handover procedure fails due to a random access problem to the target gNB, or in the case in which a second timer or a third timer is driven for the target gNB, when the second timer or the third timer expires before the handover procedure is completed, the T304 timer is stopped or expired, and it is determined that the handover procedure has failed), when the second timer or the third timer for wireless connection between the UE and the source gNB has not expired, (or when the second timer or the third timer for wireless connection between the UE and the source gNB has not started or is running) (1m-40), or when the wireless connection between the UE and the source gNB is valid, the UE may determine that the wireless connection between the UE and the source gNB is valid and may perform the fallback procedure proposed in the present disclosure (1m-45). When the second timer or the third timer for the wireless connection between the UE and the source gNB has expired, or when the wireless connection between the UE and the source gNB is not valid (1m-30), the UE may perform the RRC connection re-establishment procedure (may release the connection with the gNB and perform an RRC connection procedure again from the beginning, that is, may perform a cell selection or reselection procedure, perform a random access procedure, and transmit an RRC connection reestablishment request message) (1m-45).

Figure 1N:
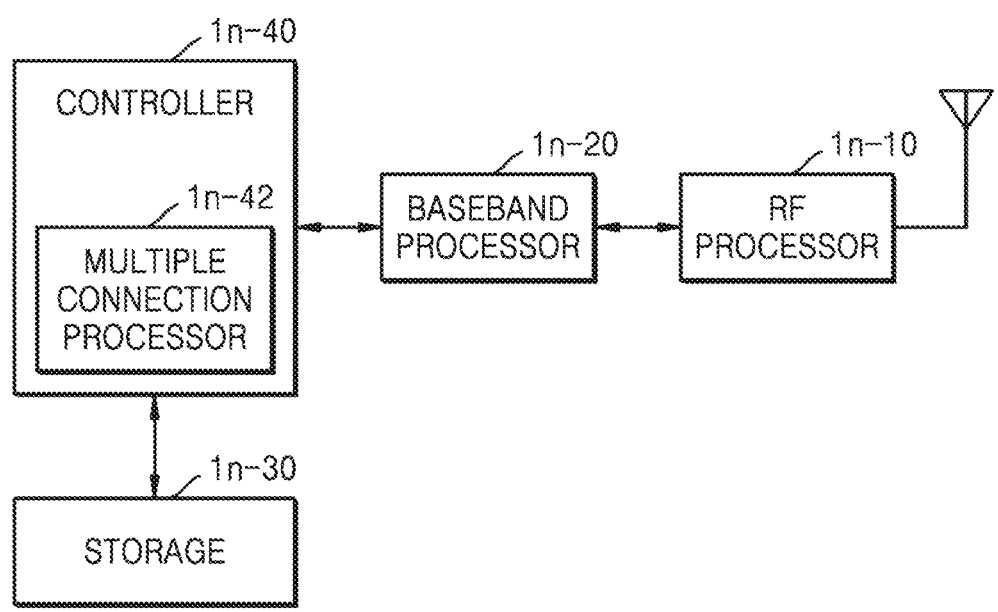
FIG. 1N is a block diagram illustrating a structure of a user equipment, according to an embodiment of the present disclosure.
Figure 10:
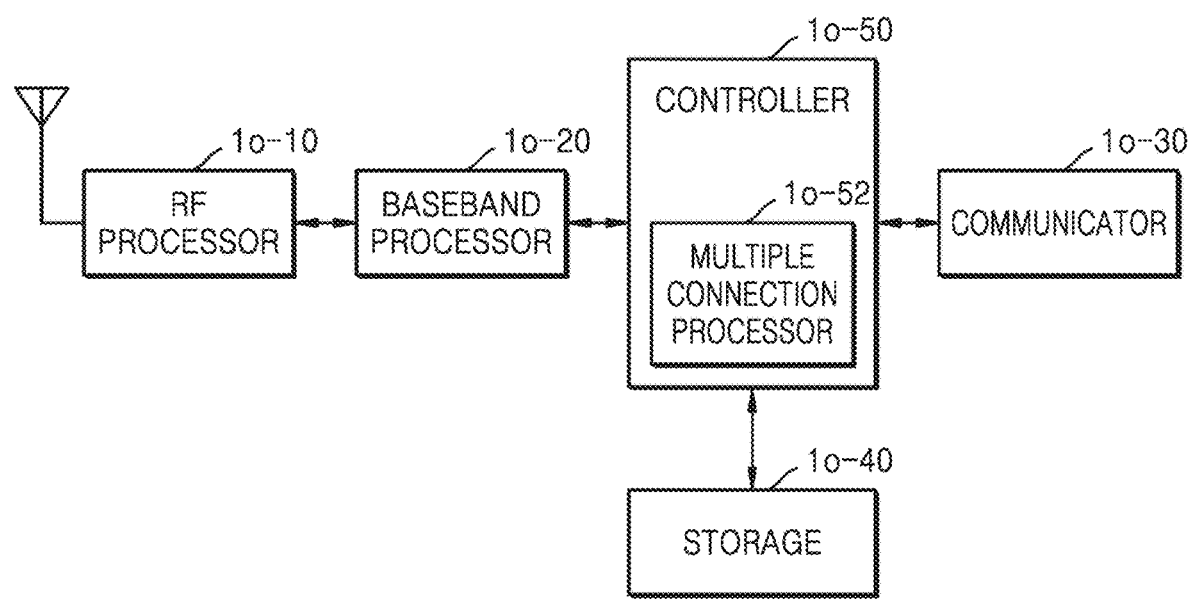

FIG. 1N is a block diagram illustrating a structure of a UE, according to an embodiment of the present disclosure.

Referring to FIG. 1N, the UE includes a radio frequency (RF) processor 1n-10, a baseband processor 1n-20, a storage 1n-30, and a controller 1n-40.

The RF processor 1n-10 performs functions for transmitting and receiving signals through a radio channel, such as signal band conversion, amplification, etc. That is, the RF processor 1n-10 may up-convert a baseband signal provided from the baseband processor 1n-20 into an RF band signal and transmit the RF band signal through an antenna, and may down-convert an RF band signal received through the antenna into a baseband signal. For example, the RF processor 1n-10 may include a transmission filter, a reception filter, an amplifier, a mixer, an oscillator, a digital-to-analog converter (DAC), an analog-to-digital converter (ADC), and the like. Although only one antenna is illustrated in FIG. 1N, the UE may include a plurality of antennas. Also, the RF processor 1n-10 may include a plurality of RF chains. Also, the RF processor 1n-10 may perform beamforming. For beamforming, the RF processor 1n-10 may adjust the phases and magnitudes of signals transmitted and received through a plurality antennas or antenna elements. Also, the RF processor may perform MIMO, and may receive a plurality of layers upon MIMO operation. The RF processor 1n-10 may perform reception beam sweeping by appropriately setting a plurality of antennas or antenna elements under the control of the controller, or may adjust the direction and beam width of the reception beam so that the reception beam is coordinated with the transmission beam.

The baseband processor 1n-20 may perform a conversion function between a baseband signal and a bit string according to a physical layer standard of a system. For example, upon transmission of data, the baseband processor 1n-20 may encode and modulate a transmission bit string to generate complex symbols. Also, upon reception of data, the baseband processor 1n-20 may reconstruct the reception bit string by demodulating and decoding the baseband signal provided from the RF processor 1n-10. For example, in the case of conforming to an OFDM scheme, upon transmission of data, the baseband processor 1n-20 may encode and modulate the transmission bit string to generate complex symbols, map the complex symbols to sub-carriers, and configure OFDM symbols through an inverse fast Fourier transform (IFFT) operation and cyclic prefix (CP) insertion. Also, upon reception of data, the baseband processor 1n-20 may segment the baseband signal provided from the RF processor 1n-10 in units of OFDM symbols, reconstruct signals mapped to sub-carriers through a fast Fourier transform (FFT) operation, and reconstruct a reception bit string through demodulation and decoding.

The baseband processor 1n-20 and the RF processor 1n-10 may transmit and receive signals as described above. Therefore, the baseband processor 1n-20 and the RF processor 1n-10 may be referred to as a transmitter, a receiver, a transceiver, or a communicator. Furthermore, at least one of the baseband processor 1n-20 and the RF processor 1n-10 may include a plurality of communication modules so as to support a plurality of different radio access technologies. Also, at least one of the baseband processor 1n-20 and the RF processor 1n-10 may include different communication modules so as to process signals of different frequency bands. For example, the different radio access technologies may include an LTE network, an NR network, and the like. Also, the different frequency bands may include a super high frequency (SHF) (e.g., 2.5 GHz, 5 GHz) band and a millimeter wave (e.g., 60 GHz) band.

The storage 1n-30 may store data such as basic programs, application programs, and configuration information for the operations of the UE. The storage 1n-30 may provide stored data in response to the request of the controller 1n-40.

The controller 1n-40 may control overall operations of the UE. For example, the controller 1n-40 may control elements of the UE to efficiently perform different handover methods for each bearer, according to an embodiment of the present disclosure. Also, for example, the controller 1n-40 may transmit and receive signals through the baseband processor 1n-20 and the RF processor 1n-10. Also, the controller 1n-40 may record data in the storage 1n-40 and read data from the storage 1n-40. To this end, the controller 1n-40 may include at least one processor. For example, the controller 1n-40 may include a communication processor (CP) that performs control for communication, and an application processor (AP) that controls an upper layer, such as an application program.

FIG. 1O illustrates a block configuration of a transmission and reception point (TRP) (e.g., a gNB) in a wireless communication system, according to an embodiment of the present disclosure.

As illustrated in FIG. 1O, the gNB may include an RF processor 1o-10, a baseband processor 10-20, a backhaul communicator 1o-30, a storage 1o-40, and a controller 1o-50.

The RF processor 1o-10 performs functions for transmitting and receiving signals through a radio channel, such as signal band conversion, amplification, etc. That is, the RF processor 1o-10 may up-convert a baseband signal provided from the baseband processor 1o-20 into an RF band signal and transmit the RF band signal through an antenna, and may down-convert an RF band signal received through the antenna into a baseband signal. For example, the RF processor 1o-10 may include a transmission filter, a reception filter, an amplifier, a mixer, an oscillator, a DAC, an ADC, and the like. Although only one antenna is illustrated in FIG. 1O, the first access node may include a plurality of antennas. Also, the RF processor 1o-10 may include a plurality of RF chains. Also, the RF processor 1o-10 may perform beamforming For beamforming, the RF processor 1o-10 may adjust the phases and magnitudes of signals transmitted and received through a plurality antennas or antenna elements. The RF processor may perform a downlink MIMO operation by transmitting one or more layers.

The baseband processor 1o-20 may perform a conversion function between a baseband signal and a bit string according to a physical layer standard of a first radio access technology. For example, upon transmission of data, the baseband processor 1o-20 may encode and modulate a transmission bit string to generate complex symbols. Also, upon reception of data, the baseband processor 1o-20 may reconstruct the reception bit string by demodulating and decoding the baseband signal provided from the RF processor 1o-10. For example, in the case of conforming to an OFDM scheme, upon transmission of data, the baseband processor 1o-20 may encode and modulate the transmission bit string to generate complex symbols, map the complex symbols to sub-carriers, and configure OFDM symbols through an IFFT operation and CP insertion. Also, upon reception of data, the baseband processor 1o-20 may segment the baseband signal provided from the RF processor 1o-10 in units of OFDM symbols, reconstruct signals mapped to sub-carriers through an FFT operation, and reconstruct a reception bit string through demodulation and decoding. The baseband processor 1o-20 and the RF processor 1o-10 may transmit and receive signals as described above. Therefore, the baseband processor 10-20 and the RF processor 1o-10 may be referred to as a transmitter, a receiver, a transceiver, a communicator, or a wireless communicator.

The communicator 1o-30 may provide an interface for performing communication with other nodes in the network.

The storage 1o-40 may store data such as basic programs, application programs, and configuration information for the operations of the main gNB. Particularly, the storage 1o-40 may store information about bearers allocated to the connected UE, measurement results reported from the connected UE, etc. Also, the storage 1o-40 may store information that is the criterion for determining whether to provide multiple connections to the UE or to stop multiple connections. The storage 1o-40 may provide stored data in response to the request of the controller 1o-50.

The controller 1o-50 may control overall operations of the main gNB. For example, the controller 1o-50 may control elements of the UE to efficiently perform different handover methods for each bearer, according to an embodiment of the present disclosure. Also, for example, the controller 1o-50 may transmit and receive signals through the baseband processor 1o-20 and the RF processor 1o-10 or through the backhaul communicator 1o-30. Also, the controller 1o-50 may record data in the storage 1o-40 and read data from the storage 1o-40. To this end, the controller 1o-50 may include at least one processor.

The methods according to the embodiments of the present disclosure, which are described in the claims or the description, may be implemented as hardware, software, or a combination of hardware and software.

When implemented as software, a computer-readable storage medium or a computer program product storing one or more programs (software modules) may be provided. One or more programs stored in the computer-readable storage medium or the computer program product are configured to be executable by one or more processors in an electronic device. One or more programs include instructions that cause the electronic device to execute the methods according to the embodiments of the present disclosure, which are described in the claims or the specification of the present disclosure.

One or more programs (software modules, software, etc.) may be stored in RAM, non-volatile memory including flash memory, ROM, electrically erasable programmable read only memory (EEPROM), magnetic disc storage device, CD-ROM, DVD, other types of optical storage devices, or magnetic cassette. Alternatively, one or more programs may be stored in a memory provided by a combination of all or part of these devices. Also, each memory may include a plurality of configured memories.

Also, the programs may be stored in an attachable storage device that is accessible through a communication network such as Internet, intranet, local area network (LAN), wide LAN (WLAN), or storage area network (SAN), or communication network provided by a combination thereof. These storage devices may be connected through an external port to a device that performs the embodiments of the present disclosure. Also, a separate storage device on the communication network may access the device that performs the embodiments of the present disclosure.

In the present disclosure, the term "computer program product" or "computer-readable medium" is used to collectively refer to a medium such as a memory, a hard disk installed in a hard disk drive, and a signal. The "computer program products" or "computer-readable recording medium" are means provided in a method of efficiently performing different handover methods for each bearer in the wireless communication system, according to the present disclosure.

In specific embodiments of the present disclosure, the elements included in the present disclosure have been expressed in the singular or plural form according to the suggested specific embodiments. However, the expression in the singular or plural form is appropriately selected according to the suggested situations for convenience of explanation and is not intended to limit the present disclosure to the single or plural elements. Even when a certain element is expressed in the plural form, it may be provided with a single element, and even when a certain element is expressed in the singular form, it may be provided with a plurality of elements.

On the other hand, although specific embodiments have been described in the detailed description of the present disclosure, various modifications may be made thereto without departing from the scope of the present disclosure. Therefore, the scope of the present disclosure should not be limited to the described embodiments and should be defined by the following claims and the equivalents thereto.

The invention claimed is:

1. A method of operating a user equipment (UE) in a wireless communication system, the method comprising:
receiving, from a source base station, a first radio resource control (RRC) reconfiguration message indicating handover, the first RRC reconfiguration message including data radio bearer (DRB) configuration information, the DRB configuration information including an indicator indicating a dual active protocol stack (DAPS) is configured for at least one DRB;
in case that the indicator indicates the DAPS is configured for at least one DRB, generating a medium access control (MAC) entity for a target base station;
configuring the MAC entity for the target base station based on MAC configuration information included in the first RRC reconfiguration message indicating the handover;
suspending a signaling radio bearer (SRB) for the source base station;
establishing or configuring an SRB for the target base station;
receiving a second RRC reconfiguration message from the target base station; and
in case that the second RRC reconfiguration message received from the target base station includes an indicator for release of the source base station, releasing an RLC entity for the source base station for the at least one DRB.

2. The method of claim 1, further comprising,
in case that the indicator indicates the DAPS is configured for the at least one DRB, reconfiguring a packet data convergence protocol (PDCP) entity with respect to the at least one DRB for which the DAPS is configured, the PDCP entity being not re-established.

3. The method of claim 2, wherein the reconfiguring of the PDCP entity comprises, based on radio link control (RLC) configuration information included in the first RRC reconfiguration message indicating the handover, establishing or configuring an RLC entity for the target base station with respect to the at least one DRB for which the DAPS is configured.

4. The method of claim 2, wherein the reconfiguring of the PDCP entity comprises configuring the PDCP entity with a header compression and decompression function and a security function for the target base station.

5. The method of claim 1, further comprising:
in case that the DRB configuration information includes the indicator indicating the configuration of the DAPS for the at least one DRB, applying a new radio network temporary identifier (RNTI) value indicated by the first RRC reconfiguration message indicating the handover to the MAC entity for the target base station.

6. The method of claim 1,
wherein, in case that the second RRC reconfiguration message received from the target base station includes the indicator for release of the source base station and the source base station is a base station related to new radio (NR), releasing an RLC entity for the source base station with respect to the at least one DRB without re-establishing the RLC entity; and
wherein, in case that the source base station is a base station related to long term evolution (LTE), re-establishing the RLC entity for the source base station with respect to the at least one DRB.

7. The method of claim 1, wherein the first RRC reconfiguration message indicating the handover includes an indicator indicating the DAPS is configured for the at least one DRB, and does not include an indicator indicating the DAPS is configured for at least one SRB.

8. The method of claim 1, further comprising, in case that no DRB is configured for the DAPS, resetting a MAC entity for the UE.

9. The method of claim 1, further comprising, in case that no DRB is configured for the DAPS, re-establishing a PDCP entity or an RLC entity for the SRB of the UE or at least one DRB for which the DAPS is not configured.

10. A user equipment (UE) in a wireless communication system, the UE comprising:
a transceiver; and
at least one processor configured to:
receive, from a source base station, a first radio resource control (RRC) reconfiguration message indicating handover through the transceiver, the first RRC reconfiguration message including data radio bearer (DRB) configuration information, the DRB configuration information including an indicator indicating a dual active protocol stack (DAPS) is configured for at least one DRB, in case that the indicator indicates the DAPS is configured for at least one DRB, generate a medium access control (MAC) entity for a target base station, configure the MAC entity for the target base station based on MAC configuration information included in the first RRC reconfiguration message indicating the handover, suspend a signaling radio bearer (SRB) for the source base station, establish or configure an SRB for the target base station, receive a second RRC reconfiguration message from the target base station, and in case that the second RRC reconfiguration message received from the target base station includes an indicator for release of the source base station, release an RLC entity for the source base station for the at least one DRB.

11. The UE of claim 10, wherein, in case that the indicator indicates the DAPS is configured for the at least one DRB, the at least one processor is further configured to reconfigure a packet data convergence protocol (PDCP) entity with respect to at least one DRB for which the DAPS is configured, the PDCP entity being not re-established.

12. The UE of claim 11, wherein the at least one processor is further configured to:

based on radio link control (RLC) configuration information included in the first RRC reconfiguration message indicating the handover, establish or configure an RLC entity for the target base station with respect to at least one DRB for which the DAPS is configured; and configure the PDCP entity with a header compression and decompression function and a security function for the target base station.

13. The UE of claim 10, wherein the at least one processor is further configured to:

in case that the second RRC reconfiguration message received from the target base station includes the indicator for release of the source base station and the source base station is a base station related to new radio (NR), release an RLC entity for the source base station with respect to the at least one DRB without re-establishing the RLC entity; and in case that the source base station is a base station related to long term evolution (LTE), re-establish the RLC entity for the source base station with respect to the at least one DRB.

14. The UE of claim 10, wherein, in case that no DRB is configured for the DAPS, the at least one processor is further configured to reset the MAC entity for the UE.

15. The UE of claim 10, wherein, in case that no DRB is configured for the DAPS, the at least one processor is further configured to re-establish a PDCP entity or an RLC entity for the SRB of the UE or at least one DRB for which the DAPS is not configured.

* * * * *